US012285936B2

(12) United States Patent
Humberstone et al.

(10) Patent No.: US 12,285,936 B2
(45) Date of Patent: Apr. 29, 2025

(54) DEVICE, METHOD, AND ASSEMBLY FOR LOADING NOZZLES WITH FLUID

(71) Applicant: ARCHIPELAGO TECHNOLOGY GROUP LTD., Cambridge (GB)

(72) Inventors: Victor Carey Humberstone, Cambridge (GB); Guy Charles Fernley Newcombe, Cambridge (GB); Daniel Richard Mace, Cambridge (GB); Gordon Weaver Chapman, Cambridge (GB)

(73) Assignee: Archipelago Technology Group Ltd., Cambridge (GB)

( * ) Notice: Subject to any disclaimer, the term of this patent is extended or adjusted under 35 U.S.C. 154(b) by 739 days.

(21) Appl. No.: 17/440,610

(22) PCT Filed: Mar. 30, 2020

(86) PCT No.: PCT/EP2020/059016
§ 371 (c)(1),
(2) Date: Sep. 17, 2021

(87) PCT Pub. No.: WO2020/193813
PCT Pub. Date: Oct. 1, 2020

(65) Prior Publication Data

US 2022/0161543 A1 May 26, 2022

(30) Foreign Application Priority Data

Mar. 28, 2019 (GB) ...................................... 1904365

(51) Int. Cl.
*B41F 9/06* (2006.01)
*B05C 1/08* (2006.01)
(Continued)

(52) U.S. Cl.
CPC ............ *B41F 9/061* (2013.01); *B05C 1/0813* (2013.01); *B05D 1/28* (2013.01); *B41F 9/1072* (2013.01); *B05C 1/0817* (2013.01)

(58) Field of Classification Search
CPC ...... B41F 9/061; B41F 9/1072; B05C 1/0813; B05C 1/0817; B05D 1/28
See application file for complete search history.

(56) References Cited

U.S. PATENT DOCUMENTS 5,001,979 A * 3/1991 Kurten .................... B41F 15/42 101/123
5,044,277 A * 9/1991 John ..................... B41F 31/027 101/367

(Continued)

FOREIGN PATENT DOCUMENTS

AT 354968 B * 2/1980
CH 672289 A5 11/1989

(Continued)

*Primary Examiner* — Christopher E Mahoney
*Assistant Examiner* — Marissa Ferguson-Samreth
(74) *Attorney, Agent, or Firm* — FINNEGAN, HENDERSON, FARABOW, GARRETT & DUNNER, LLP

(57) ABSTRACT

A device (3000) for loading fluid into nozzle(s) of a nozzle-bearing body (3070) includes a first member (3010), having a first surface (3016), and a second member (3020) protruding from the first member (3010). The second member (3020) has second and third surfaces (3028, 3026), the second surface (3028) extending from the first surface (3016) at an angle. The first surface (3016) substantially complements the shape of the nozzle-bearing body's surface (3070). The device (3000) has a recess (3023) defined therein at least in part by the first and second surfaces (3016, 3028). When the device (3000) is placed into a working configuration with the nozzle-bearing body (3070), a tangent to the third surface (3026), in a region of the third surface (Continued)

700

(3026) proximate to where the second surface (3028) meets the third surface (3026), is substantially parallel to a tangent to the first surface (3016), in a region of the first surface (3016) where the first surface (3016) meets the second surface (3028), wherein, the recess (3023) forms a pocket for receiving the fluid.

34 Claims, 34 Drawing Sheets

(51) Int. Cl.

| | |
|---|---|
| ***B05D 1/28*** | (2006.01) |
| ***B41F 9/10*** | (2006.01) |

(56) References Cited

U.S. PATENT DOCUMENTS

| | | | | |
|---|---|---|---|---|
| 6,148,167 | A | 11/2000 | Komakine et al. | |
| 6,581,516 | B1 | 6/2003 | Schönberger | |
| 2002/0166505 | A1* | 11/2002 | Hikami | B41F 15/46 118/108 |
| 2005/0223513 | A1 | 10/2005 | Mau et al. | |
| 2013/0291742 | A1* | 11/2013 | Abe | B41F 15/0881 101/123 |

FOREIGN PATENT DOCUMENTS

| | | | | | |
|---|---|---|---|---|---|
| CN | 1129411 | A | | 8/1996 | |
| CN | 1156666 | A | | 8/1997 | |
| CN | 1695940 | A | | 11/2005 | |
| CN | 101032714 | A | | 9/2007 | |
| CN | 101045368 | A | | 10/2007 | |
| CN | 201092134 | Y | | 7/2008 | |
| CN | 101518978 | A | | 9/2009 | |
| CN | 201807502 | U | | 4/2011 | |
| CN | 102256794 | A | | 11/2011 | |
| CN | 102886979 | A | | 1/2013 | |
| CN | 107249889 | A | | 10/2017 | |
| CN | 107571622 | A | | 1/2018 | |
| CN | 108349241 | A | | 7/2018 | |
| CN | 108355905 | A | | 8/2018 | |
| CN | 108463349 | A | | 8/2018 | |
| DE | 3439946 | A | * | 6/1985 | A24C 5/1835 |
| DE | 19736339 | A1 | | 4/1999 | |
| DE | 10120117 | | * | 12/2001 | |
| EP | 0011314 | A1 | * | 5/1980 | |
| EP | 0071014 | A1 | * | 2/1983 | |
| EP | 1331094 | A1 | | 7/2003 | |
| EP | 1648704 | A1 | | 4/2006 | |
| EP | 2418547 | A1 | | 2/2012 | |
| GB | 609072 | A | | 9/1948 | |
| GB | 0421483 | | | 10/2004 | |
| GB | 2554790 | A | | 4/2018 | |
| JP | 5859081 | | * | 4/1983 | |
| JP | 2002200736 | A | | 7/2002 | |
| JP | 2006251730 | A | | 9/2006 | |
| JP | 2011240571 | A1 | | 12/2011 | |
| WO | 2016148138 | A1 | | 9/2016 | |
| WO | 2017141034 | A1 | | 8/2017 | |

* cited by examiner

1800

| Material | Surface Energy mJ/$m^2$ | Wear Resistant | Young's Modulus (Elasticity) [MPa] | Coefficient of friction against steel |
|---|---|---|---|---|
| Aluminium 6082 | >500 | No | 70000 | 0.6 |
| Brass | 1000 | Yes | 100000 | 0.5 |
| Stainless steel 316 | >500 | Yes | 190000 | 0.6 |
| Poly ether ether ketone (PEEK) | 35 | Yes | 3600 | 0.3 |
| PTFE | 19 | No | 30 | 0.04 |
| Nylon6,6 | 41 | Yes | 3000 | 0.25 |
| Carbon fibre composite | 40 | No | 60000 | 0.6 |
| UHMWPE | 32 | Yes | 1000 | 0.15 |
| PP | 33 | No | 1400 | 0.7 |
| Acetal | 36 | Yes | 3000 | 0.2 |
| ABS | 40 | Yes | 2000 | 0.2 |
| PMMA | 40 | No | 2500 | 0.5 |
| PLA | 41 | No | 3800 | Unavailable |
| Nitrile Rubber | 36 | No | 3 | 0.8 |
| TPU | 38 | Yes | 150 | 2.8 |
| Polyimide | 40 | Yes | 6600 | 0.2 |

Table 2

FIG. 26

DEVICE, METHOD, AND ASSEMBLY FOR LOADING NOZZLES WITH FLUID

CROSS-REFERENCE TO RELATED APPLICATIONS

This application is a U.S. National Stage filing under 35 U.S.C. § 371 of International Application No. PCT/EP2020/059016, filed Mar. 30, 2020, and published as WO 2020/193813 A1, which claims the benefit of priority of GB No. 1904365.2, filed Mar. 28, 2019. The entire contents of the above-referenced applications are expressly incorporated herein by reference.

TECHNICAL FIELD

The present disclosure generally relates to dispensing of flowable materials and, more particularly, to a device, assembly, and method for loading nozzles with fluids of various viscosities.

BACKGROUND

In gravure printing, first, ink is applied to the overall surface of a body having a pattern of local indentations defined in the surface. Then, a sharp-edged doctor blade is used to scrape ink from the body surface, except for the ink collected within the indentations. Finally, the ink from within the indentations is transferred onto a substrate, such as paper, to produce a pattern of printed ink.

In gravure printing, the body is often in the form of a precise cylindrical roller ('gravure roller'). The doctor blade contacts the outer surface of the gravure roller along a line parallel to the cylinder axis and is pressed against the ink-wetted surface of the body at a large angle to that surface (i.e., more than 45 degrees). The doctor blade is made with a precise straight edge so that it conforms closely to the un-indented regions of the cylinder surface.

FIG. 1 illustrates further details of a gravure printing process, by way of example, using a cylindrical gravure roller. As shown in FIG. 1, a cylindrical gravure roller 110 is rotated as shown at 112 about its axis 114 (in FIG. 1 counter clock-wise) so that an outer surface 116 of the gravure roller 110, and therefore indentations 118 within that surface 116, are transported through an ink reservoir 150 (also known as an ink fountain). This action wets the surface 116 of the gravure roller 110, including the indentations 118, with ink. A doctor blade 140 is held stationary, pressed at a large angle against the ink-wetted surface 116, while the gravure roller 110 rotates. As the wetted surface 116 of the gravure cylinder 110 passes the doctor blade 140, the ink is scraped from the un-indented regions of the surface 116, leaving the indentations 118 filled with ink.

Subsequent, under pressure, contact of the surface 116 with a surface 132 of a final substrate 130, such as paper, transfers ink from the indentations 118 onto the surface 132 of that final substrate 130. In this manner, the pattern of indentations is printed in ink on the final substrate 130.

As shown schematically in FIG. 1, the pressure may be provided by an impression cylinder 120, whose axis 124 is parallel to the axis 114 of the gravure roller 110. Rotating of the impression cylinder 120 in the opposite direction 122 of the rotational direction 112 of the gravure roller 110 (shown in FIG. 1 as being clockwise) enables the ink transfer.

In gravure printing, the purpose of the ink fountain is to deposit ink into the indentations of the gravure roller, while the purpose of the doctor blade is to remove ink from the un-indented regions of the roller surface. Any residual film of ink left on the gravure roller, after passing the doctor blade, is undesirable and therefore should be made as thin as possible. To achieve this, the edge of the doctor blade is narrow and presented at a large angle to the tangent (at the point where the gravure roller is contacted by the doctor blade) to the gravure roller surface. The combination of these two characteristics enables the doctor blade to exert high local pressure on any ink 'lubricating film' interposed between the edge of the doctor blade and roller surface, thereby making such a film very thin.

FIG. 2 shows a cross-sectional profile of a doctor blade 240 commonly used in gravure printing, such as described with reference to FIG. 1. The doctor blade 240 is made of steel, has a thickness 246 of 0.1-0.3 mm, and is finished with a bevel face 242 terminating in sharp bevel edge 244, or a lamella or round edge (not shown). In use, the edge 244 contacts the gravure roller to scrape ink from the surface of the gravure roller. Printblade PB50 manufactured by Print-Blade division of Fernite of Sheffield Ltd. exemplifies such doctor blades.

In a gravure printer, the pressurisation of the fluid that enables loading of the indentations is provided by the hydrostatic pressure due to gravity acting on the depth of ink into which the gravure roller is immersed. For example, a typical bath used for gravure printing, such as the ink reservoir 150, is about 10 cm deep, thus providing for the maximum pressure of about 1,000 Pa. As such, gravure printing is well-adapted to fully filling indentations of small volumes (e.g. less than 0.01 $mm^3$) with liquid having a limited range of suitable rheological properties, in particular a low viscosity, e.g., less than $20.10^{-3}$ Pa·s. However, it would not be possible to achieve partial filling of such indentations. Furthermore, gravure printing is not well-adapted, and the pressure in the bath would be insufficient, to filling nozzles of volumes larger than 0.1 $mm^3$ or with fluids having a wide range of rheological properties, such as a high viscosity, e.g., greater than $100.10^{-3}$ Ps·s. The gravure printing method is therefore not suitable for use with devices for depositing patterns of such larger fluid volumes and such larger fluid viscosity, such as devices described in WO 2017/141034 A1.

SUMMARY

The disclosed embodiments describe a device for loading fluid into one or more nozzles of a nozzle-bearing body when the device is assembled into a working configuration with the nozzle-bearing body, the nozzle-bearing body having a body surface defining one or more orifices for receiving the fluid into the one or more nozzles. The device comprises a first member having a first surface; and a second member protruding from the first member, the second member having a second surface and a third surface, the second surface extending from the first surface at an interior angle in a range of 20 degrees to 160 degrees. The first surface is shaped to substantially complement the shape of the body surface. A tangent to the third surface, in a region of the third surface proximate to where the second surface meets the third surface, is substantially parallel to a tangent to the first surface, in a region of the first surface where the first surface meets the second surface, when the device is in the working configuration. The device has a recess defined therein at least in part by the first surface and the second surface, the recess configured to form a pocket for receiving the fluid when the device is assembled into the working configuration.

The third surface may be configured to conform to the shape of the body surface of the nozzle-bearing body when the device is in the working configuration and not to complement or substantially complement the shape of the body surface of the nozzle-bearing body when the device is outside the working configuration.

The interior angle may be in a range of 60 degrees to 120 degrees.

The interior angle may be in a range of 80 degrees to 100 degrees.

The interior angle may be 90 degrees.

The device may comprise: a third member extending from the first member and the second member, the third member having a fourth surface configured to face the body surface when the device is in the working configuration; and a fourth member extending from the first member and the second member opposite the third member, the fourth member having a fifth surface configured to face the body surface when the device is in the working configuration, where at least a portion of the fourth surface and at least a portion of the fifth surface extend from the opposite sides of the third surface to form with the third surface a single surface configured to conform to the body surface when the device is in the working configuration.

The third and fourth member may be integral with the first member and/or the second member.

The recess may further be defined by the third member and the fourth member.

The device may comprise a fifth member having a sixth surface extending from the first surface that is opposite where the first surface meets the second surface, where an angle formed by the sixth surface and the first surface is in a range of 185 degrees to 265 degrees, and where, the fifth member is configured to form a funnel between the sixth surface of the fifth member and the body surface for collecting fluid when the device is assembled into the working configuration.

The device may further comprise a first end member and a second end member positioned at the opposite sides of the device, where: the first end member has a seventh surface configured to conform to the shape of the body surface when the device is in the working configuration, the second end member has an eighth surface configured to conform to the shape of the body surface when the device is in the working configuration, and the seventh surface and the eighth surface comprise respective surface portions aligned with the third surface of the second member, thereby forming an extended surface including the third surface and configured to conform to the body surface when the device is in the working configuration.

The device may be configured such that, in the device assembled into the working configuration with the nozzle-bearing body, the pocket formed by the device and the nozzle-bearing body comprises an inner region for receiving fluid, the inner region defined at least by the first and second surfaces, and an outer region for receiving fluid, the outer region defined at least by the first and second end members and by an area of the sixth surface located between the first and second end members.

The end members may be detachably mounted on the device.

The device may be for loading fluid into one or more nozzles of the nozzle-bearing body that is planar. The first surface then may be planar such that the first surface is positionable to be substantially parallel to the planar body surface of the nozzle-bearing body and to define an opening with the planar body surface for receiving the fluid, when the device is in the working configuration being held proximate to the nozzle-bearing body with the second member protruding toward the planar body surface of the nozzle-bearing body.

The second surface may be substantially perpendicular to the first surface in a region where the second surface meets the first surface and may be substantially perpendicular to the third surface in a region where the second surface meets the third surface.

The device may be for loading fluid into one or more nozzles of the nozzle-bearing body that is cylindrical. The first surface then may have a cylindrical curvature and be positionable to be substantially concentric with the cylindrical body surface of the nozzle-bearing body and to define an opening with the cylindrical body surface for receiving the fluid when the device is in the working configuration being held proximate to the nozzle-bearing body with the second member protruding toward the cylindrical body surface of the nozzle-bearing body.

The second surface may be substantially perpendicular to the tangent to the first surface in a region where the second surface meets the first surface and be substantially perpendicular to the tangent to the third surface in a region where the second surface meets the third surface.

The device may satisfy the following relation: $l_1/c_p>1$, where: $c_p$ denotes an extent to which the third surface protrudes from the first surface, and $l_1$ denotes a fluid-contacted length of the first surface measured along the first surface in the direction between the opening for receiving fluid and the second surface when the device is operated to load the fluid into the one or more nozzles.

The first member may be made of an engineering material, such as aluminium, brass, stainless steel, polyether ether ketone (PEEK), polytetrafluoroethylene (PTFE), nylon, carbon fibre composite, polyimide, or ultra-high molecular weight polyethylene (UHMWPE).

The second member may be made of a non-abrasive material, such as polytetrafluoroethylene (PTFE), ultra-high molecular weight polyethylene (UHMWPE), or nylon.

All portion(s) of the device that are configured to be pressed against the body surface of the nozzle-bearing body while the device is in the working configuration may be made of a non-abrasive material, such as polytetrafluoroethylene (PTFE), ultra-high molecular weight polyethylene (UHMWPE), or nylon.

The first member and the second member may form a unitary body of the device.

All members of the device may form the unitary body.

At least the first member and the second member may be separate parts joined together to form the device.

At least the first member and the second member may be made of different materials.

At least one member of the device is made of a material having low chemical reactivity.

The disclosed embodiments also describe an assembly for loading fluid. The assembly comprises: a nozzle-bearing body having a body surface defining one or more orifices for receiving the fluid into the one or more nozzles; and the above-described device for loading fluid. The device and the nozzle-bearing body are assembled into a working configuration in which the device is held proximate to the nozzle-bearing body such that the second member of the device protrudes toward the body surface and the first surface and the body surface form a pocket with an opening for receiving the fluid. In the working configuration, the nozzle-bearing body is movable relative to the device in a direction from the opening toward the second surface such that a gap formed between the first surface and the body surface and a gap formed between the third surface and the body surface remain substantially constant, thereby allowing the device to at least partially load the one or more nozzles with the fluid received into the pocket via the opening.

The assembly may satisfy the following relation: $c_1 \gg 3V_n/A_n$, where: $c_1$ denotes the gap between the body surface and the first surface, $1/A_n$ refers to the number of nozzles per unit area in the region of the nozzle bearing body opposite the fluid filled region of the first surface, and $V_n$ denotes a desired volume of fluid for loading into the fluid-contacted nozzle.

The assembly may satisfy the following relation: $c_2 < c_p$, where: $c_p$ denotes an extent to which the third surface protrudes from the first surface, and $c_2$ denotes the gap formed between the body surface and the third surface of the device.

The assembly may satisfy the following relation: $c_2 \ll c_p$.

The assembly may satisfy the following relation: $(c_2^3/l_2) \ll (c_1^3/l_1)$, where: $l_1$ denotes the fluid-contacted length of the first surface measured along the first surface in the direction between the opening for receiving fluid and the second surface, $l_2$ denotes a dimension along the third surface measured from the second surface to the end of the device furthest from the opening for receiving fluid, $c_1$ denotes the gap between the body surface and the first surface, and $c_2$ denotes the gap between the body surface and the third surface.

The disclosed embodiments further describe a method for loading fluid, into one or more nozzles of a nozzle-bearing body, using the above-described device, where the nozzle-bearing body has a body surface defining one or more orifices for receiving fluid into the one or more nozzles. While the device is held in the working configuration, proximate to the nozzle-bearing body such that the second member protrudes toward the body surface, and the first surface of the first member and the body surface form a pocket having an opening for receiving the fluid, the method comprises: supplying the fluid into the pocket via the opening, and moving the nozzle-bearing body relative to the device in a direction from the opening toward the second surface while maintaining a gap formed between the first surface and the body surface and a gap formed between the third surface and the body surface substantially constant to load the fluid from the pocket into the one or more nozzles.

The device and the nozzle-bearing body may satisfy the following relation: $c_1 \gg 3V_n/A_n$, where: $c_1$ denotes the gap between the body surface and the first surface, $1/A_n$ refers to the number of nozzles per unit area in the region of the nozzle bearing body opposite the fluid filled region of the first surface, and $V_n$ denotes a desired volume of a fluid for loading into a fluid-contacted nozzle.

The device and the nozzle-bearing body may satisfy the following relation: $c_2 < c_p$, where: $c_p$ denotes an extent to which the third surface protrudes from the first surface, and $c_2$ denotes the gap formed between the body surface and the third surface.

The device and the nozzle-bearing body may satisfy the following relation $c_2 \ll c_p$.

The device and the nozzle-bearing body may satisfy the following relation: $(c_2^3/l_2) \ll (c_1^3/l_1)$, where: $l_1$ denotes a fluid-contacted length of the first surface measured along the first surface in the direction between the opening for receiving fluid and the second surface, $l_2$ denotes a dimension along the third surface measured from the second surface to the end of the device furthest from the opening for receiving fluid, $c_1$ denotes the gap between the body surface and the first surface, and $c_2$ denotes the gap between the body surface and the third surface.

At least one part of the device may be made from a thermally conductive material, and the method may further comprise: maintaining the at least one part at a controlled temperature in a range of ambient to 250 centigrade while loading the fluid into the one or more nozzles.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 26 provides a table listing examples of materials that could be used to make a multi-material device for loading fluid;

DETAILED DESCRIPTION

In view of the above-mentioned and other shortcomings and problems with existing systems, the present disclosure describes more effective and efficient techniques for loading fluid(s) into nozzle(s) of a nozzle-bearing body that are suitable for loading fluids of various viscosities. In particular, a new type of a device is disclosed for loading a wide variety of fluids or liquids (including but not limited to pure liquids, solutions, suspensions, emulsions) into nozzle(s) of a nozzle-bearing body. Corresponding assembly and method are also disclosed. Advantageously, the disclosed device may be used with fluids having a wide range of rheological properties, including non-Newtonian viscous properties, and including fluids of viscosity greater than $100 \cdot 10^{-3}$ Pa·s. This new device finds practical application, among others, to non-contact forms of printing, such as the non-contact form of printing described in patent application WO 2017/141034 A1, filed on 15 Feb. 2017, the entire content of which is hereby incorporated by reference, and other uses.

According to an aspect of the present disclosure, there is provided a device for loading fluid into one or more nozzles of a nozzle-bearing body when the device is assembled into a working configuration with the nozzle-bearing body, the nozzle-bearing body having a body surface defining one or more orifices for receiving fluid into the one or more nozzles, the device comprising: a first member having a first surface; and a second member protruding from the first member, the second member having a second surface and a third surface, the second surface extending from the first surface at an interior angle in a range of 20 degrees to 160 degrees, wherein the first surface is shaped to substantially complement the shape of the body surface, and a tangent to the third surface, in a region of the third surface proximate to where the second surface meets the third surface, is substantially parallel to a tangent to the first surface, in a region of the first surface where the first surface meets the second surface, when the device is in the working configuration.

Figure 1:
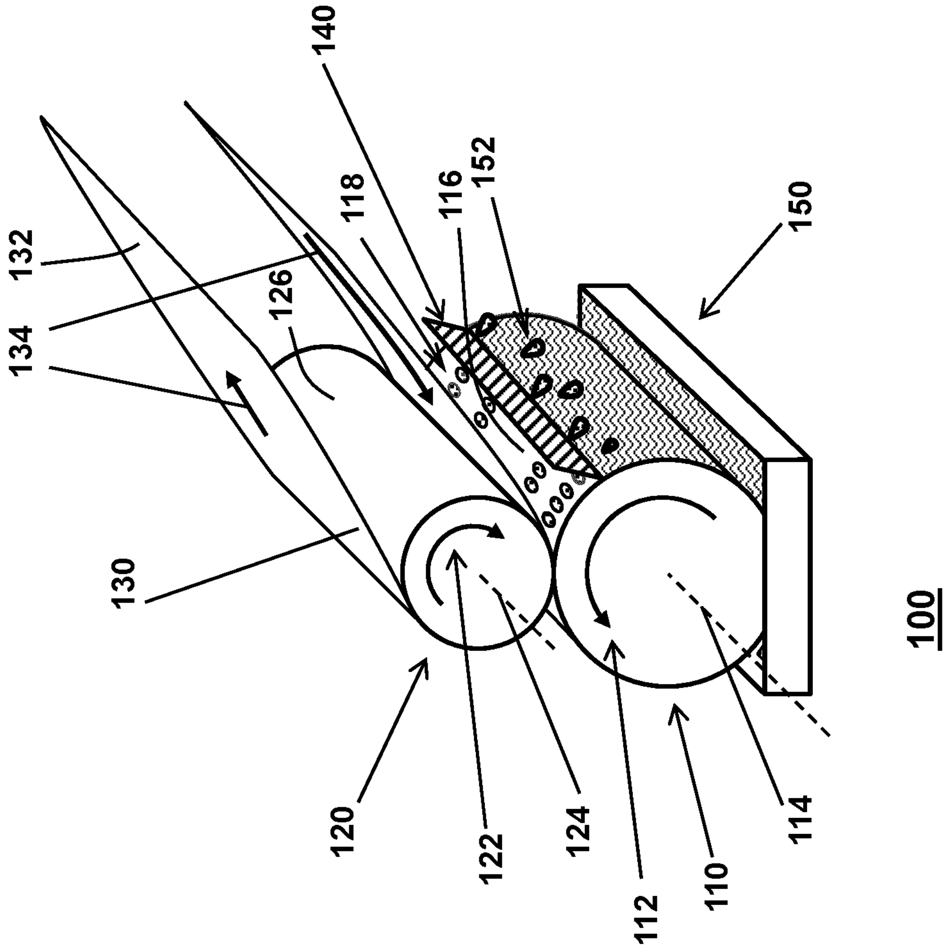
FIG. 1 depicts a cylindrical gravure roller assembly for gravure printing.
Figure 2:
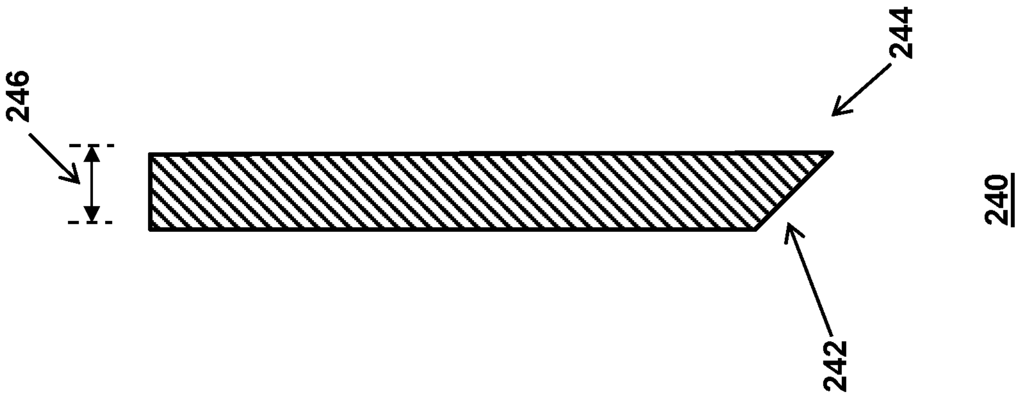
FIG. 2 depicts a cross-sectional profile of a doctor blade commonly used in gravure printing.

Thus, when the above device is in the working configuration, a gap ('opening') for receiving fluid is formed between the body surface and the first surface at the end of the first member that is most distant from the second member. Further, when the device is in the working configuration, a zone for receiving the fluid is formed between the first surface and the second surface for receiving the fluid when the device. Within this zone, the above device generates higher fluid pressures than are those generated by the assembly of FIG. 1. This higher pressure enables the above device to fill nozzles with fluids of higher viscosity and with greater fluid volumes than the assembly of FIG. 1 provides. Further, the device for loading fluid also advantageously allows a wide range of fluid viscosities to fill nozzles under conditions of laminar or near-laminar flow, which improves control and repeatability of the filling process.

The third surface may be configured to conform to the shape of the body surface of the nozzle-bearing body when the device is in the working configuration and not to complement or substantially complement the shape of the body surface of the nozzle-bearing body when the device is outside the working configuration. This allows greater freedom of choice of material for the second member, in particular the ability to choose more highly conformable materials than would otherwise be possible.

The interior angle may be in a range of 60 degrees to 120 degrees.

The interior angle may be in a range of 80 degrees to 100 degrees.

The interior angle may be 90 degrees or about 90 degrees.

From the lower end of the degree range, an increase of the angle to at least 60, and more so to at least 80 degrees, advantageously helps to prevent formation of a region of stagnant fluid between the first surface and the second surface. Thus, potential clogging up of the device due to the stagnant fluid drying out between uses of the device can be prevented. From the higher end of the degree range, a decrease of the angle to at least 120 degrees, and more so to at least 100 degrees advantageously improves consistency of the nozzle-filling volume or depth. An interior angle of about 90 degrees beneficially balances the above advantages.

The device may further comprise a third member connected to the first member and the second member, the third member having a fourth surface configured to face the body surface when the device is in the working configuration; and a fourth member connected to the first member and the second member opposite the third member, the fourth member having a fifth surface configured to face the body surface when the device is in the working configuration, wherein the third member, the fourth member, the first surface, and the second surface together form a pocket in the device for receiving the fluid when the device is in the working configuration, and wherein at least a portion of the fourth surface and at least a portion of the fifth surface extend from the opposite sides of the third surface to form with the third surface a single surface configured to conform to the body surface when the device is in the working configuration.

This configuration advantageously decreases loss of the fluid from the sides of the device as the nozzle-bearing body is being moved relative to the device, as well as facilitates a consistent fluid pressure across the fluid-loading width of the device, thereby improving consistency of the filling depth of the nozzles.

The third member and the fourth member may be integral with the first member and/or the second member. This advantageously simplifies the device, as well as reduces manufacturing costs.

The device may further comprise: a fifth member having a sixth surface extending from the first surface, opposite where the first surface meets the second surface, wherein an angle formed by the sixth surface and the first surface is in a range of 185 to 275 degrees, and wherein the fifth member is configured to form a funnel between the sixth surface of the fifth member and the body surface of the nozzle-bearing body for collecting the fluid when the device is in the working configuration.

This configuration advantageously allows any excess of the supplied fluid to be collected before the fluid enters the opening, thereby preventing overflowing of the device with the fluid, as well as decreasing loss of the fluid.

The angle formed by the sixth surface and the first surface may be in a range of 200 degrees to 250 degrees. For a given desired volume for collecting the excess fluid to prevent the device overflow, an angle in this range balances the relation between the length of the fifth member and how far it protrudes or extends away from the first member, thereby advantageously allowing to reduce the overall compactness of the device.

The device may further comprise a first end member and a second end member positioned at the opposite sides of the device, wherein: the first end member has a seventh surface configured to conform to the shape of the body surface when the device is in the working configuration, the second end member has an eighth surface configured to conform to the shape of the body surface when the device is in the working configuration, and the seventh surface and the eighth surface comprise respective surface portions aligned with the third surface of the second member, thereby forming an extended surface including the third surface and configured to conform to the body surface when the device is in the working configuration.

This configuration advantageously helps to prevent fluid from flowing out from the ends of the device as well as to stabilise the loading pressure across the fluid-loading width of the device so that the nozzle filling process is similar across the fluid-loading width of the device.

When a device for loading fluid, in any of its configurations as described in this disclosure, is to be used with a planar nozzle-bearing body, the first surface may be planar (thereby configured to complement the shape of the body surface of the nozzle-bearing body) such that the first surface is positionable to be substantially parallel to the planar surface of the nozzle-bearing body and to define an opening with the surface of the nozzle-bearing body for receiving the fluid when the device is in the working configuration being held proximate to the nozzle-bearing body with the second member protruding toward the planar surface of the nozzle-bearing body.

The second surface may be substantially perpendicular to the first surface in a region where the second surface meets the first surface and substantially perpendicular to the third surface in a region where the second surface meets the third surface. In this manner, the consistency of the filling depth of nozzles as the fluid passes from the opening toward the protrusion of the device (the second member) could be advantageously improved under a wide variety of conditions.

When the device for loading fluid, in any of its configurations as described in this disclosure, is to be used with a cylindrical nozzle-bearing body, the first surface may have a cylindrical curvature such that the first surface is positionable to be substantially concentric with the cylindrical body surface (the first surface thereby configured to complement the shape of the body surface) and to define an opening with the cylindrical body surface of the nozzle-bearing body for receiving the fluid when the device is in the working configuration being held proximate to the nozzle-bearing body with the second member protruding toward the cylindrical body surface of the nozzle-bearing body.

The second surface may be substantially perpendicular to the tangent to the first surface in a region where the second surface meets the first surface and substantially perpendicular to the tangent to the third surface in a region where the second surface contacts the third surface. In this manner, the consistency of the filling depth of nozzles as the fluid passes from the opening toward the second surface could be advantageously improved under a wide variety of conditions.

Dimension $c_p$ denotes the extent to which the third surface protrudes from the first surface. Dimension $l_1$ is a fluid-contacted length of the first surface measured along the first surface in the direction between the opening for receiving fluid and the second surface when the device is in the working configuration and operated to load fluid into the one or more nozzles. A ratio between dimension $c_p$, and $l_1$ may satisfy the relation: $l_1/c_p>1$, and optionally $l_1/c_p>>1$. These conditions, in practice, advantageously help to establish consistent fluid 'filling' of the device for a wide variety of fluids and operating conditions.

The first member may be made of an engineering material, such as aluminium, brass, stainless steel, polyether ether ketone (PEEK), polytetrafluoroethylene (PTFE), nylon, carbon fibre composite, polyimide, or ultra-high molecular weight polyethylene (UHMWPE).

The second member may be made of a non-abrasive material, such as PTFE, UHMWPE, or nylon. This advantageously reduces damage and wear and tear on the nozzle-bearing body, particularly wear and tear that otherwise could be caused by a non-lubricated contact between the third surface of the device and the body surface of the nozzle-bearing body while the device and the nozzle-bearing body are in the working configuration.

Each portion of the device that is configured to be pressed against the body surface of the nozzle-bearing body while device is in the working configuration may be made of a non-abrasive material, such as polytetrafluoroethylene (PTFE), nylon, or ultra-high molecular weight polyethylene (UHMWPE). This advantageously further reduces damage and wear and tear on the nozzle-bearing body, particularly wear and tear that otherwise could be caused by a non-lubricated contact between those portions of the device and the body surface of the nozzle-bearing body due to its motion relative to the device while the device and the nozzle-bearing body are in the working configuration.

The first member and the second member, and optionally also the third member and fourth member and/or the end members, and further optionally also the fifth member may form a unitary body of the device. This advantageously simplifies device assembly and can improve device mechanical integrity.

All members of the device may form the unitary body having a pocket for receiving fluid in the working configuration, the pocket being defined at least by the first surface and the second surface.

The first member and the second member may be separate parts joined together in the device. This advantageously allows for replacement of the second member with another second member, for example, to achieve different dimensions for the device (particularly different dimensions $l_1$, and $c_p$ and consequently adjust the volume of fluid loaded by the device into nozzles), or simply due to wear and tear experienced by the second member, as well as for use of different materials for the first and second members, e.g., a stiffer material for the first member than for the second member.

The first member and the second member may be made of different materials.

Any, at least one, or all of the first member, the second member, the third member, the fourth member and the fifth member and/or the end members may be made of a material having low chemical reactivity. This advantageously helps to prevent chemical reaction between the surface of the nozzle-bearing body and the device, thus prolonging the working life of the device, as well as to prevent contamination of the fluid.

The end members may be made of a non-abrasive material, such as polytetrafluoroethylene (PTFE), UHMWPE, or nylon. This helps to improve the seal between end members and the nozzle-bearing body.

According to another aspect of the present disclosure, there is provided an assembly for loading fluid, the assembly comprising: a nozzle-bearing body having a body surface defining one or more orifices for receiving fluid into the one or more nozzles; and the device for loading the fluid as described in any of the preceding paragraphs of this disclosure, the device and the nozzle-bearing body assembled into a working configuration in which the device is held proximate to (e.g., the third surface of the device being pressed, such as mechanically pressed, against the nozzle-bearing body) the nozzle-bearing body such that the second member of the device protrudes toward the body surface of the nozzle-bearing body and the first surface of the device and the body surface of the nozzle-bearing body form an opening for receiving the fluid, wherein, in the working configuration, the nozzle-bearing body is movable relative to the device in a direction from the opening toward the second surface of the device such that a gap formed between the first surface and the body surface and a gap formed between the third surface and the body surface remain substantially constant, thereby allowing the device to at least partially load the one or more nozzles with fluid received via the opening.

The above assembly generates, within the pocket, higher fluid pressures than are generated by the assembly of FIG. 1. This higher pressure enables the above assembly to fill nozzles with fluids of higher viscosity and with greater volume than the assembly of FIG. 1 provides. By maintaining the gaps substantially constant, a selected pressure profile can be achieved and maintained, facilitating a more constant nozzle-filling volume or depth. Further, the assembly also advantageously allows a wide range of fluid viscosities to fill nozzles under conditions of laminar or near-laminar flow, which improves control and repeatability of the filling process.

According to another aspect of the present disclosure, there is provided a method for loading fluid into one or more nozzles of a nozzle-bearing body using the device for loading fluid as described in any of the preceding paragraphs of this disclosure, the nozzle-bearing body having a body surface defining one or more orifices for receiving fluid into the one or more nozzles, the method comprising: while holding the device in the working configuration, proximate to the nozzle-bearing body such that the second member protrudes toward the body surface of the nozzle-bearing body, and the first surface of the first member and the surface of the nozzle-bearing body form an opening for receiving the fluid: supplying the fluid to the surface of the nozzle-bearing body, and moving the nozzle-bearing body relative to the device in a direction from the opening toward the second surface while maintaining a gap formed between the first surface and the body surface and a gap formed between the third surface and the body surface substantially constant to load the fluid into the one or more nozzles.

In the above-described device, assembly, and method, the following relation may be satisfied: $c_1 \gg 3V_n/A_n$, where: $c_1$ denotes the gap between the body surface and the first surface, $1/A_n$ refers to the number of nozzles per unit area in the region of the nozzle bearing body opposite the fluid filled region of the first surface, and $V_n$ denotes a desired volume of a fluid for loading into a fluid-contacted nozzle. Advantageously, enforcing this relation helps to avoid a starvation condition in which there is too little fluid within the device to fill the nozzles to the desired extent. This in turn helps maintaining the volume of fluid with which the nozzles are loaded with fluid (or filling depth) substantially constant.

In the above-described device, assembly, and method, the following relation may also be satisfied: $c_2 < c_p$, where: $c_p$ denotes an extent to which the third surface protrudes from the first surface, and $c_2$ denotes the gap formed between the body surface and the third surface of the device. This relation advantageously helps to reduce leakage of the fluid through the gap $c_2$ past the device.

Furthermore, the following relation may be satisfied: $c_2 \ll c_p$. This relation advantageously helps to further reduce leakage of the fluid past the device through the gap $c_2$.

In the above-described device, assembly, and method, the following relation may also be satisfied: $(c^3/l_2) \ll (c_1^3/l_1)$, where: $l_1$ denotes a fluid-contacted length of the first surface measured along the first surface in the direction between the opening for receiving fluid and the second surface, $l_2$ denotes a dimension along the third surface measured from the second surface to the end of the device furthest from the opening for receiving fluid, $c_1$ denotes the gap between the body surface and the first surface, and $c_2$ denotes the gap between the body surface and the third surface. Advantageously, enforcing of the above relation helps to minimize and prevent leakage of the fluid past the device through the gap $c_2$.

In the above-described device, assembly, and method, the device, its part(s), or at least its first member may be made from a thermally conductive material capable to withstand temperatures up to 250 degrees centigrade, and the device, its part(s), or the at least first member respectively may be maintained at a controlled temperature in a range of ambient to 250 degrees centigrade while loading the fluid into the one or more nozzles. Advantageously, this enables use of the device with materials that become fluid only at elevated temperatures, such as hot melt adhesives.

The technical advantages described above with reference to various features of the assembly similarly are provided by the corresponding features of the above described method.

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The following detailed description refers to the accompanying drawings. Wherever possible, the same reference numbers are used in the drawings and the following description to refer to the same or similar parts. While several illustrative embodiments and aspects are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments, aspects, and examples. Instead, the proper scope is defined by the appended claims.

The present disclosure generally relates to dispensing of flowable materials and describes a device, assembly, and method for loading nozzles of a nozzle-bearing material body with fluid. In the context of this disclosure, the term 'fluid' encompasses any flowable material, such as those materials whose constituent parts or sub-volumes are capable of relative motion, and includes, but not limited to, pure liquids, liquid solutions, suspensions, emulsions, gels, waxes, adhesives, hot melt adhesives, varnishes, primers, etchants, etch resists, encapsulants, liquid electronic materials, inks, pigment inks, dye based inks, latex solutions, latex suspensions, chocolate, mayonnaise, ketchup, liquid chocolate, biological fluids such as cell suspensions and pharmaceutical solutions, suspensions, creams, pastes and gels, and other flowable materials.

Throughout this disclosure, a 'nozzle' shall be understood to include a conduit that extends between two orifices in the surface or surfaces (often opposing surfaces) of a material body; a 'nozzle-bearing body' or simply 'body' shall be understood to include a material body in which there is at least one nozzle; and 'filling' or 'loading' of nozzle(s) shall be understood to include partial filling/loading of the nozzle (s) with fluid or liquid. Throughout this disclosure, 'substantially parallel' shall be understood to include small deviations from a parallel relationship of 20 degrees or less, while 'substantially concentric' shall be understood to include small deviations from concentricity such that the tangents to the cylindrical surface of the nozzle-bearing body and the upstream surface taken where they meet a common radial vector originating at the axis of the cylindrical material body shall form a small acute angle of 20 degrees or less.

Throughout this disclosure, a surface (area or portion of the surface) 'complementing' another surface (area or portion of the surface) or being 'complementary' to another surface (area or portion of the surface) shall be understood that such surfaces can be positioned in such a way that they form a uniform gap between them across the full surface area of the smaller of those surfaces, or either of the surfaces if the surfaces are of the same size. Throughout this disclosure, a surface (area or portion of the surface) 'substantially complementing' another surface (area or portion of the surface) or being 'substantially complementary' to another surface (area or portion of the surface) shall be understood that, such surfaces can be positioned in such a way that any gap formed between them across the full surface area of the smaller of those surfaces, or either of the surfaces if the surfaces are of the same size varies by no more than $c_p$ (the extent to which the protruding surface of the device protrudes from first surface of the first member of the device—discussed below in greater detail, for example, with reference to FIGS. 3 to 7).

Figure 3:
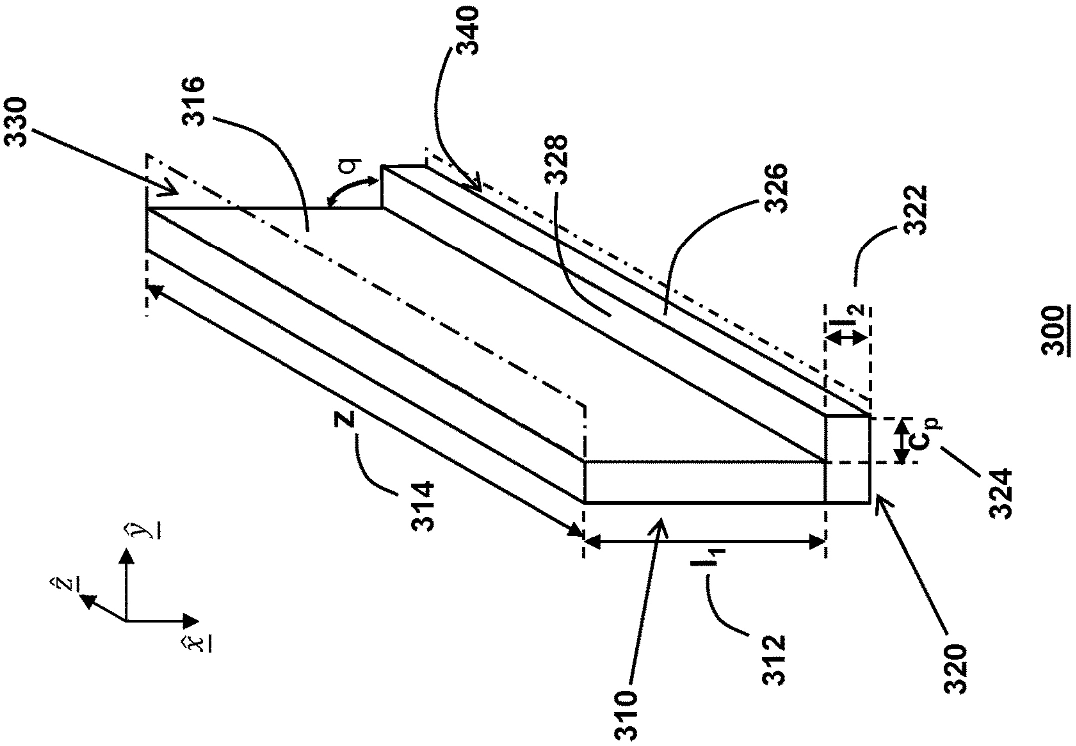
FIG. 3 depicts an example of a device for loading fluid into nozzle(s) of a nozzle-bearing body.

FIG. 3 depicts schematically an example of a device 300 for loading fluid into nozzle(s) of a nozzle-bearing body having a body surface defining orifice(s) for receiving the fluid into the one or more nozzles, in accordance with principles and techniques of this disclosure. Cartesian coordinates (x, y, z) are used with corresponding unit vectors in the directions of increasing distance from the origin shown in FIG. 3 as $\underline{\hat{x}}$, $\underline{\hat{y}}$ and $\underline{\hat{z}}$ respectively. The device 300 of FIG. 3 is particularly suitable to load fluid into nozzle(s) of a planar nozzle-bearing body. For ease of explanation only, the device is described with reference to such directions $\underline{\hat{x}}$, $\underline{\hat{y}}$ and $\underline{\hat{z}}$.

The device 300 (may also be referred to as a guide, fluid supply guide, filler, fluid filler, loader, or fluid loader) includes two members 310 and 320. The first member 310 (may also be also referred to as a first body part) defines a first surface 316 approximately in the ($\underline{\hat{x}}$, $\underline{\hat{z}}$) plane. The second member 320 (may also be referred to as a second body part) defines a third surface 326 approximately in the ($\underline{\hat{x}}$, $\underline{\hat{z}}$) plane and a second surface 328 (may also be referred to as a protruding surface) approximately in the ($\underline{\hat{y}}$, $\underline{\hat{z}}$) plane. The first and second members 310 and 320 are connected such that the second surface 328 of the second member protrudes or extends from the first surface 316 of the first member 310. The second surface 328 and the first surface 316 form an interior angle θ.

Throughout this disclosure, the first and third surfaces may also be referred to as the upstream and downstream surfaces respectively. This reflects positioning of the surfaces in relation to the supply of fluid onto the surface of the nozzle-bearing body when the device and the nozzle-bearing body are assembled into a working configuration (discussed below in greater detail). Therefore, the terms 'first surface' and 'upstream surface' may be used interchangeably in relation to any of variations of the device for loading fluid described in this disclosure. Similarly, the terms 'third surface' and 'downstream surface' may be used interchangeably in relation to any of variations of the device for loading fluid described in this disclosure.

In FIG. 3, the first, upstream surface 316 and the second, protruding surface 328 form an interior angle θ of approximately 90 degrees, thus creating an L-shaped cross-sectional profile. However, as discussed below in greater detail, that cross-sectional profile may vary. For example, the interior θ angle may be anywhere in the range from 20 degrees to 160 degrees, or in the range from 60 degrees to 120 degrees, or in the range from 80 degrees to 100 degrees.

In the device 300, the upstream surface 316 and the downstream surface 326 are substantially parallel. Further, the upstream surface 316 is also configured to be substantially parallel to the body surface of a planar nozzle-bearing body when the device 300 and the nozzle-bearing body (not shown in FIG. 3) are assembled into a working configuration for loading the nozzles of the nozzle-bearing body with fluid, as for example, shown in FIG. 5. In the context of this disclosure, 'substantially parallel' shall be understood to include a parallel relationship, as well as at an acute angle of lesser than or equal to 20 degrees.

In the working configuration, the device 300 is positioned and held proximate to the nozzle-bearing body (e.g., mechanically pressed against the nozzle-bearing body) such that the second member 320 protrudes toward the body surface of the nozzle-bearing body. In such a configuration, the upstream surface 316 of the device 300 and the body surface of the nozzle-bearing body form an opening 330 for receiving fluid to be loaded into the nozzles of the nozzle-bearing body via respective orifices. A small gap may also be formed between the downstream surface 326 and the body surface of the nozzle-bearing body. In such configurations, this gap ends in a terminal gap 340 at the furthest end of the downstream surface 326 from the opening 330. While the working configuration is in use, at least the upstream surface 316, the protruding surface 328, and the body surface of the nozzle-bearing body come in contact with the fluid. In most practical configurations a small gap is formed between the downstream surface 326 and the body surface of the nozzle-bearing body and downstream surface 326 also comes into contact with the fluid.

The device 300 has fluid-loading width z, which is measured in direction $\underline{\hat{z}}$ along the first member 310.The height (may also be referred to as 'protrusion height') $c_p$ of the second member 320—the maximum extension of the protruding surface 328 perpendicular to the upstream surface 316—is measured in direction $\underline{\hat{y}}$. The length of the downstream surface 326, $l_2$, is measured in direction $\underline{\hat{x}}$. The length of the upstream surface 316 that is contacted by fluid, $l_1$, while the device 300 is in use in the working configuration, is also measured in direction $\underline{\hat{x}}$. The particular device 300 of FIG. 3 has overall length $l_1+l_2$ in direction $\underline{\hat{x}}$.

In this disclosure, for simplicity but without limitation, only the case in which the entire length of the upstream surface is contacted by fluid is described in detail. Therefore in FIG. 3, and subsequently, $l_1$ is used to denote that entire length of the upstream surface. However, similar principles and relations to those described in this disclosure would apply to scenarios where the fluid does not contact the upstream surface for its entire length. In such scenarios, in relations and formulations described in this disclosure, $l_1$ would represent the length of the upstream surface 316 contacted by fluid, also referred to as a 'fluid-contacted length' of the upstream or first surface.

As shown in FIG. 3, the first member 310 and second member 320 are two separate parts (components) of the device 300, where the first member 310 is attached (by any of several means known to those skilled in the art) to the second member 320 to form an extension as the protruding surface 328 of the second member 320. However, alternatively, the second member 320 could be attached to the upstream surface of the first member 310 to form an extension as a protruding surface. Further, although in FIG. 3, the first and second members 310 and 320 are shown as being permanently attached to each other, a detachable mount may be used instead. For example, the second member 320 may be slidably mounted on the first member 310, or vice versa. By such means, the dimensions $c_p$ and $l_1$ may be made adjustable to suit the needs of a particular application.

The first and second members 310 and 320 may be made of the same or different materials. For example, the second member 320 may be made of a non-abrasive material, such as polytetrafluoroethylene (PTFE), nylon, or ultra-high molecular weight polyethylene (UHMWPE). Using a non-abrasive material reduces wear and tear on the body surface of the nozzle-bearing body, thereby extending its usable life.

The first member and/or the second member may be made of a material having low chemical reactivity. Using materials having low chemical reactivity helps to prevent chemical reaction between the surface of the nozzle-bearing body and the device, thus prolonging the working life of the device, as well as to prevent contamination of the fluid.

The first member may be made of an engineering material, such as aluminium, brass, stainless steel, polytetrafluoroethylene (PTFE), polyether ether ketone (PEEK), nylon, carbon fibre composite, ultra-high molecular weight polyethylene (UHMWPE), or polyimide.

In some example implementations, the first member 310 and second member 320 form a unitary body, made of the same material, such as polytetrafluoroethylene (PTFE).

Figure 4:
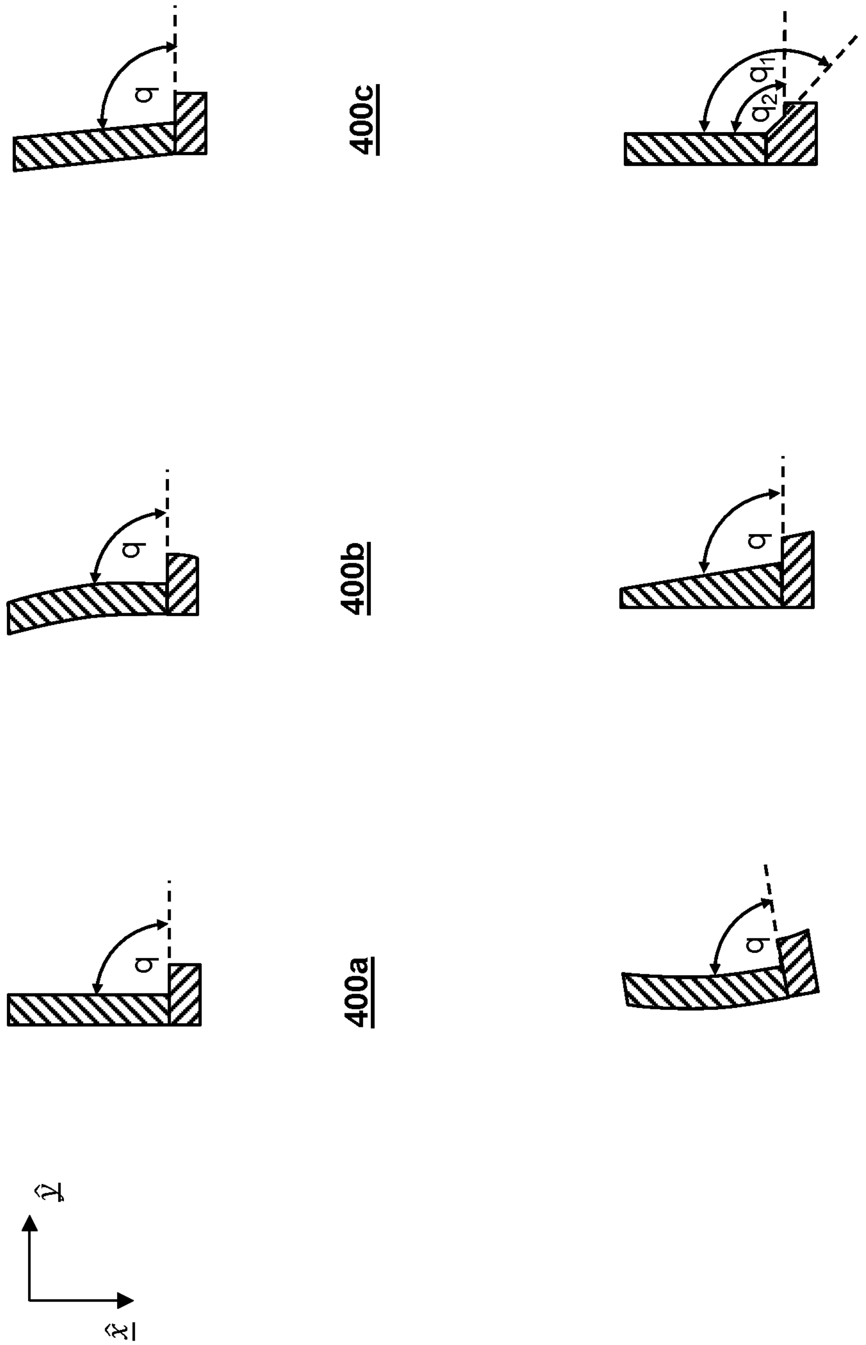
FIG. 4 depicts examples of cross-sectional profiles for different geometries of devices for loading fluid into nozzle (s) of a nozzle-bearing body.

FIG. 4 depicts examples of cross-sectional profiles of different devices suitable for loading fluid into nozzle(s) of a nozzle-bearing body in accordance with principles and techniques described in this disclosure. All the example profiles shown in FIG. 4 are used to load nozzles of a nozzle-bearing body when the corresponding nozzles are on the right-hand side of the device in its illustrated orientation.

As explained above, the protruding surface of the second member, such as the protruding surface 328 in FIG. 3, and the upstream surface of the first member, such as the upstream surface 316 in FIG. 3, form an interior angle in the range from 20 degrees to 160 degrees. In FIG. 4, this angle is shown as angle θ in each of the profiles 400*a* to 400*e*.

In some example implementations, the interior angle is in the range from 60 degrees to 120 degrees, or in the range from 80 degrees to 100 degrees. Starting from the lower end of the range, increasing the angle to at least 60 degrees, or to at least 80 degrees helps to prevent formation of a region of stagnant fluid between the upstream surface of the first member and the protruding surface of the second member. If left unattended, such stagnant fluid may dry out and clog up the device. Starting from the upper end of the degree range, by decreasing the angle to at least 120 degrees, or to at least 100 degrees, a more constant nozzle-filling volume/depth can be achieved. An angle of about 90 degrees, such as in a profile 400*a,* balances these considerations.

The L-shaped cross-sectional profile 400*a* is a cross-sectional profile of the device 300 shown in FIG. 3 along direction $\underline{\hat{z}}$ and is formed by the upstream surface 316 and the protruding surface 328. The θ angle in the profile 400*a* is approximately or about 90 degrees. This kind of geometry is particularly useful for filling planar nozzle-bearing bodies.

Example profiles 400*b* to 400*f* are variations on the L-shaped profile 400*a.* For example, the profile 400*b* is formed by the upstream surface of the first member which curves away from the protruding surface of the second member. The downstream surface of the second member is concentric to the upstream surface of the first member. This geometry is particularly useful for filling nozzle-bearing bodies in the form of a cylindrical shell from the interior of the cylindrical shell.

The profile 400*c* is formed by the upstream surface of the first member leaning away from the protruding surface of the second member, where the interior and protruding surfaces form an interior angle θ of about 100 degrees. This geometry is also useful for filling planar nozzle-bearing bodies.

The profile 400*d* is formed by the upstream surface of the first member, curving toward the protruding surface of the second member, and the protruding surface of the second member. The downstream surface of the second member is substantially concentric to the upstream surface of the first member. This geometry is particularly useful for filling nozzle-bearing bodies having the form of a cylindrical shell from the exterior of the cylindrical shell Similar to the profile 400*c,* the profile 400*e* is formed by the upstream surface of the first member leaning away from the protruding surface of the second member. The interior and protruding surfaces form an interior angle θ of about 100 degrees. However, unlike in 400*c* where the first member has the same thickness throughout, in 400*d,* the thickness of the first member decreases in the direction away from the second member. The cross-section of the first member therefore has a trapezoidal shape. Furthermore, unlike in 400*c,* where the downstream surface of the second member is substantially parallel to the upstream surface of the first member, in 400*e,* the downstream surface of the second member is parallel to the upstream surface of the first member. This geometry is also useful for filling planar nozzle-bearing bodies.

In the cross-sectional profile 400*f,* the second member has a step and an incline. Such a shape creates two interior angles between the first and second members. The first interior angle is formed between the upstream surface of the first member and the incline portion of the projecting surface of the second member, i.e., angle $\theta_1$. The second angle is formed between the upstream surface of the first member and the step portion of the projecting surface of the second member, i.e., angle $\theta_2$. Both such angles are in the range from 20 degrees to 160 degrees.

The same principle to increasing the lower end of the degree range and decreasing the higher end of the degree range, as discussed above, applies to each of the multiple interior angles formed between the first and second members due to, for example, a complex shape of second member such as shown in the profile 400*f.* The geometry of the profile 400*f* is also useful for filling planar nozzle-bearing bodies.

As explained above and can be seen in FIG. 4, in each of the cross-sectional profiles 400*e* to 400*f,* the upstream surface of the first member is either parallel to the downstream surface of the second member, such as in profiles 400*a,* 400*e,* and 400*f,* concentric or substantially concentric (i.e., allows for deviation of up to 20 degrees between respective tangents) to the downstream surface of the second member, such as in profiles 400*b* and 400*d,* or is substantially parallel (i.e., allows for deviation of up to 20 degrees), such as in profile 400*c*.

With reference to cross-sectional profiles 400*b* and 400*d,* satisfactory operation can be achieved when the upstream surface of the first member is substantially concentric with the cylindrical surface of a nozzle-bearing body. In one example working configuration the device having for example profile 400*d* is positioned exterior and proximate to the outer surface of a cylindrical nozzle-bearing body taking the form of a cylindrical shell whose thickness is penetrated by nozzles from its interior to its downstream surface. In this configuration the upstream surface of the device may be arranged to have concave cylindrical curvature that complements the convex cylindrical curvature of the proximate nozzle-bearing outer surface of the cylindrical shell. In a second example working configuration the device having for example profile 400*b* is positioned interior and proximate to the inner surface of a cylindrical nozzle-bearing body taking the form of a cylindrical shell whose thickness is penetrated by nozzles from its interior to its exterior surface. In this configuration the upstream surface of the device may be arranged to have convex cylindrical curvature that complements the concave cylindrical curvature of the proximate nozzle-bearing inner surface of the cylindrical shell.

In the context of this disclosure, 'substantially concentric' shall be understood to include small deviations from concentricity such that the tangents to the cylindrical surface of the nozzle-bearing body and the upstream surface taken where they meet a common radial vector originating at the axis of the cylindrical material body shall form a small acute angle (less than or equal to 20 degrees). Similarly, 'substantially parallel' shall be understood to include small deviations from parallelism such that the planar surface of the upstream body and the planar surface of the nozzle-bearing body shall form a small acute angle (less than or equal to 20 degrees). Thus, for example, with reference to FIG. 3, the gap between the upstream surface of the first member and the outer body surface of the nozzle-bearing body at the opening 330 could be greater than the gap between the upstream surface of the first member and the outer body surface of the nozzle-bearing body proximate to the protruding surface 328.

Further, satisfactory operation can also be achieved using a device whose downstream surface of the second member is not parallel, substantially parallel, concentric, or substantially concentric to the upstream surface of the first member while the device is not in use. In this scenario, to achieve satisfactory operation of the device, the downstream surface is configured to conform to the surface of the nozzle-bearing body such that, when the device and the nozzle-bearing body are assembled into the working configuration, the downstream surface of the second member becomes parallel, substantially parallel, concentric, or substantially concentric to the surface of the nozzle bearing body, for example, due to the device being pressed against the surface of the nozzle bearing body.

Figure 5:
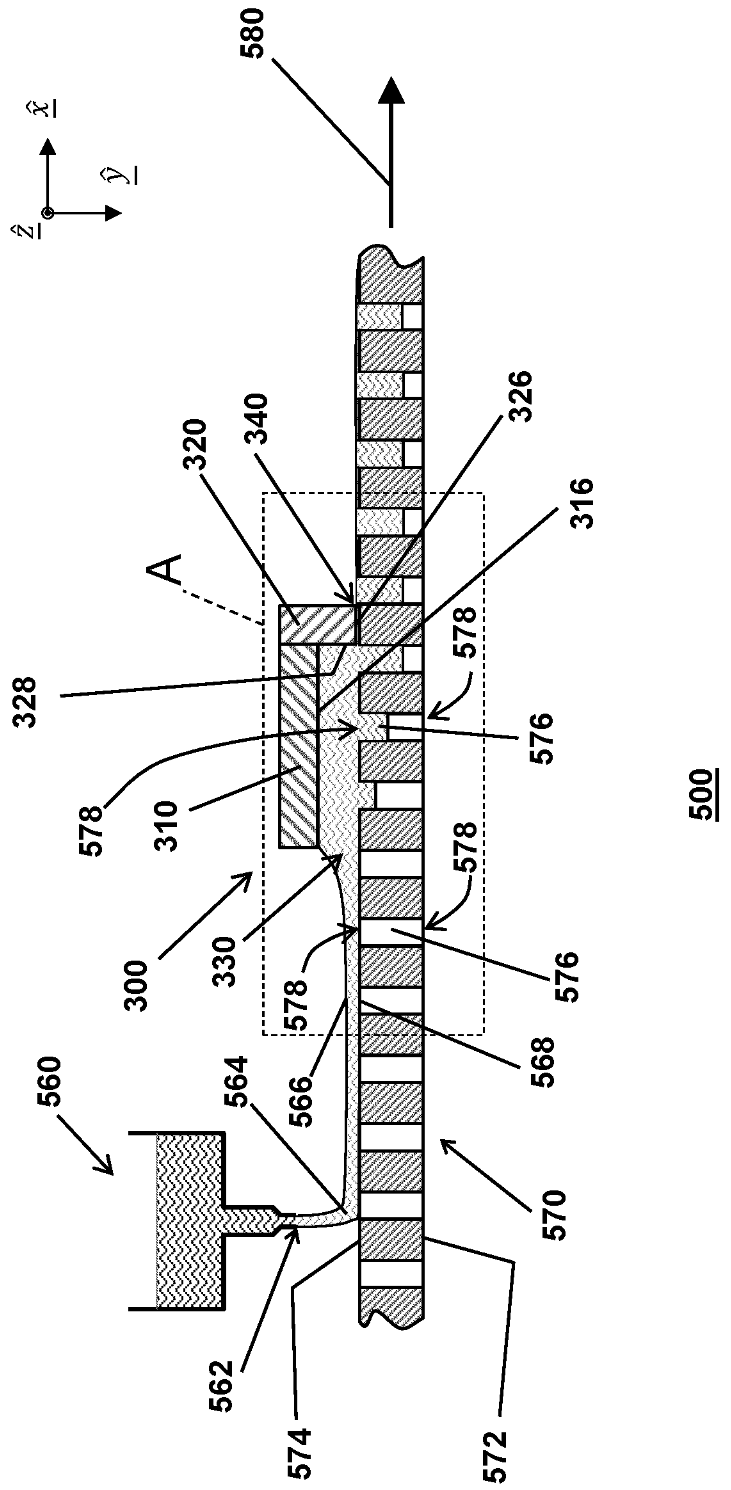
FIG. 5 depicts, in use, a cross-sectional view of an example of an assembly for loading fluid into nozzle(s) of a planar nozzle-bearing body.
Figure 6:
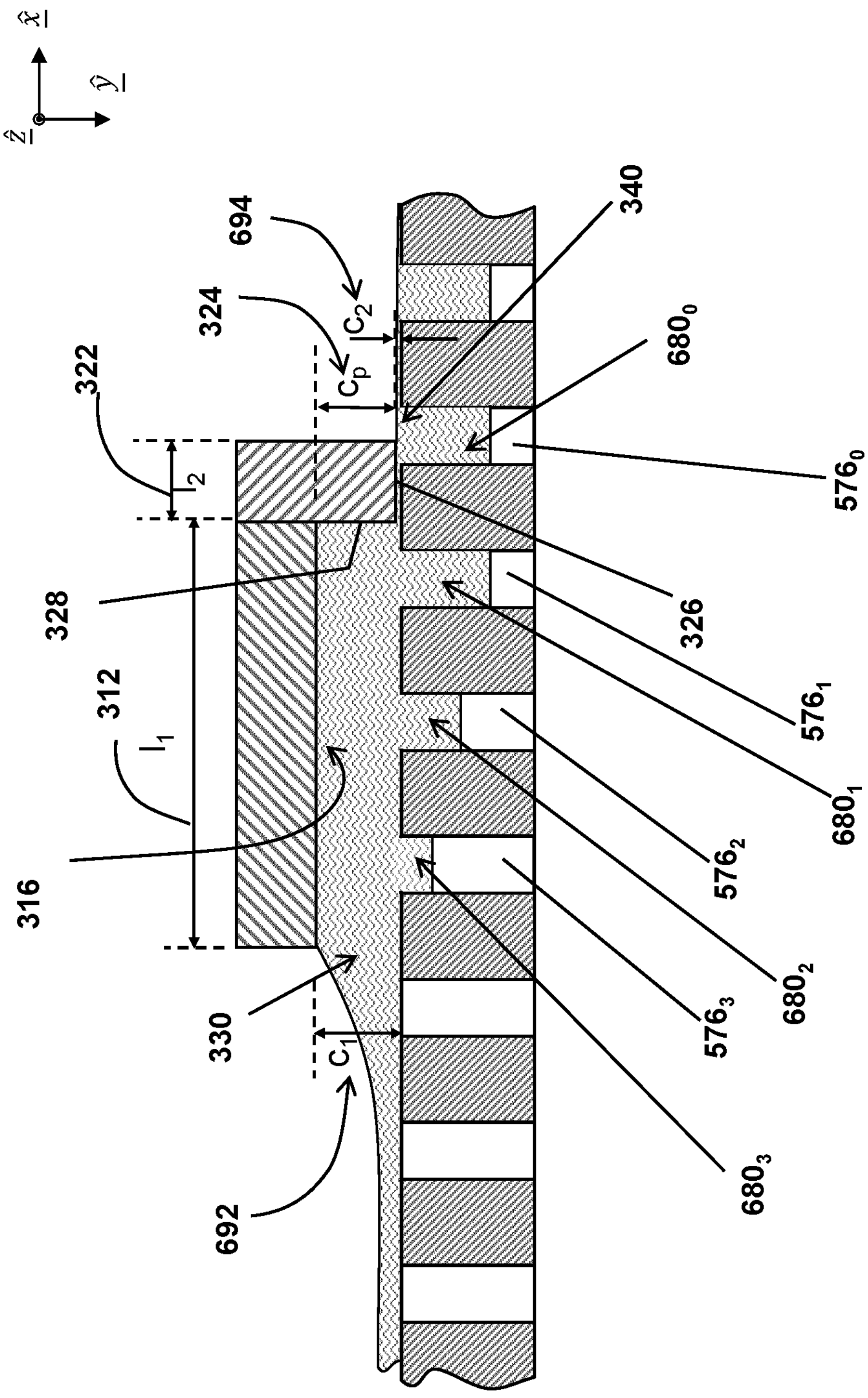
FIG. 6 depicts, in use, a cross-sectional view of a simplified enlargement of region A shown in FIG. 5.

FIGS. 5 and 6 depict schematically an example of the working configuration of an assembly 500 for loading fluid into nozzle(s) 576 extending between orifices 578 in the upper and lower surfaces 574 and 572 respectively of a planar nozzle-bearing body 570 (may also be referred to as a plate) using the device 300 described above with reference to FIG. 3. FIG. 6 depicts a simplified enlargement of the region A illustrated in FIG. 5. Cartesian coordinates (x, y, z) are used with directions $\underline{\hat{x}}$, $\underline{\hat{y}}$and $\underline{\hat{z}}$ denoting increasing distance from the origin in three-dimensional space.

The plate 570 has width $z_p$ in the $\underline{\hat{z}}$ direction, which may be the same as the fluid-loading width z of the device 300 or wider than the fluid-loading width z of the device 300. In the latter scenario, the fluid-loading width z of device 300 should be sufficiently wide to accommodate the width of the portion of the plate containing nozzles that have been selected for loading with fluid. The plate width $z_p$ may also be narrower than the fluid-loading width z of the device 300, although in this scenario, there can be considerable loss of fluid while loading the nozzles.

Generally, the device 300 may be used to load or fill (including partially load or fill) fluid into the nozzle(s) 576 via the orifices 578 in the surface 574 of the plate 570 by arranging for:

- positioning and holding the device 300 such that the downstream surface 326 of the second member 320 is in close proximity to the surface 574 of the plate 570 and that the upstream surface 316 extends substantially parallel to the body surface 574 of the plate 570;
- replenishing supply of fluid to the opening 330 (also referred to as an entrance) of the device 300, such that a gap $c_1$ (shown at 692 in FIG. 6) between the upstream surface 316 and the body surface 574 is filled with fluid where fluid contacts the body surface 574 of the plate 570, the upstream surface 316 of the first member 310 of the device 300, and the protruding surface 328 of the second member of the device 300; and
- relative motion between the device 300 and plate 570 such that:
  - each element of the body surface 574 translates in the direction from the device opening (entrance) 330 toward the device terminal gap 340 shown with dimension $c_2$ at 694 in FIG. 6 formed in use between the downstream surface 326 and the body surface 574, and that motion maintains the gap $c_1$ between the upstream surface 316 and the body surface 574 substantially constant and maintains the gap $c_2<0.5c_1$ and preferably $c_2 \ll c_1$.

In the example of FIGS. 5 and 6, the upstream surface 316 and the downstream surface 326 are parallel to the upper body surface 574 of the plate 570. As shown in FIG. 6, the upstream surface 316 is separated from the nozzle-bearing surface 574 of the plate 570 by the gap $c_1$ (in direction $\underline{\hat{y}}$) along a fluid-contacted arc length $l_1$ (measured along $\underline{\hat{x}}$). The downstream surface 326 is separated from the nozzle-bearing surface of the plate by the gap $c_2$ (in direction $\underline{\hat{y}}$) along an arc length $l_2$ (measured along $\underline{\hat{x}}$).

In FIGS. 5 and 6, due to the parallel relationship between the upstream surface 316, the downstream surface 326, and the body surface 574, the gap $c_1$ and gap $c_2$ are uniform. However, if the upstream surface 316 and/or the downstream surface 326 are only substantially parallel to the body surface 574, the gap $c_1$ and/or gap $c_2$ respectively would not be uniform, but substantially uniform. In these scenarios, $c_1$ and $c_2$ vary with position x along the upstream and downstream surfaces, becoming $c_1(x)$ and $c_2(x)$. In such cases, defining x=0 at the opening 330 of the device so that $x=l_1$ at the protruding surface 328 and $x=l_1+l_2$ at the terminal gap 340, it is found effective to replace $c_1$ and $c_2$ by $c_{1eff}$ and $c_{2eff}$ where $C_{1eff}$ and $c_{2eff}$ are defined by $$\frac{1}{c_{1eff}} = \frac{1}{l_1}\int_0^{l_1} \frac{dx}{c_1(x)} \text{ and } \frac{1}{c_{2eff}} = \frac{1}{l_2}\int_{l_1}^{l_1+l_2} \frac{dx}{c_2(x)}$$

respectively. Those skilled in the art will appreciate that analogous relations apply to the case of the cylindrical geometry discussed below, for example with reference to FIGS. 7 and 8, and discern such conditions.

As shown in FIG. 5, replenishing supply of fluid upstream of the device 300 is provided by outpouring fluid 564 from a fluid supply tank 560 via a slit exit 562 extending substantially parallel to the upper surface 574 of the plate 570 along direction $\underline{\hat{z}}$ onto that upper surface 574. The exit aperture of the slit exit 562 may be selected to achieve a desired rate at which the fluid is to be supplied. The rate may be further controlled by a valve (not shown).

Translation of the plate 570 in direction $\underline{\hat{x}}$, shown by arrow 580, provides relative motion between the plate 570 and the stationary device 300. This motion transforms the supplied fluid 564 into a fluid layer on the upper surface 574 of the plate 570 and carries the fluid 564 to the device 300. In the area between the point at which the plate 570 receives the fluid 564 and the entrance 330 into the device 300, the surfaces 566 and 568 of the fluid 564 contact the ambient atmosphere. Therefore, in this region the fluid is at closely ambient pressure, and thus only gravitational forces and surface energy differences between the fluid 564 and material surface of nozzles 576 provide forces that encourage fluid 564 to enter the nozzles 576 through the orifices 578 in the upper surface 574 of the plate 570. For fluids of high viscosity (typically $100.10^{-3}$ Pa·s to $1000.10^{-3}$ Pa·s), such as industrial coatings, paints, toothpaste, hot melt glue, and epoxy resins, and nozzles having cross-sectional dimensions between 0.1 mm and 2 mm, these forces are generally too weak to cause significant filling of the nozzles 576 in timescales of 0.1 second or less, which timescales are typical in production processes for the deposition of fluids upon substrates.

The dimensions $c_p$, $l_1$ and $c_2$ are chosen such that when the translation brings the supplied fluid 564 through the entrance 330, the viscous forces opposing fluid flow in the nozzles and in the gap $c_2$ enable fluid 564 to be supplied at a rate sufficient to fill the gap $c_1$. Under these conditions, the fluid 564 is in contact with the upper body surface 574 of the plate 570, the upstream surface 316 along the length $l_1$, and the protruding surface 328 of the device 300. Due to the presence of the protruding surface 328, the viscosity of the fluid 564, and the relative motion between the upstream surface 316 of the device 300 and the upper surface 574 of the plate 570, the fluid 564 experiences shear forces that cause the fluid pressure within the gap $c_1$ to increase in the direction from the entrance 330 toward the protruding surface 328. In general, the fluid 564 will also be in contact with the downstream surface 326 in the gap $c_2$ along length $l_2$ and in this case the fluid pressure decreases in the gap $c_2$ in the direction from the protruding surface 328 to the terminal gap 340, whereupon any exiting film of fluid again experiences ambient pressure.

The fluid pressure generally reaches a maximum near the point where the upstream surface 316 ends and the protruding surface 328 begins. Due to the flow into the nozzles 576, the pressure profile will be somewhat perturbed, and the maximum may not be precisely at the point where the upstream surface 316 meets the protruding surface 328. Nonetheless, there is a profile in direction $\underline{\hat{x}}$ of positive pressure difference between the fluid 564 within the device 300 and the ambient pressure that exists immediately outside the fluid menisci in the nozzles 576. This pressure profile causes the fluid 564 to flow into the nozzles 576, displacing those menisci to load the nozzles with fluid, as the nozzles 576 translate past the device 300. FIG. 6 illustrates the progress of such a process where the nozzle $\mathbf{576_3}$ has the lowest volume of fluid $\mathbf{680_3}$ loaded into the nozzle among the nozzles $\mathbf{576_3}$, $\mathbf{576_2}$, and $\mathbf{576_1}$ within the device 300 and the nozzle $\mathbf{576_1}$ has the highest volume of fluid $\mathbf{680_1}$ loaded into the nozzle among the nozzles $\mathbf{576_3}$, $\mathbf{576_2}$, and $\mathbf{576_1}$, closely approaching a desired volume of fluid $\mathbf{680_0}$, such as shown in the nozzle $\mathbf{576_0}$, which in FIG. 6 is emerging from the underside of the device 300.

Some of the fluid 564 may flow out through the terminal gap 340. It is however generally desirable to keep to a practical minimum such discharge of fluid through the terminal gap 340 since this 'excess fluid' does not carry the pattern of nozzles that is ultimately desired to be deposited upon a final substrate.

The dimensions $l_1$, $l_2$, and $c_p$, and the 'close proximity' gap $c_2$ in the working configuration of the device for loading fluid, such as the device 300, may be selected to provide profiles of fluid pressure suitable for filling nozzles that extend between orifices in opposing surfaces of a material body. In particular, these dimensions may be chosen to meet the following conditions:

(i) the shear-generated pressure profile along the length $l_1$ of the upstream surface 316 provides a continuous loading/filling action of the nozzles 576 as the nozzles 576 are transported in direction 580;

(ii) much less filling of the nozzles 576 occurs as they transport past the length $l_2$ of the downstream surface 326 than their loading/filling resulting from their transport past the length $l_1$ of the upstream surface 316; and (iii) the flow of 'excess liquid' through the terminal gap 340 is kept to a practical minimum.

Figure 7:
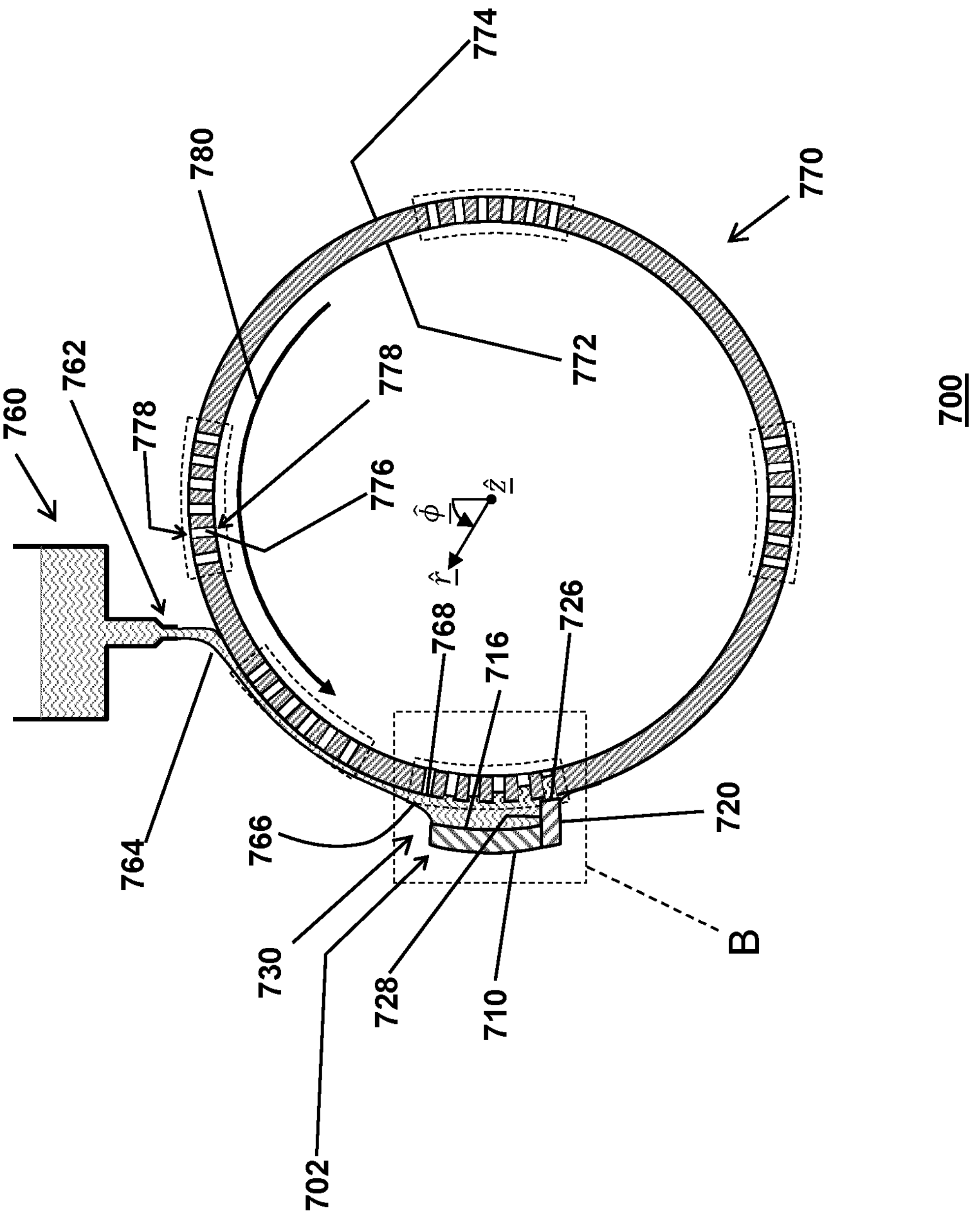
FIG. 7 depicts, in use, a cross-sectional view of an example of an assembly for loading fluid into nozzle(s) of a cylindrical nozzle-bearing body.
Figure 8:
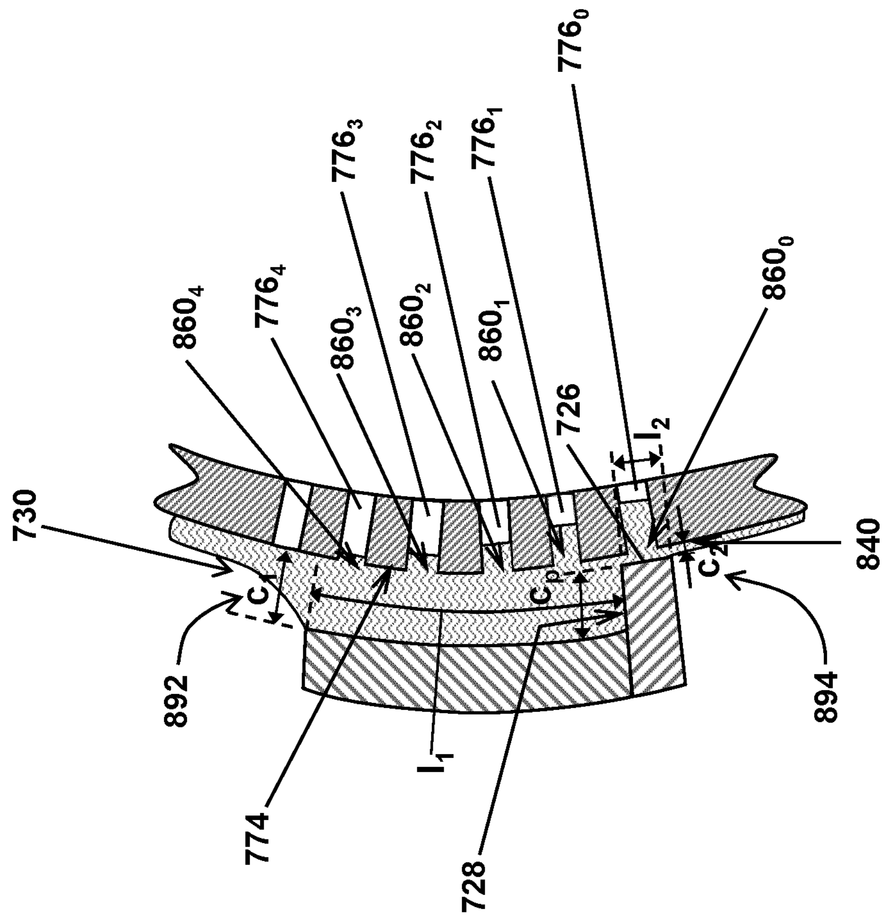
FIG. 8 depicts, in use, a simplified enlargement of region B shown in FIG. 7.

FIGS. 7 and 8 depict schematically an example of a working configuration of an assembly 700 for loading fluid into nozzle(s) 776 extending between orifices 778 in the upper and lower surfaces 774 and 772 of a cylindrical nozzle-bearing body 770 (also referred to as a cylinder, a roller, a drum, or a cylindrical shell) using a device 702 for loading fluid into nozzle(s). FIG. 8 depicts a simplified enlargement of the region B illustrated in FIG. 7.

For this geometry, cylindrical coordinates (r, ϕ, z) are used with corresponding unit vectors in the directions of increasing radial distance r, circumferential angle ϕ and axial distance z shown as $\hat{\underline{r}}$, $\hat{\underline{\phi}}$, $\hat{\underline{z}}$ respectively. The cylindrical body 770 has width $z_c$ in the $\hat{\underline{z}}$ direction, which may be the same as the fluid-loading width z of the device 702 measured axially or wider than the fluid-loading width z of the device 702 measured axially. In the latter scenario, the fluid-loading width z of the device 702 should be sufficient to accommodate the width of the portion of the nozzle-bearing surface 774 containing nozzles 776 that have been selected for loading with fluid. The cylinder width $z_c$ may also be narrower than the fluid-loading width z of the device 702, although in this scenario, there may be considerable loss of fluid while loading the nozzles 776.

The device 702 is generally similar to the device 300 and is subject to the similar principles, although its shapes and dimension are adapted to cooperate with the cylindrical nozzle-bearing body 770 as explained below. In particular, the device 702 may be used to load, including partially load, fluid into nozzles 776 that terminate in orifices 778 in a cylindrical body surface 774 of the body 770 by arranging for:

- positioning and holding the device 702 such that a downstream surface 726 of a second member 720 of the device 702 is in close proximity to the body surface 774 of the cylindrical nozzle-bearing body 770;
- an upstream surface 716 to extend substantially concentric with the cylindrical surface 774;
- replenishing supply of fluid 764 to an opening (entrance) 730 such that a gap $c_1$ (shown at 892 in FIG. 8) measured radially between the upstream surface 716 of the device 702 and the cylindrical body surface 774 is filled with fluid where fluid contacts the cylindrical body surface 774 of the body 770, the upstream surface 716 of the first member 710 of the device 702, and the protruding surface 728 of the second member 720 of the device 702; and
- relative motion between the device 702 and the body 770 such that:
  - each element of that cylindrical body surface 774 rotates about the axis of that cylindrical body in the circumferential direction $\hat{\underline{\phi}}$ shown at 780 from the device entrance 730 toward the terminal gap 840 shown with dimension $c_2$ (measured radially) at 894 formed in use the between the downstream surface 726 of the device 702 and the body surface 774 of the body 770, and
  - that motion maintains the gap $c_1$ (measured radially) between the upstream surface 716 and the body surface 774 substantially constant and maintains the gap measured radially between the downstream surface 726 and the body surface 774 such that $c_2<0.5c_1$, and preferably $c_2 \ll c_1$.

The upstream surface 716 and the downstream surface 726 are, in this example, concentric with the outer cylindrical surface 774 of the cylindrical body 770. As shown in FIG. 8, the upstream surface 716 is separated from the outer cylindrical surface 774 of the body 770 by the gap $c_1$ (measured radially) along fluid-contacted arc length $l_1$ (measured circumferentially). The downstream surface 726 is separated from the outer cylindrical surface 774 of the body 770 by the gap $c_2$ (measured radially) along arc length $l_2$ (measured circumferentially).

As shown in FIG. 7, replenishing supply of fluid upstream of the device 702 is provided by outpouring fluid 764 from a fluid supply tank 760 from a slit exit 762 extending substantially parallel to $\hat{\underline{z}}$ onto the outer cylindrical surface 774 of the body 770. The aperture of the slit exit 762 may be selected to achieve a desired rate at which the fluid is to be supplied. The rate may be further controlled by a valve (not shown).

Rotation of the body 770 in circumferential direction $\hat{\underline{\phi}}$ shown at 780 provides relative motion between the outer cylindrical surface 774 and the stationary device 702. This motion transforms the supplied fluid into a fluid layer on the outer cylindrical surface 774 and carries the fluid 764 to the device 702.

Similar to the plate scenario described with reference to FIGS. 5 and 6, in the area between where the cylindrical body 770 receives the fluid 764 and the entrance 730 into the device 702, surfaces 766 and 768 of the fluid 764 contact the ambient atmosphere and thus are at closely ambient pressure. Consequently, in this area, only gravitational forces and surface energy differences between the fluid 764 and material surface of nozzles 776 provide forces that encourage the fluid 764 to enter the nozzles 776 through the respective orifices 778 in the outer cylindrical surface 774 of the body 770. For fluids of high viscosity (again, typically $100.10^{-3}$ Pa·s to $1000.10^{-3}$ Pa·s), such as industrial coatings, paints, toothpaste, hot melt adhesive, and epoxy resins, and nozzles having cross-sectional dimensions between 0.1 mm and 2 mm, these forces are generally too weak for significant filling of the nozzles 776 in timescales of 0.1 second or less, which timescales are typical in production processes for the deposition of fluids upon substrates.

The dimensions $c_p$, $l_1$ and $c_2$ are chosen such that when the rotation 780 of the cylindrical body 770 brings the supplied fluid 764 through the entrance 730, the viscous forces opposing fluid flow in the nozzles and in the gap $c_2$ enable fluid 764 to be supplied at a rate sufficient to fill the gap $c_2$. Under these conditions, the fluid 764 is in contact with the upper body surface 774 of the cylindrical body 770, the upstream surface 716 along the length $l_1$, and the protruding surface 728 of the device 702. Due to the presence of the protruding surface 728, the viscosity of the fluid 764, and the relative rotational motion between the upstream surface 716 of the device 702 and the upper surface 774 of the cylindrical body 770, the fluid 764 experiences shear forces that cause the fluid pressure within the gap $c_1$ to increase in the direction from the entrance 730 to the protruding surface 728. In general, the fluid 764 will also be in contact with the downstream surface 726 in the gap $c_2$ along length $l_2$ and in this case the fluid pressure within the gap $c_2$ decreases in the direction from the protruding surface 728 to the terminal gap 740, whereupon any exiting film of fluid again experiences ambient pressure.

The fluid pressure generally reaches a maximum near the point where the upstream surface 716 ends and the protruding surface 728 begins. Due to the flow into the nozzles 776, the pressure profile will be somewhat perturbed, and the maximum may not be precisely at the point where the upstream surface 716 meets the protruding surface 728. Nonetheless, there is a profile in the circumferential direction $\hat{\underline{\phi}}$ of positive pressure difference between the fluid 764 within the device 702 and the ambient pressure that exists immediately outside the fluid menisci in the nozzles 776. This pressure profile causes the fluid 764 to flow into the nozzles 776, displacing those menisci to load the nozzles with fluid, as the nozzles 776 are transported past the device 702.

FIG. 8 illustrates the progress of such a process. A nozzle $776_4$ has the lowest volume $860_4$ of fluid loaded into the nozzle among nozzles $776_4$, $776_3$, $776_2$, and $776_1$ of the device 702. The nozzle $776_1$ has the highest volume $880_1$ of fluid loaded into the nozzle among the nozzles $776_4$, $776_3$, $776_2$, and $776_1$ of the device 702, closely approaching a desired volume of fluid $860_0$, such as in the nozzle $776_0$, which in FIG. 8 is about to emerge from the device 702.

Some of the fluid 764 may flow out through the terminal gap 840. It is however generally desirable to keep to a practical minimum such discharge of fluid through the terminal gap 840 since this 'excess fluid' does not carry the pattern of nozzles that is ultimately desired to be deposited upon a final substrate.

Moving onto design and operating conditions to provide effective filling of nozzles while minimising the flow of 'excess liquid' through the terminal gap, these are described for the cylindrical geometry described with reference to FIGS. 7 and 8. The person skilled in the art however would readily discern, based on such disclosures, the equivalent conditions for the planar geometry described with reference to FIGS. 5 and 6.

The dimensions $l_1$, $l_2$, and $c_p$, and the 'close proximity' gap $c_2$ in the working configuration of the device for loading fluid, such as the device 702, are selected to fill (including partially fill) nozzles that extend between orifices in opposing surfaces of a material body with the desired volume of fluid. In particular, these dimensions may be chosen to:

(i) provide a continuous loading/filling action of the nozzles 776 as the nozzles 776 are transported in the circumferential direction $\hat{\phi}$ (also shown as direction 780) past the circumferential arc length $l_1$ of the upstream surface 716;

(ii) ensure that any filling of the nozzles 776 as the nozzles 776 transport past the circumferential arc length $l_2$ of the downstream surface 726 is much less than their loading/filling as they transport past the circumferential arc length $l_1$ of the upstream surface 716; and (iii) keep the flow of 'excess liquid' through the terminal gap 840 to a practical minimum.

With reference to FIGS. 7 and 8, the gap $c_1$ measured radially and the fluid-loading width z measured axially define the dimensions of the entrance 730 of the device 702. Therefore, the entrance 730 may admit fluid through an aperture of area $c_1z$. The gap $c_2$ measured radially and the fluid-loading width z measured axially define the dimensions of the terminal gap 840. Therefore, the terminal gap 840 may allow fluid to leak out through an aperture of area $c_2z$. To reduce leakage of fluid through the terminal gap 840, $c_1$ and $c_2$ should be selected such that $c_2<0.5c_1$. Selecting $c_1$ and $c_2$ such that $c_2 \ll c_1$ further reduces leakage of fluid through the terminal gap 840.

For example, if $c_2$ is selected such that $c_2<0.5c_1$, i.e., $c_1>2c_2$ then, since $c_1=c_2+c_p$, $c_2$ satisfies the condition $c_2<c_p$ along circumferential arc length $l_2$ and, possibly, $c_2 \ll c_p$. The condition $c_2<c_p$ defines the 'close proximity' positioning of the device to the nozzle-bearing body in the working configuration as described throughout this disclosure. Satisfying this condition helps to meet conditions (ii) and (iii) above.

An example practical implementation for meeting the above conditions in the assembly 700 includes, in the absence of fluid supply, positioning the device to press the downstream surface 726 of the device 702 against the body surface 774 of the nozzle-bearing body 770 and holding the device 702 in this position. For example, the device can be mechanically pressed against the body surface 774, such as spring held. With no fluid supplied, $c_2=0$. In this implementation, once the fluid 764 is supplied, $c_2$ may rise above 0 due only to a very thin lubricating film of fluid between the downstream surface 726 and the body surface 774. The condition $c_2<c_p$ and, furthermore, the condition $c_2 \ll c_p$, are therefore easily met, the latter ensuring that the condition $c_2 \ll c_1$ is met. In this manner, both the contribution to nozzle loading past the downstream surface 726 of the second member 720 and to excess flow of fluid through the terminal gap 840 is reduced.

More generally and as discussed above, the upstream surface 716 and the downstream surface 726 do not need to be perfectly concentric with the fluid-contacted outer surface 774 of the cylindrical shell 770. Rather, they need to be 'substantially concentric' as defined above. In such cases, satisfying the condition $c_2<c_p$ everywhere along the circumferential arc length $l_2$ ensures the device 702 is in 'close proximity' to the nozzle-bearing body 770.

As described above, the fluid pressure within the gap $c_1$ is rising along the fluid-contacted circumferential arc length $l_1$ (in the direction from the entrance 730 toward the protruding surface 728) across the fluid-loading width z of the device. As the upstream surface 716 and the body surface 774 substantially complement each other and oppose each other in the working configuration, a fluid-contacted area of the nozzle-bearing body over which the fluid pressure rises, when the device is in use, $A_d$, can be approximated as $A_d \approx l_1 z$. Let the pattern of nozzle orifices on the surface of the nozzle-bearing body be such that there are n nozzles within that fluid-contacted area $A_d$. Then, the area of the body surface over which the fluid pressure rises (i.e. the area of the body surface complementing the fluid-contacted area of the upstream surface along the fluid-contacted circumferential arc length) per fluid-contacted nozzle is $A_d/n$. This area is denoted as $A_n$, i.e., $A_n=A_d/n \approx l_1 z/n$. Consequently $1/A_n$ is the number of nozzles per unit area in the region of the nozzle bearing body opposite the fluid filled region of the first surface.

In many practical applications $n \gg 1$ so that $A_n \ll A_d$. In such cases it is particularly advantageous to operate the assembly 700 under the following further conditions:

(i) the upstream surface 716 and the downstream surface 726 are arranged to be concentric with the outer cylindrical surface 774;

(ii) the protruding surface 728 is arranged to be substantially perpendicular to the tangent to the upstream surface 716 in the region that it meets the upstream surface 716 and substantially perpendicular to the tangent to the downstream surface 726 in the region that it meets the downstream surface 726;

(iii) the operating gap $c_1$ is chosen such that $c_1 \gg 3V_n/A_n$ where $V_n$ denotes the desired volume of fluid to be loaded into each fluid-contacted nozzle, (iv) the circumferential arc length $l_1$ is chosen according to the selected value of $c_1$, the nozzle dimensions and the desired volume $V_n$ of fluid to be loaded into each fluid-contacted nozzle. For example, in the case of a circular nozzle of constant diameter $d_n$ throughout its length for a wide range of fluids $l_1$ may be chosen to satisfy the relation $$l_1 \cong \left(\frac{16}{\pi\sqrt{3}}\right)\left(\frac{V_n}{d_n^3}\right)c_1,$$

(v) the dimension $c_p$ of the device 702 is chosen such that $c_2$ (which is determined by $c_2=c_1-c_p$) satisfies the relation $c_2<c_p$ and preferably satisfies $c_2 \ll c_p$, and (vi) the circumferential arc length $l_2$ is chosen such that the relation $(c_2^3/l_2) \ll (c_1^3/l_1)$ is satisfied.

Those skilled in the art will readily discern, based on such disclosures, the equivalent conditions for the planar geometry described with reference to FIGS. 3 and 4. Those skilled in the art will similarly recognize the need, when the upstream surface 716 and/or the downstream surface 726 are only substantially concentric to the body surface 774, to replace the values of $c_1$ and $c_2$ in the above relations by analogues adapted to the cylindrical geometry of $c_{1eff}$ and $c_{2eff}$ as already described with reference to FIG. 5 and FIG. 6 for a planar geometry.

It has been found that, if values of $c_p$, and $l_1$ meeting conditions (iii), (iv) and (v) above can be found that provide a ratio $l_1/c_p>1$ and preferably $l_1/c_p>>1$ then the present device can provide consistent fluid 'filling' for a wide variety of fluids and operating conditions.

One experimental device according to the present disclosure was created to load fluid into the nozzles of a nozzle-bearing body in the form of a cylindrical shell, via orifices in the outer surface of the shell. The shell thickness was 2 mm and the nozzles were arranged in an array pattern penetrated through its thickness. Each nozzle length was therefore 2 mm and each nozzle had a circular cross-section diameter $d_n$=0.5 mm throughout that length. Each nozzle volume was therefore able to accommodate a maximum volume of 0.39 mm$^3$ without overfilling.

The device was designed to load a volume $V_n$=0.33 mm$^3$ of fluid into that array of nozzles, which were spaced apart in a regular pattern such that $A_n$=6.9 mm$^2$ . Consequently condition (iii) above required $c_1 \gg 3V_n/A_n$=143 μm and condition (iv) above required $l_1 \approx 7.7c_1$. $l_1$ and $c_1$ were selected correspondingly as $l_1$=10 mm and $c_1$=1.3 mm. To meet the stricter of the relations in (v) above, namely $c_2 \ll c_p$, $c_p$ has been selected as $c_p$=1.2 mm, giving $c_2=c_1-c_p$=100 μm$\ll c_p$ as required. The desirable ratio $l_1/c_p \gg 1$ was also therefore met. The value of $l_2$ was then chosen to satisfy (vi) using the now-determined values of $c_1$, $c_2$, and $l_1$, requiring $l_2 \gg 5$ μm. $l_2$ was selected as $l_2$=3.1 mm, meeting this condition.

The device was constructed with the overall geometry as described with reference to FIG. 16 with the local geometry (profile) 400*d* as shown in FIG. 4. The value of θ was selected to be θ=90°. The value of A was selected to be Δ=188.4°. The overall dimensions of the device were 50 mm in the circumferential direction, 10.4 mm in the radial direction and 260 mm in the axial direction. This included the end members in the form of end plates. The end plates had the same curvature as the outer surface of the cylindrical shell. Each end plate was 5 mm wide and 15 mm high and so the contact area of each end plate with the cylindrical shell was 75 mm$^2$. The device was oriented such that the upstream and downstream surfaces were closely concentric with the outer surface of the cylindrical shell. In this orientation the device was pressed against the cylindrical shell with a force of 160N N such that the downstream surface conformed to the outer surface of the cylindrical shell and the end-plates made an effective seal against leakage from the sides of the device. The device was operated such that the full length of the first surface was contacted by the fluid. It was operated with fluids of viscosity in the range 1000.10$^{-3}$ Pa·s to 2000.10$^{-3}$ Pa·s. The cylindrical shell was rotated about its axis to produce a relative motional speed between the cylindrical shell and the device in the range 0.4 m/s to 4 m/s. The 'filling time' for each nozzle therefore ranged between 25 ms and 2.4 ms. Under these conditions the device operated satisfactorily to provide the required fill volume $V_n \approx$0.33 mm$^3$ into the nozzles.

As in the above example, it should be noted that if the condition $c_2 \ll c_1$ is met, then it is generally not necessary for $l_2>l_1$ in order to satisfy the condition $(c_{hu\ 3}/l_2) \ll (c_1^3/l_1)$. In practical implementation, it is often convenient for the device to be designed such that $l_2<l_1$.

Under the above conditions (i)-(vi), the filling/loading of nozzles with fluid during their passage past length $l_2$ of the device 702 becomes much less than their filling/loading during their passage past length $l_1$. Further, under these conditions and for a wide range of liquid viscosities, the total volume of fluid that enters the nozzles is substantially constant. This means that the total volume entering each nozzle becomes:

closely proportional to $(l_1/c_1)=l_1/(c_2+c_p) \approx l_1/c_p$ when $c_2 \ll c_p$; and substantially independent of fluid viscosity of the fluid 764 or the cylinder rotation rate of the body 770.

This in turn means that the 'fill volume' $V_n$ of the nozzles can be simply adjusted by the dimensions $l_1$ and $c_p$ of just the device itself, with little sensitivity to many other parameters, including the precise value of gap $c_2$. This gives particular benefits when printing according to the techniques disclosed in WO 2017/141034 A1 since it allows the bolus volume of fluid ultimately deposited from each nozzle onto final substrates to be substantially constant despite viscosity changes of the fluid due, for example, to variations in operating temperature, and substantially constant irrespective of precise value of operating gap $c_2$. In the case of planar geometry, such as the assembly described with reference to FIGS. 3 to 5, the 'substantial concentricity' condition (i) above may be replaced by an equivalent preference for substantial parallelism between the upstream surface 316, downstream surface 326, and body surface 574 of the planar material body 570.

Figure 9:
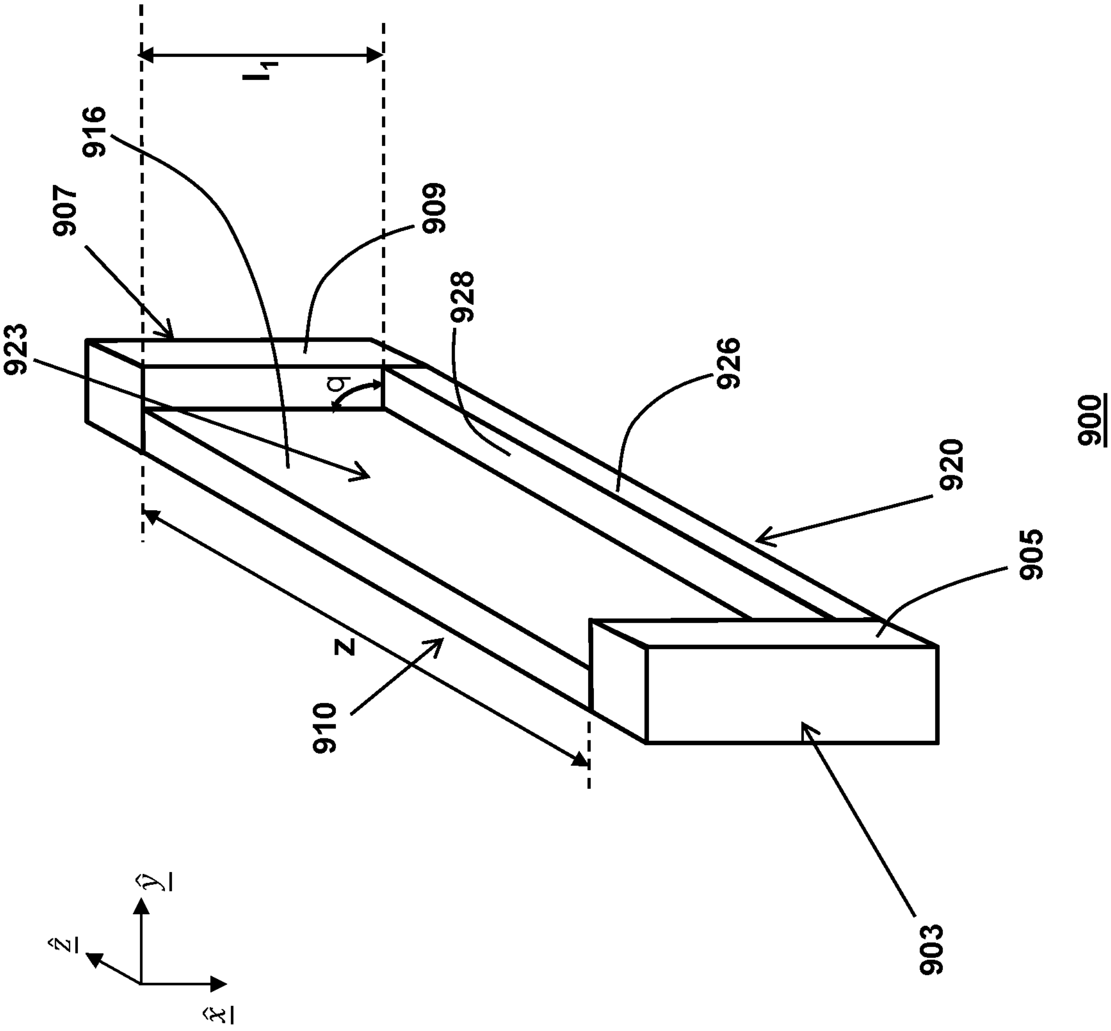
FIG. 9 depicts an example of a device with side members for loading fluid into nozzle(s) of a planar nozzle-bearing body.

FIG. 9 depicts another example of a device 900 for loading fluid into nozzle(s) of a nozzle-bearing body. The device 900 is generally similar to the device 300 described with reference to FIG. 3 and includes a first member 910 connected to a second member 920, where the first member defines a first, upstream surface 916 and the second member 920 defines a second, protruding surface 928 extending from the upstream surface 916 at an interior angle θ and a third, downstream surface 926, substantially parallel to the upstream surface 916. Unlike the device 300, the device 900 also includes a third member 903 (may also be referred to as a first side member) connected to (e.g., extending from or attached to) the first member 910 and the second member 920 and the fourth member 907 (may also be referred to as a second side member) connected to (e.g., extending from or attached to) the first member 910 and the second member 920 opposite the first side member 903. The side members 903 and 907 together with the upstream surface 916 and the protruding surface 928 form or define, within the device 900, a recess 923 of width (the fluid-loading width) z and length $l_1$ configured to form a pocket for receiving fluid when the device 900 is in the working configuration, as for example, described above with reference to the device 300 and FIGS. 5 and 6. In particular, the recess 923 is configured, e.g., shaped, such that when the device 900 is assembled into a working configuration by being placed or pressed against the nozzle-bearing body, a pocket is formed, i.e., a receptacle capable of holding fluid received therein, which is formed by the recess 923 and the nozzle-bearing body.

The first and second side members 903 and 907 respectively have a fourth surface 905 and a fifth surface 909. When the device is in use, in the working configuration, the surfaces 905 and 909 face the body surface of the nozzle-bearing body. As shown in FIG. 9, the surfaces 905 and 909 may connect to the downstream surface 926 on the opposite sides of the device to form a single surface, which in use is held against the body surface of the nozzle bearing body. That is, at least a portion of the surface 905 and at least a portion of the surface 909 extend from the opposite sides of the downstream surface 926 to form with the downstream surface 926 a single surface configured to conform to the body surface of the nozzle-bearing body when the device is in the working configuration. In some example implementations, such as those intended for use with a body having a planar nozzle-bearing surface, but not limited to, the surfaces 905 and 909 are substantially parallel with the upstream surface 916 and the body surface of the nozzle-bearing body.

Using the side members configuration of the device 900 in a device for loading fluid facilitates decreased loss of the fluid from the sides of the device as the device is moved relative to the nozzle-bearing body, as well as facilitates a consistent fluid pressure across the fluid-loading width z of the device, thereby improving consistency of the filling depth/volume of the nozzles.

Figure 10:
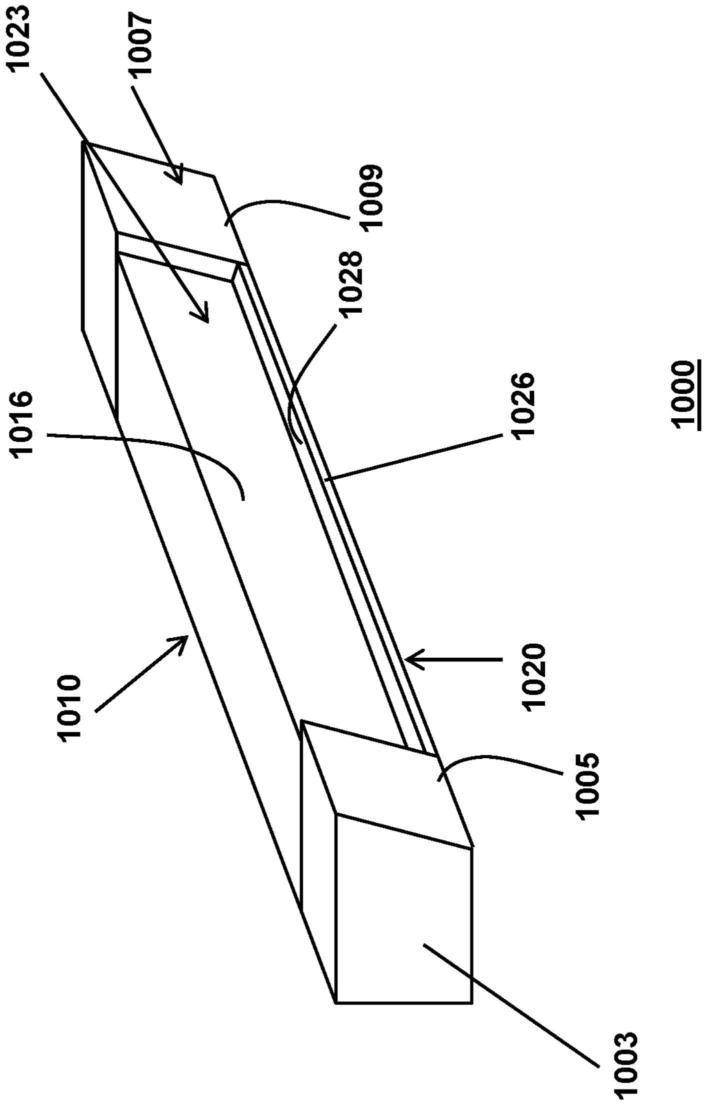
FIG. 10 depicts another example of a device for loading fluid into nozzle(s) of a planar nozzle-bearing body.

FIG. 10 depicts another example of a device with side members for loading fluid into nozzle(s) of a nozzle-bearing body. In particular, a device 1000 includes a first member 1010, a second member 1020, and side members 1003 and 1007 that together form a unitary body of the device. A recess 1023 is formed or defined by the side members 1003 and 1007, an upstream surface 1016 of the first member 1010 and a protruding surface 1028 of the second member 1020 and configured to form a pocket when the device is in a working configuration with a nozzle-bearing body. Similar to the device 900, a surface 1005 of the side member 1003 and a surface 1009 of the side member 1007 extend from the opposite sides of a downstream surface 1026 of the second member 1020 to form, with the downstream surface 1026, a single surface configured to conform to the body surface when the device is in the working configuration.

Figure 11A:
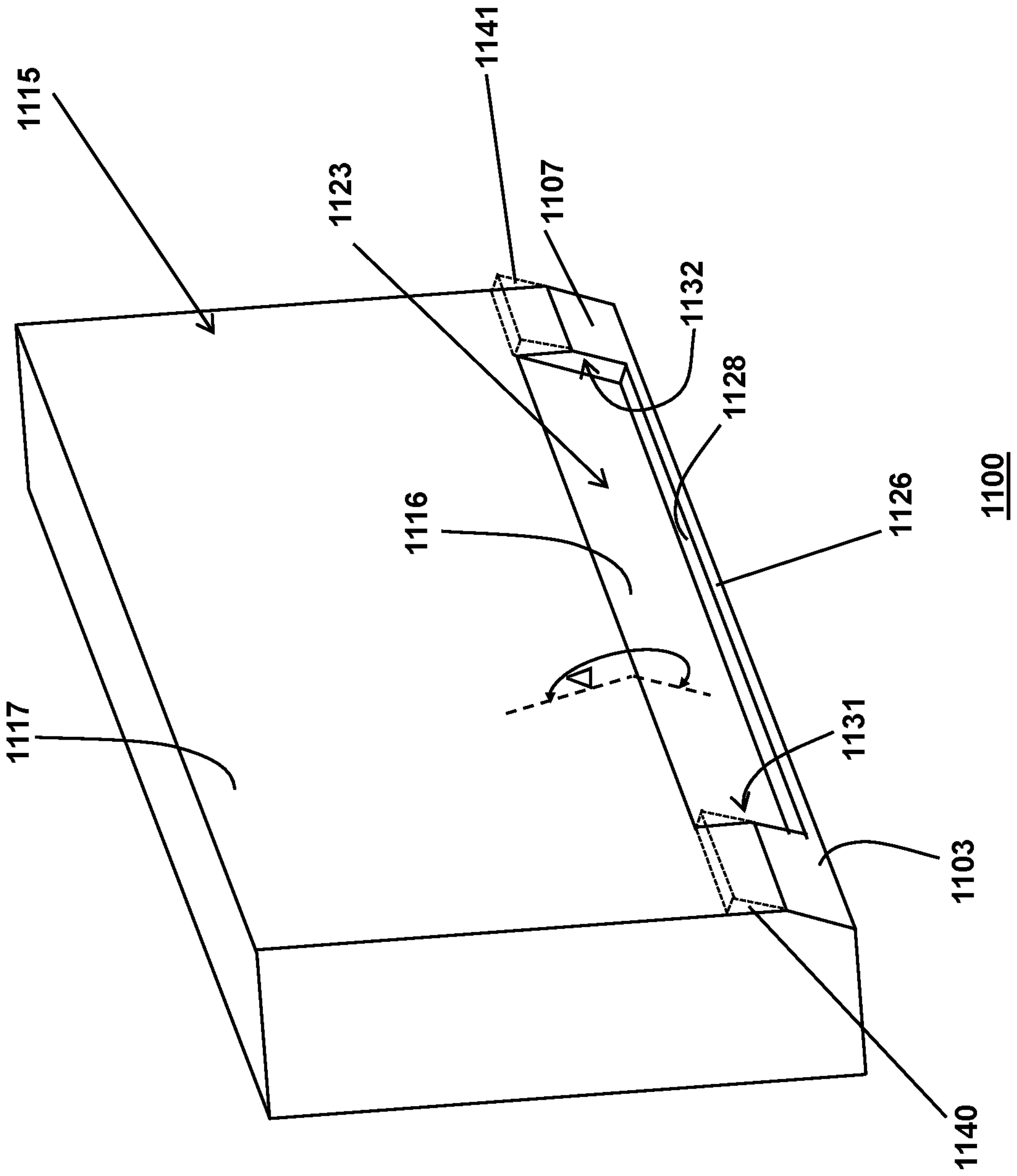
FIGS. 11A and 11B depict examples of a device for loading fluid into nozzle(s) of a planar nozzle-bearing body and configured to form a funnel with the nozzle-bearing body when assembled into a working configuration.

FIG. 11A depicts another example of a device for loading fluid into nozzles of a nozzle-bearing body. FIG. 11A schematically shows a device 1100 manufactured by the inventors for experimental testing. Unlike the device 1000 of FIG. 10, the device 1100 is made from a single block of material (in this case high-density PTFE) and further includes a funnel member 1115 having sixth surface 1117 (may also be referred to as a funnel surface) intersecting with upstream surface 1116 of the device at an angle Δ.

Figure 12:
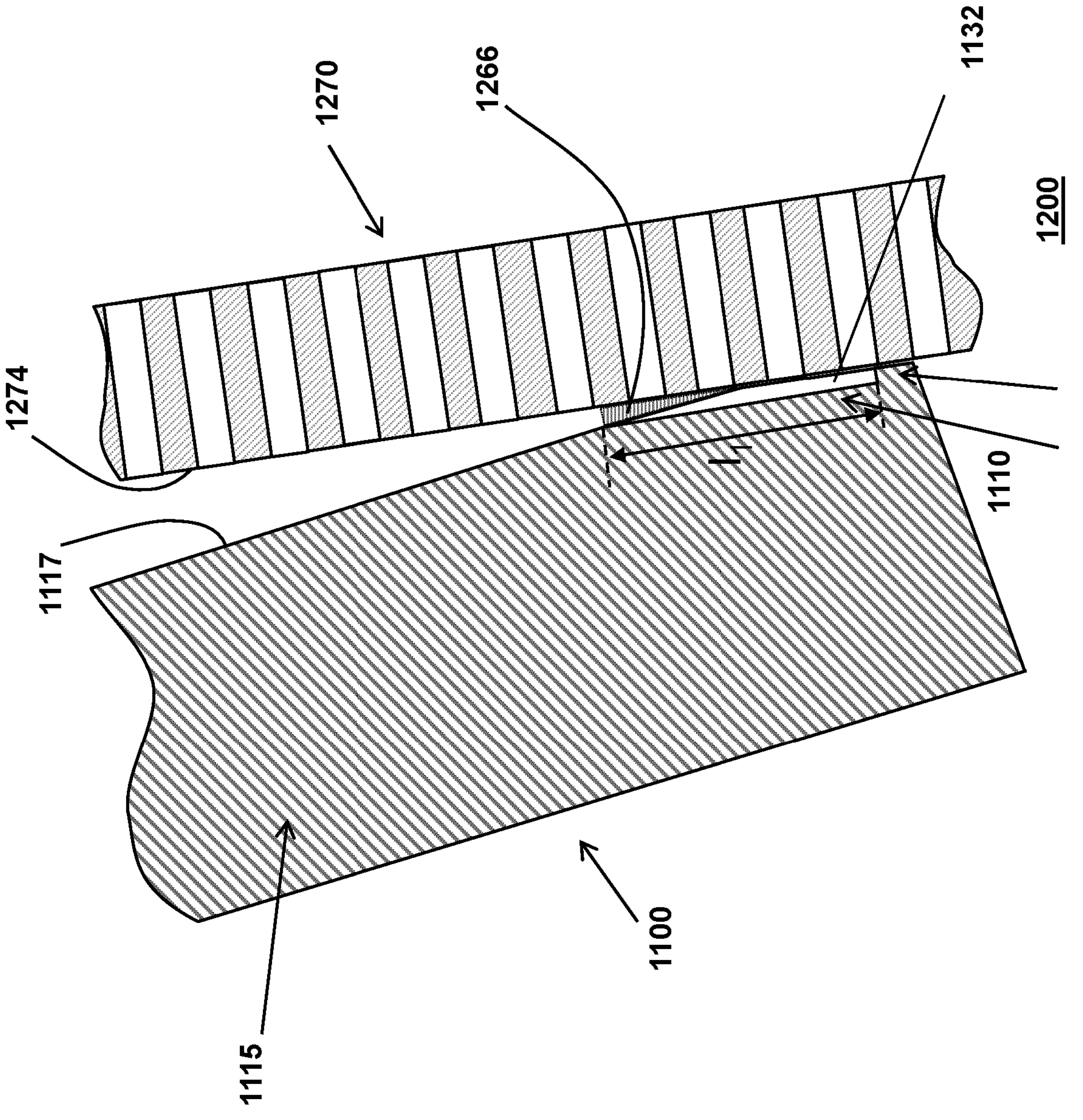
FIG. 12 depicts an enlarged cross-sectional view of part of the device in FIG. 11A assembled into a working configuration with a planar nozzle-bearing body.

The angle Δ formed between the upstream surface 1116 and the funnel surface 1117 is in a range from 185 degrees to 265 degrees, preferably in a range from 200 to 250 degrees, such that, when the device is assembled into a working configuration with the nozzle bearing body, a funnel is formed between the funnel surface 1117 of the device 1100 and the body surface of the nozzle bearing body for collecting excess fluid supplied to the nozzle-bearing body. This funnel can be seen in FIG. 12, which depicts an enlarged cross-sectional view of an assembly including the device 1100 having the funnel member 1115 for preventing overflowing of the device 1100 with fluid when the device 1100 is loading fluid into nozzles of a nozzle-bearing body 1270 formed as an integral part of the device. As can be seen in FIG. 12, a funnel is formed between a funnel surface 1117 and a body surface 1274 for collecting fluid. This helps to prevent overflowing of the device 1100 with fluid.

With reference to FIG. 11A, the funnel surface 1117 also intersects with the surfaces 1103 and 1107 that extend from the opposite sides of the downstream surface 1126 and form with the downstream surface 1126 a single surface configured to conform to the body surface when the device is in the working configuration, e.g., placed or pressed against the nozzle-bearing body. In this example device, the intersection of the funnel surface 1117 with the surfaces 1103 and 1107 occurs closer to the protruding surface 1128 than its intersection with the upstream surface 1116. This means that, in the working configuration, side surfaces 1131 and 1132 do not have full depth along the full length $l_1$ (shown in FIG. 12) of a recess 1123 but their depth instead reduces to zero where the upstream surface 1116 intersects with the funnel surface 1117. In use, in the working configuration, this may allow for leakage of fluid from the pocket formed by the recess 1123 and the nozzle-bearing body 1270 (which would occur in a region shown as 1266 in FIG. 12) from the sides of the device through the approximately triangular cross-sectional areas shown dotted at 1140 and 1141 in FIG. 11A.

However, in experimental implementations, for devices in which that the fluid-contacted length $l_1$ was much smaller than the distance between nozzles and an end of the fluid-loading width z of the device this leakage flow did not produce unacceptable variations in the volume with which nozzles in the nozzle-bearing body were filled across the fluid-loading width z. Indeed, this condition may be obtained, and a practical device thereby result, even when the fluid-loading width of the device is the same as the total width of the device (i.e. when surfaces 1103 and 1107 and side surfaces 1131 and 1132 are absent). In such cases, the funnel formed between such a device and the body surface of the nozzle-bearing body still facilitates prevention of overflow of the device with fluid supplied to the nozzle-bearing body.

Figure 15A:
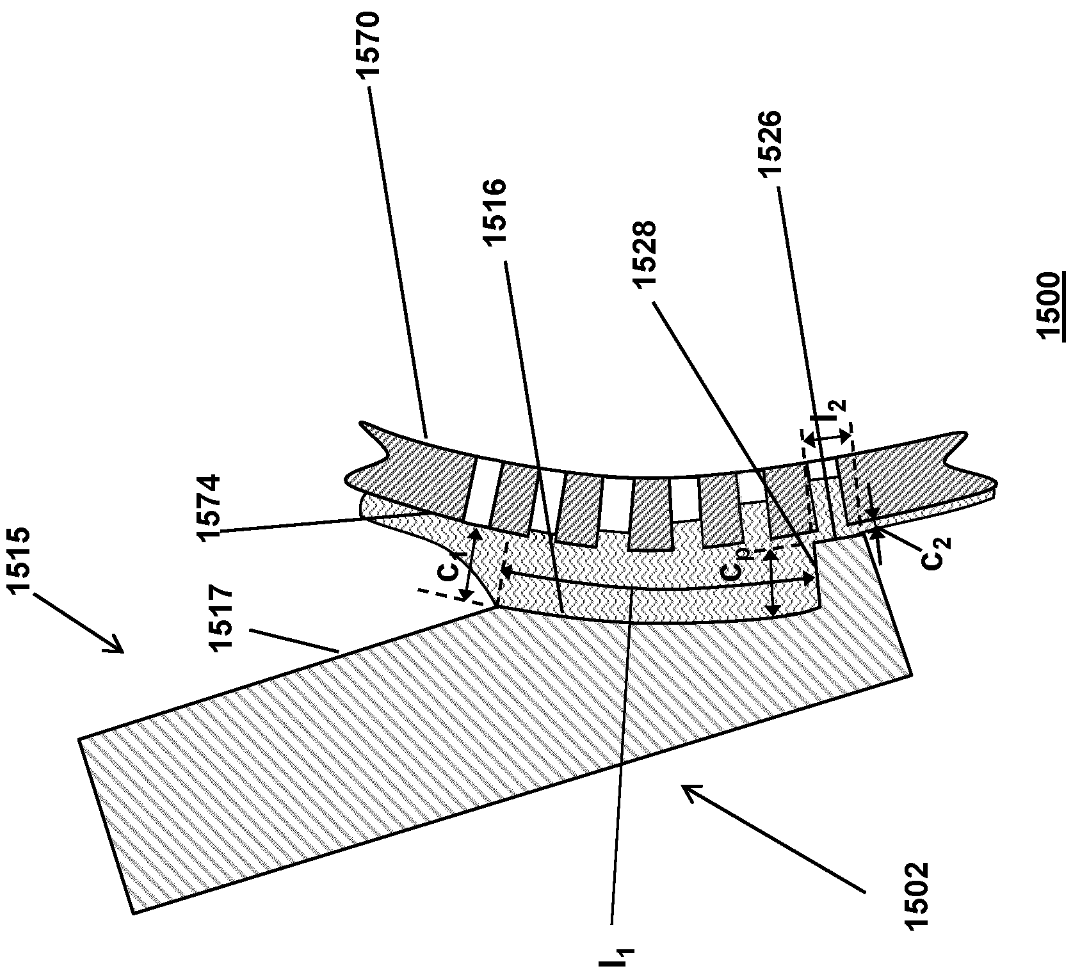
FIGS. 15A and 15B depict, in use, a cross-sectional view of examples of an assembly for loading fluid into nozzle(s) of a cylindrical nozzle-bearing body, where the device for loading fluid forms a funnel together with the cylindrical nozzle-bearing body when assembled into a working configuration.
Figure 15B:
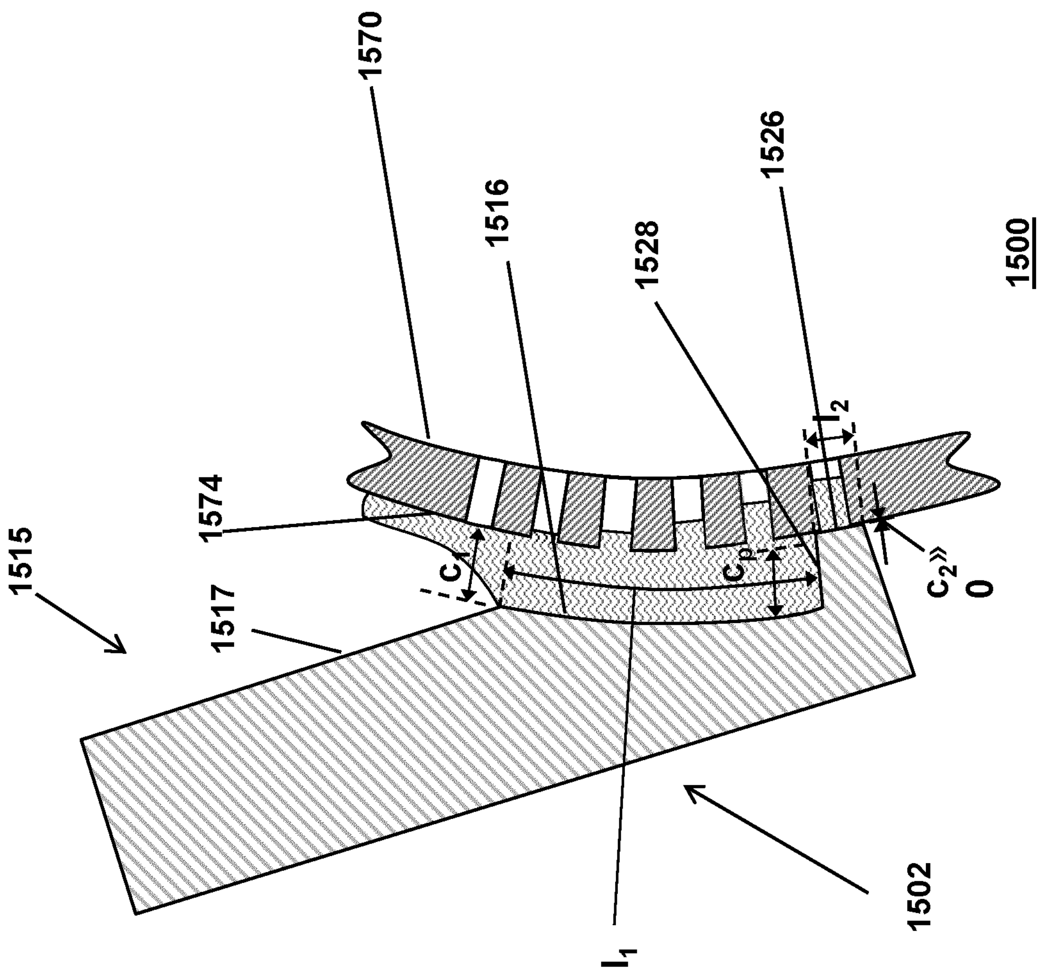

For example, FIGS. 15A and 15B illustrate a cross-sectional view of an assembly 1500, in use with fluid, where the assembly 1500 includes a cylindrical nozzle-bearing body 1570 and a device 1502 for loading fluid. The device 1502 has a funnel member 1515 as an integral part of the device but does not have any side or end members. The assembly 1500 shown in FIG. 15A as providing for a wider ‘close proximity’ gap $c_2$ than in FIG. 15B in which such a gap is shown as tending to zero. By reducing the gap $c_2$, a greater seal between the downstream surface 1526 of the device 1502 and the nozzle-bearing body 1570, such as its surface, is achieved. As can be seen in FIGS. 15A and 15B, a funnel is formed between a funnel surface 1517 and a body surface 1574 for collecting excess of fluid supplied to the body surface 1574. This helps to prevent overflowing of the device 1502 with fluid.

Figure 11B:
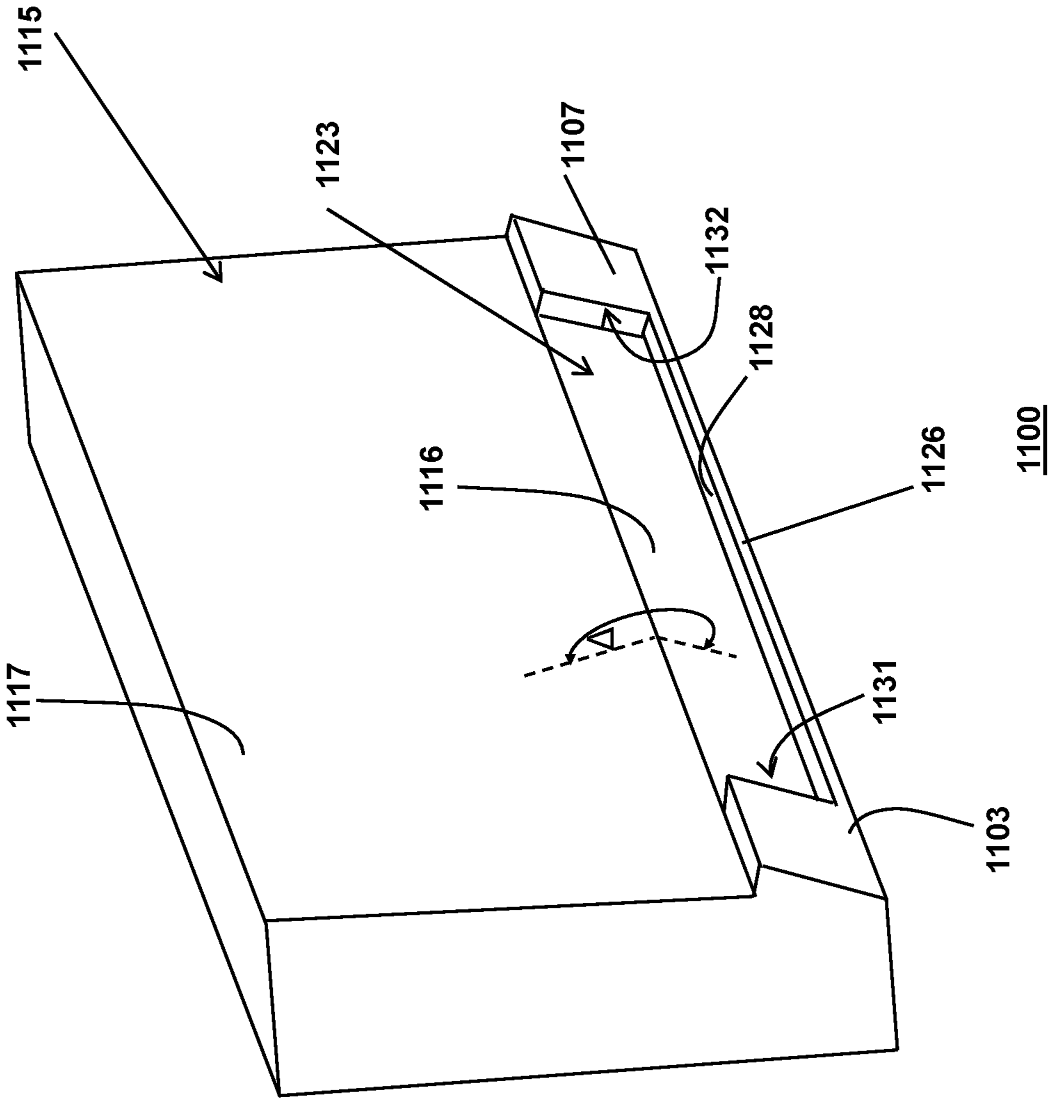

Returning to FIG. 11A, it is sometimes desirable to minimize leakage flows from the sides of the device such as those described with reference to 1140 and 1141 of FIG. 11A. In such cases, the funnel surface 1117 may instead be arranged to intersect with the surfaces 1103 and 1107 directly or with their extensions at the same distance from the protruding surface 1128 as the funnel surface 1117 intersects with the upstream surface 1116. In this way, in the working configuration, the side surfaces 1131 and 1132 have full depth along the full length $l_1$ of the recess 1123 so that the cross-sectional areas shown dotted at 1140 and 1141 in FIG. 11A across which leakage from the respective pocket could occur are eliminated. An example of such an arrangement is shown in FIG. 11B.

Alternatively or additionally, the device shown in FIG. 11A can be fitted with end members, such as end plates, to reduce or prevent such leakage. FIG. 16 depicts an example of a device 1600 for loading fluid that has end members 1650 (also referenced as side plates or side members). The main body of the device 1600 is similar to the device 1100 of FIG. 11A with the exception that it is adapted for use with a cylindrical nozzle-bearing body 1770 (shown in FIG. 17), instead of the planar nozzle-bearing body 1270 of FIG. 12. This means that an upstream surface 1616 and a downstream surface 1626, as well as surfaces 1603 and 1607 are cylindrical surfaces that have substantially the same centre of curvature as a body surface 1774 of the cylindrical body 1770 with which, in the working configuration, they come into close proximity. This is shown in FIG. 16 using curvatures 1698.

Similar to the device 1100 of FIG. 11A, side surfaces 1631 and 1632 of the device 1600 do not have full depth along the full length $l_1$. However, unlike the device 1100 of FIG. 11A, the device 1600 includes the end members 1650 whose surfaces 1652 have substantially the same centre of curvature as the body surface 1774 of the cylindrical body 1770 (shown in FIG. 16 using curvatures 1698) such that they form an extended seal area with body surface 1774 in the working configuration. This means that, in the working configuration, while the device is in use, fluid that could have potentially escaped via openings formed by the incomplete side surfaces 1631 and 1632 is greatly inhibited from escaping by the corresponding sections 1666 of side plates 1650.

Figure 16:
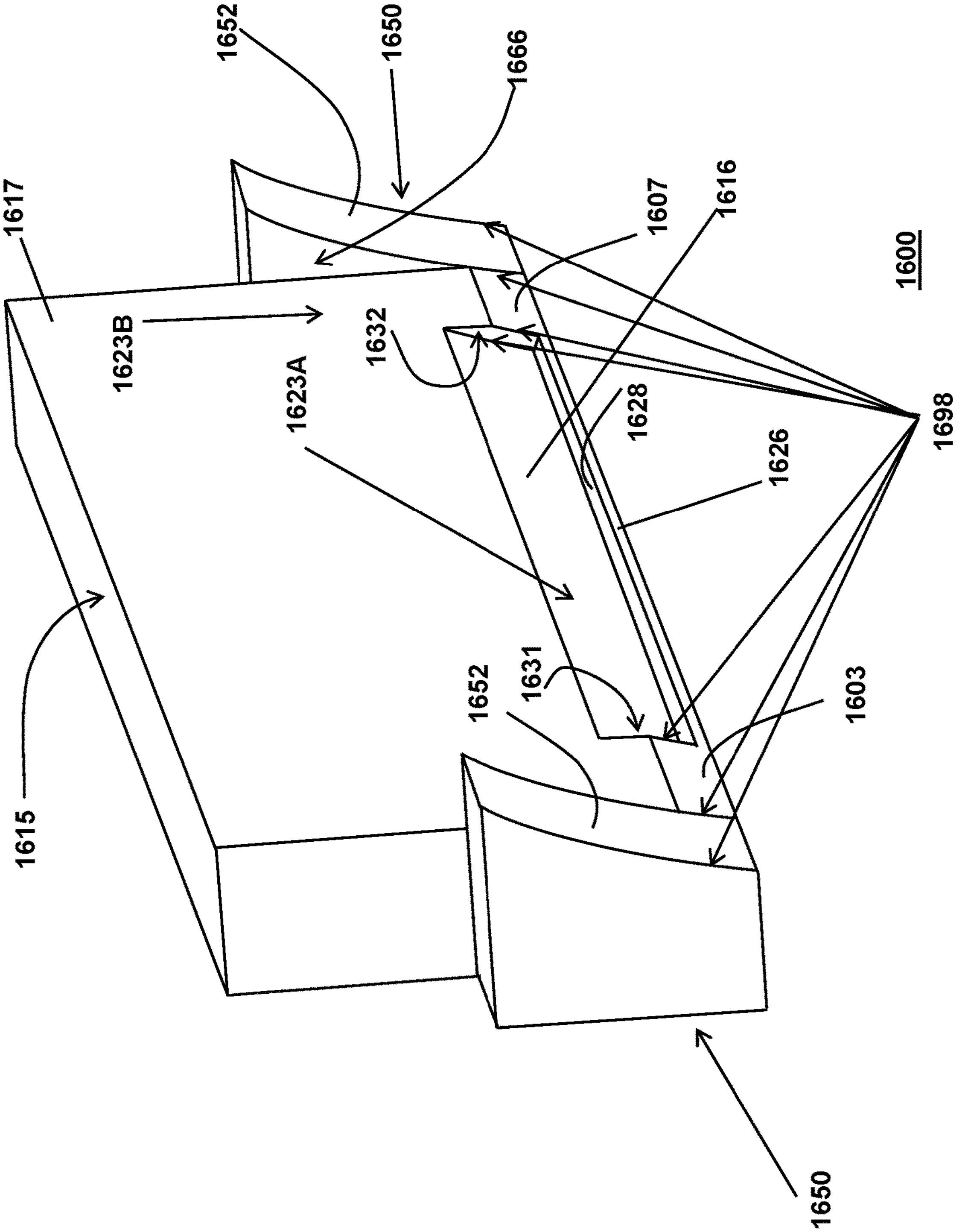
FIG. 16 depicts an example of a device for loading fluid into nozzle(s) of a cylindrical nozzle-bearing body, the device having end members attached to the main body of the device.
Figure 17:
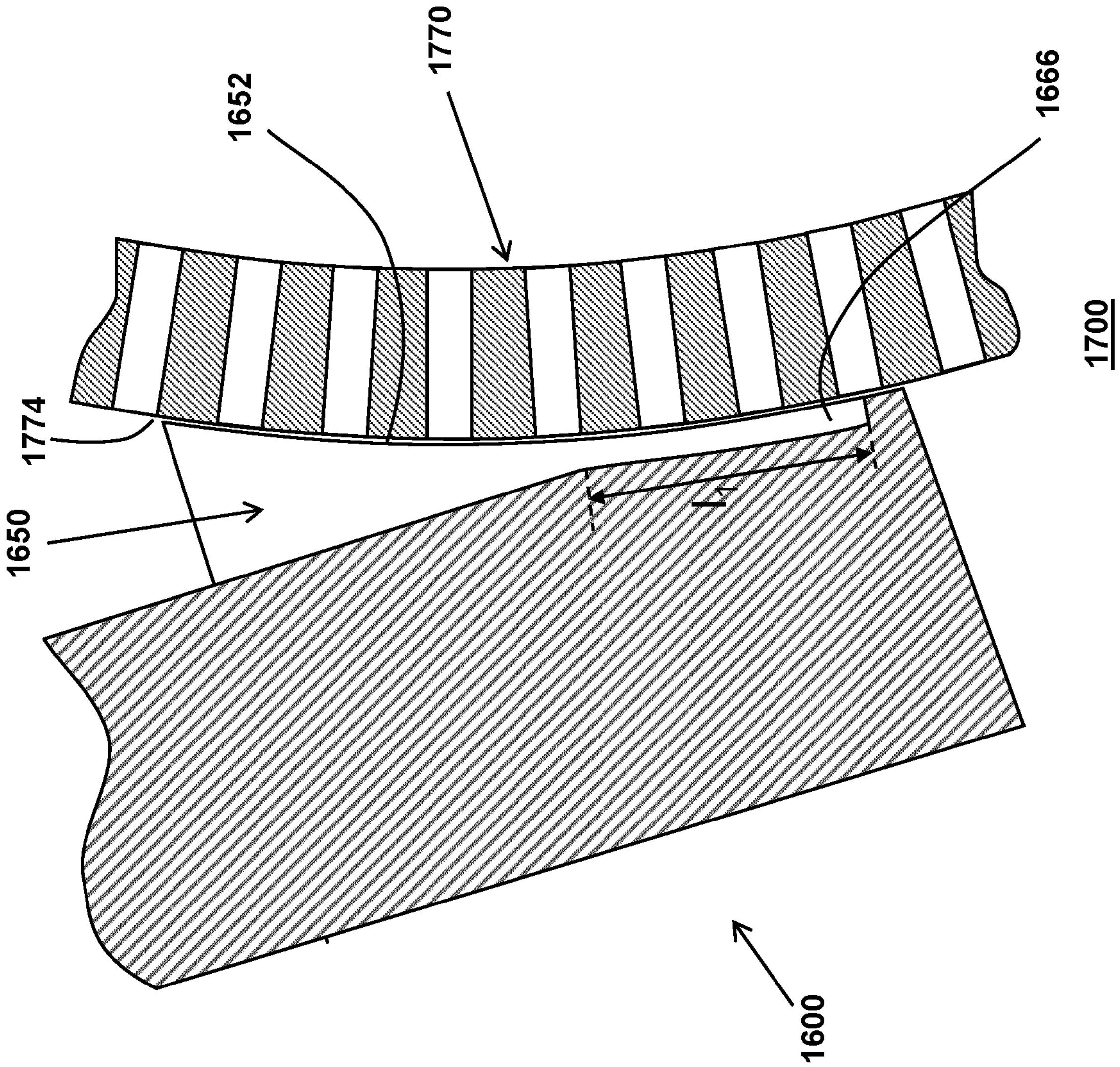
FIG. 17 depicts an enlarged cross-sectional view of part of the device in FIG. 16 assembled into a working configuration with a cylindrical nozzle-bearing body.

Similar to the device 1100 of FIG. 11A, the device 1600 of FIG. 16 has a recess 1623A formed therein. The recess 1623A is defined by the upstream surface 1616 and a protruding surface 1628. The recess 1623A is further defined by the side surfaces 1631 and 1632. The recess 1623A is configured to form a pocket for receiving fluid when the device 1600 is in the working configuration with the respective nozzle-bearing body. This pocket is however not limited to the recess 1623A region. Rather, the device 1600 includes the end members 1650 and a funnel member 1615 which expand the pocket formed by the recess 1623A. That is, the recess 1623A is configured to form an inner region of the pocket when the device is placed against the nozzle-bearing body. The pocket is then further defined by the funnel member 1615, and its funnel surface 1617 in particular, and the end members 1650, and their inner surfaces 1666 in particular, when the device is in the working configuration with the nozzle-bearing body. The end member 1650 and the funnel member 1615 form a recess region 1623B configured to form an outer region of the pocket formed when the device 1600 is placed against the respective nozzle-bearing body.

When the device for loading fluid has a configuration which includes side plates or end members, e.g., side plates 1650 of the device 1600, such side plates/members can be attached to the body of the device permanently, e.g., glued or bonded to the body of the device, or mounted detachably, e.g., bolted on or screwed on. In the latter case, the end members (such as the side plates 1650) can be replaced for different applications and/or different operating conditions (e.g., depending on a temperature at which the device is used to load fluid into nozzles of the nozzle-bearing body), as well as their respective surfaces (e.g., surfaces 1652) wear or become damaged.

Figure 21:
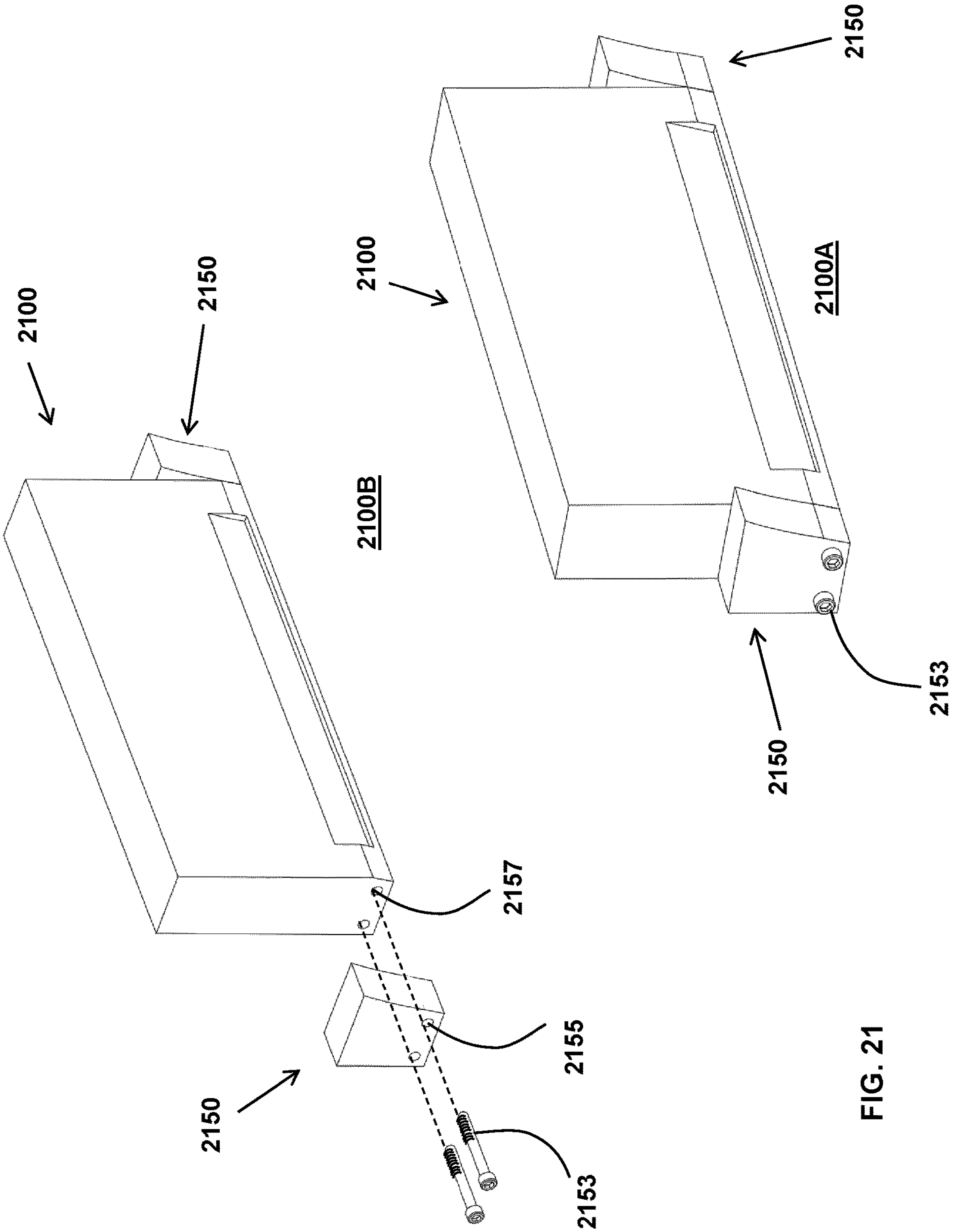
FIG. 21 depicts an example of a device for loading fluid with detachable end members.

FIG. 21 depicts an example of a device 2100 for loading fluid with detachable end members. The device 2100 is similar to the device depicted in FIG. 16 and includes two detachable end members 2150. Two views 2101A and 2101B of the device 2100 are shown in FIG. 21. The view 2101A shows the device 2100 with the end members 2150 attached, while the view 2101B is an exploded view of one the detachable end members 2150.

In the variation of the device for loading fluid depicted in FIG. 21, the end members 2150 are attached to the device 2100 using hex bolts 2153. Each end member 2150 defines through openings 2155 for receiving the hex bolt 2153 which is then secured in the corresponding opening 2157 formed within the body of the device 2100, thereby securing the end member 2150 to the device 2100.

Other types of fastening means, however, can be used, e.g., bolts, dowels and clamps, spring pin(s), etc. Good fit and alignment between the end members and the body of the device will improve leakage prevention from the device provided by the end members.

As stated above, in some example devices, the end members instead can be permanently attached to the body of the device. The methods for permanent attachment include, but not limited to, for example, gluing and bonding. Gluing involves fixing two components together using a separate adhesive. Examples of adhesives that could be used for gluing two components, such as the end member and the body of the device for loading fluid include epoxy-based adhesives and cyano-acrylate adhesives.

Unlike gluing, bonding does not use a separate adhesive layer. Rather, when bonding is used to attach the end member to the body of the device, identical materials would typically be used for both components, e.g., polymethyl methacrylate (PMMA) to PMMA, or polytetrafluoroethylene (PTFE) to PTFE. Examples of bonding that could be used to attach an end member to a body of a device for loading fluid include, but not limited to, thermal bonding and solvent bonding.

The following considerations for gluing and bonding materials, among others, may affect what materials are selected to manufacture a particular device for loading fluid:

PTFE is hard to glue but can be thermally bonded;
PMMA can be glued and solvent bonded;
Ultra-high molecular weight polyethylene (UHMWPE) is hard to glue but can be thermally bonded;
Acetal is hard to glue but can be thermally bonded;
Nitrile rubber can be glued;
Polyimide can be glued but is hard to bond; and
Polyamide is hard to glue but can be bonded.

Figure 13:
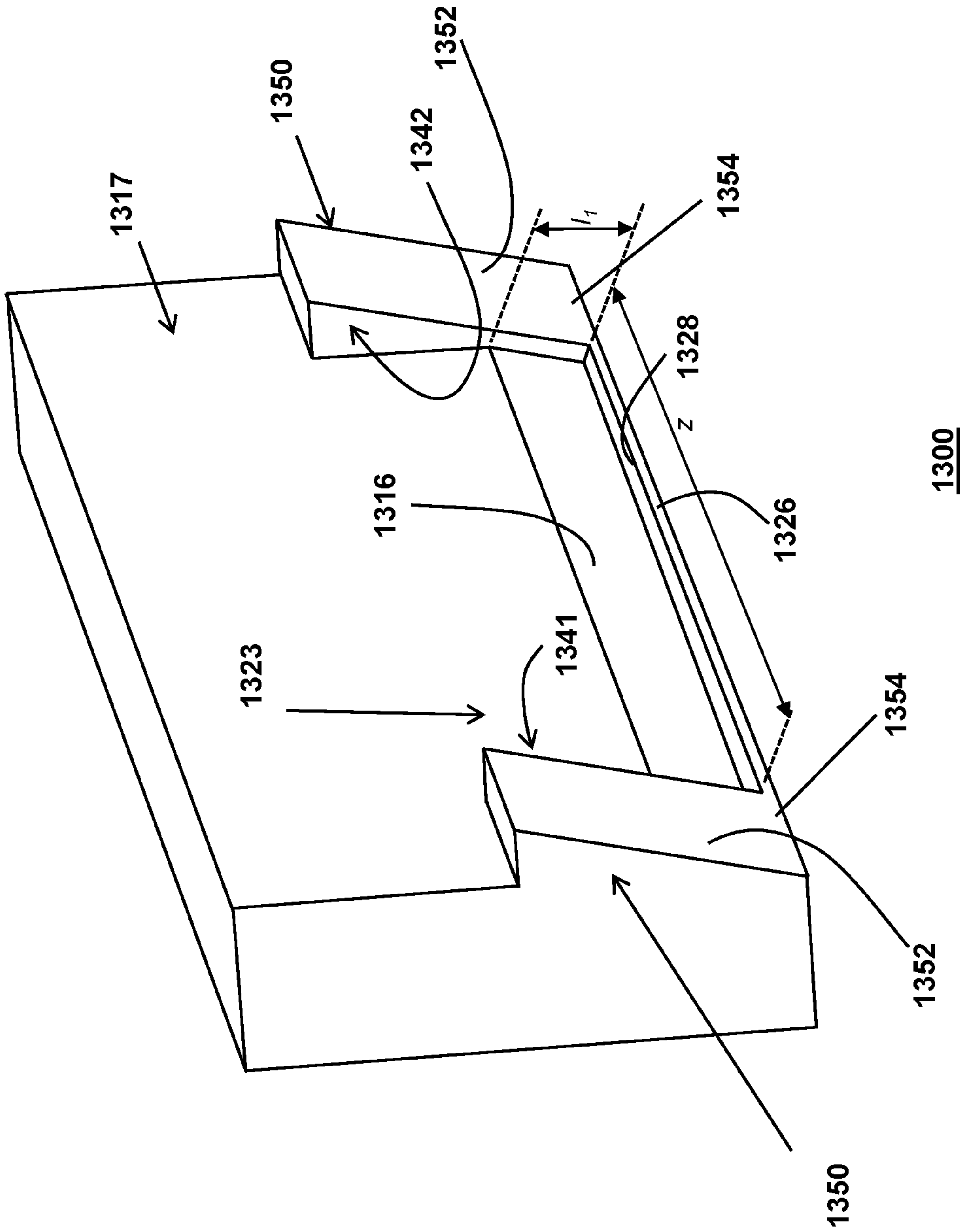
FIG. 13 depicts another example of a device for loading fluid into nozzle(s) of a planar nozzle-bearing body, the device having side members integrated with the main body of the device.
Figure 14:
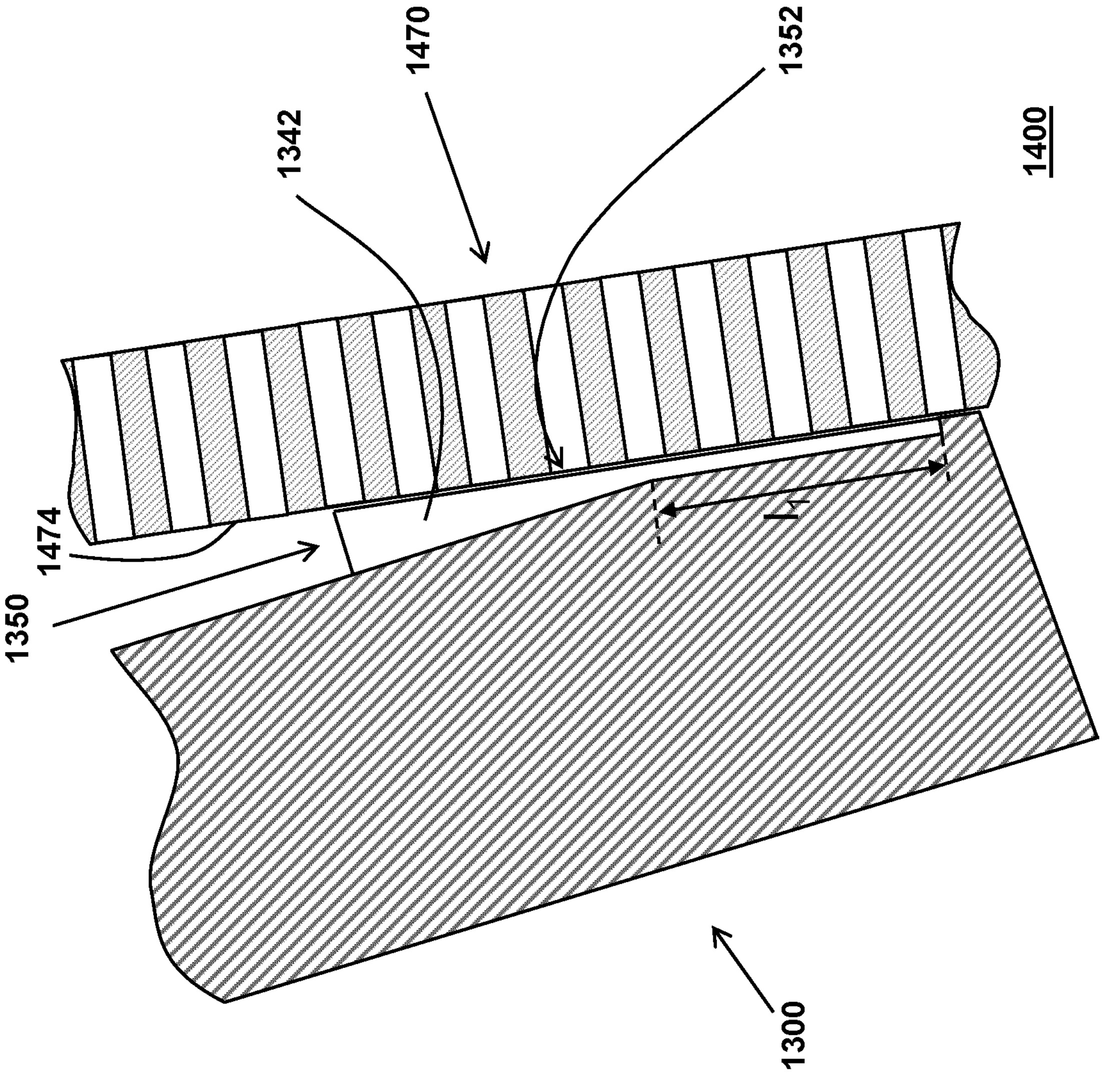
FIG. 14 depicts an enlarged cross-sectional view of part of the device in FIG. 13 assembled into a working configuration with a planar nozzle-bearing body.

FIG. 13 depicts another example of a device 1300 for loading fluid that has integral side members. The device 1300 is suitable for loading fluid into nozzle(s) of a planar nozzle-bearing body. FIG. 14 depicts an enlarged cross-sectional view of the device 1300 assembled into a working configuration with a planar nozzle-bearing body 1470.

Generally, the device 1300 is similar to the device 1100 described with reference to FIGS. 11A and 11B. However, unlike the device 1100, the device 1300 includes two integral side members 1350 at the opposite sides of the device 1300. Each side member 1350 has a seventh surface 1352 configured to conform to the shape of a body surface 1474 of the nozzle-bearing body 1470 when the device is in the working configuration. For example, the side members 1350 may be shaped to complement the overall shape of the planar body surface 1470. Thus, for the planar body surface 1470, then the side members 1350 may have a planar pairing surface 1352. However, if the nozzle-bearing surface is cylindrical then the side members have a concave pairing surface, as for example shown in FIGS. 16-19, or a convex pairing surface that complements a concave cylindrical curvature of the nozzle-bearing surface, when the device is positioned inside a nozzle-bearing body having the form of a cylindrical shell (not shown). It should be understood throughout this disclosure that, when a particular surface of a device for loading fluid is described as being shaped/configured to complement or conform or substantially complement or confirm to the shape of a surface of a nozzle-bearing body, the reference is made to the overall shape of the surface of the nozzle-bearing body where such an overall shape does not include orifices defined in the surface of the nozzle-bearing body.

Each surface 1352 includes a surface portion 1354 aligned with a downstream surface 1326 of the device 1300, thereby forming an extended surface including the downstream surface that is configured to conform to the body surface when the device is in the working configuration. Similar to the device 1100 of FIGS. 11A and 11B, the device 1300 has a recess 1323 formed within the device. The recess 1323 is defined by a protruding surface 1328, an upstream surface 1316, a portion of a funnel surface 1317 between the side members 1350, and by the side members 1350, and their respective side surfaces 1341 and 1342 in particular. The recess 1323 is configured to form a pocket for receiving and holding fluid when the device is placed into the working configuration with the nozzle-bearing body, such as being position proximate to the nozzle-bearing body or pressed against the nozzle-bearing body.

The side members 1350 help to prevent fluid from flowing out from the ends of the device 1300, as well as to stabilise the loading pressure across the fluid-loading width z of the device 1300 so that the nozzle filling process is similar across the device 1300.

Although in FIG. 13, the side members 1350 are shown formed integrally with the device 1300 the side members 1350 may either be attached to the device (similarly to the end members shown in FIG. 16) or, held (e.g., mechanically held, such as spring-held) in close proximity to the device 1300 when the device is assembled into a working configuration with a respective nozzle-bearing body. In the latter scenario, a different force may be applied to hold the device against the nozzle-bearing body than the force applied to hold the side members (and/or the end members) against the nozzle-bearing body to ensure that sufficient pressure is applied by the second member and side members (and/or the end members) to the nozzle-bearing body thereby to form a seal between the device—its downstream surface and the pairing surfaces of the side members (and/or end members)—and the body surface of nozzle-bearing body. The side members and/or end members may be made of nylon, polyimide, PTFE, or UHMWPE.

Figure 18:
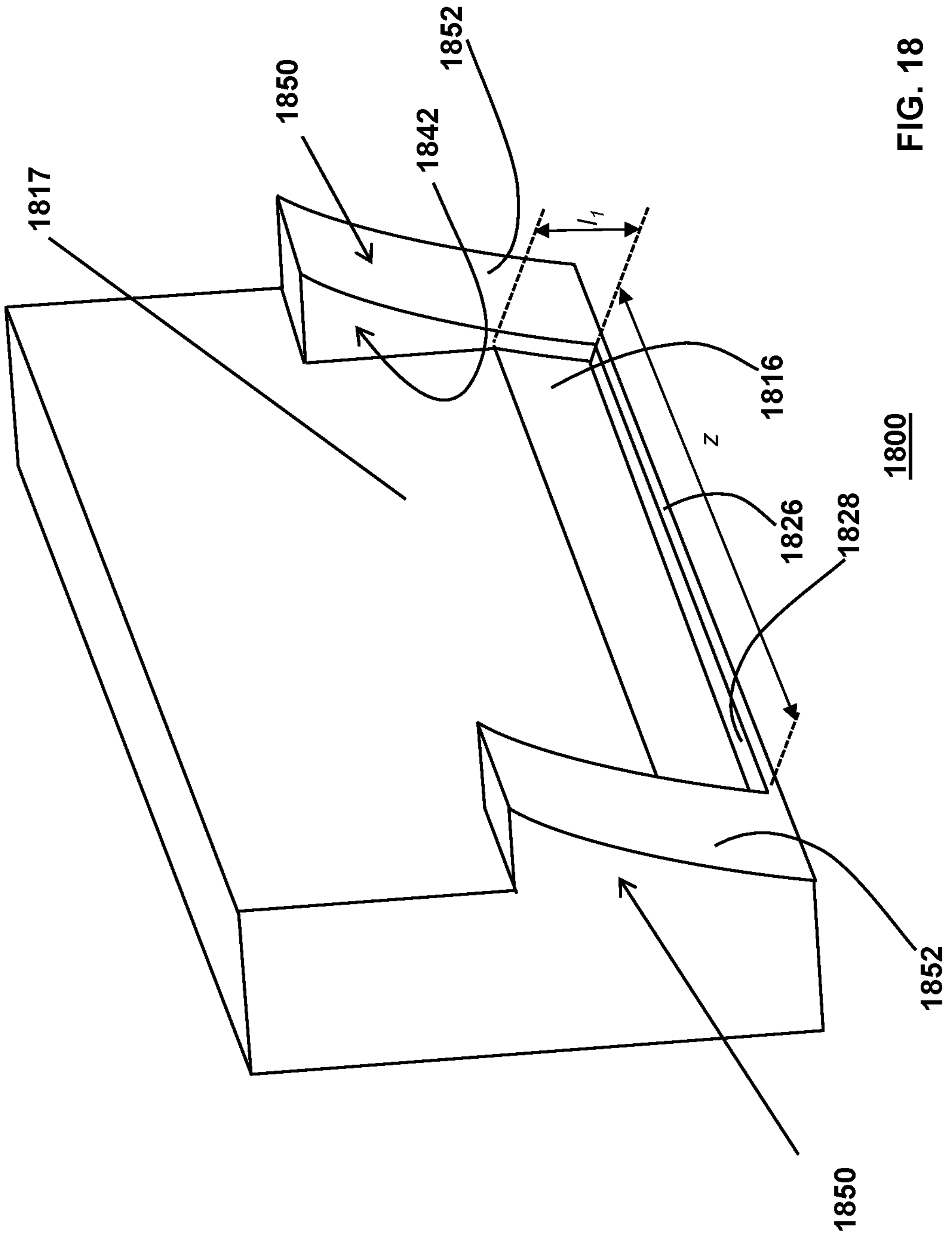
FIG. 18 depicts an example of a device for loading fluid into nozzle(s) of a cylindrical nozzle-bearing body, the device having side members integrated with the main body of the device.
Figure 19:
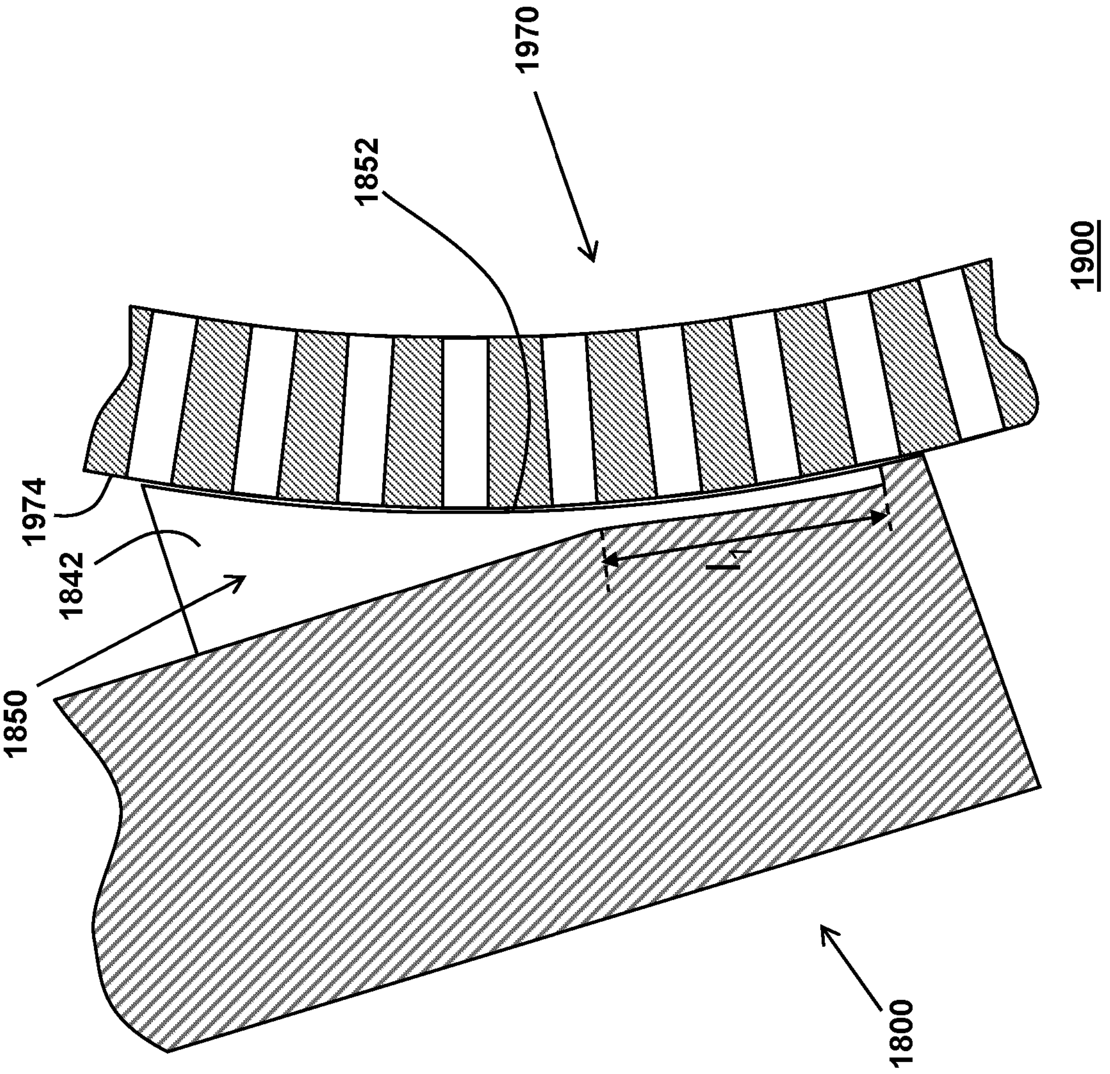
FIG. 19 depicts an enlarged cross-sectional view of part of the device in FIG. 18 assembled into a working configuration with a cylindrical nozzle-bearing body.

FIG. 18 depicts a device 1800 for loading fluid that generally corresponds to the device of FIG. 13, with the exception that the device 1800 is adapted for use with a cylindrically-shaped nozzle-bearing body 1970 shown in FIG. 19, instead of a planar-shaped body 1470 of FIG. 14. This is achieved by configuring an upstream surface 1816, a downstream surface 1826, as well as surfaces 1852 of the side members 1850 to have substantially the same centre of curvature as body surface 1974 of the cylindrically-shaped nozzle-bearing body 1970 such that surfaces 1826 and 1852 form an extended seal area with body surface 1974 in the working configuration.

Figure 27B:
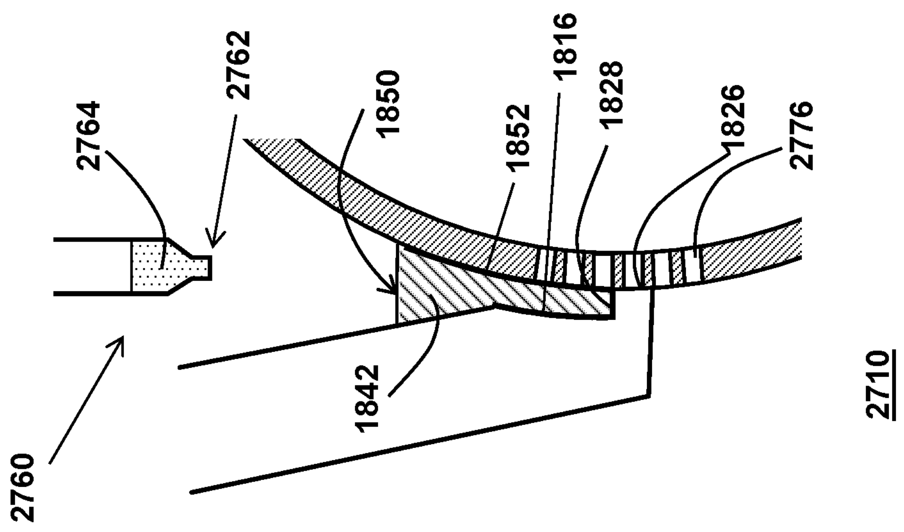
FIGS. 27B, 28B, and 29B each depict an enlargement of a region identified in FIG. 27B, 28B, or 29B respectively and showing the corresponding device for loading fluid.
Figure 27A:
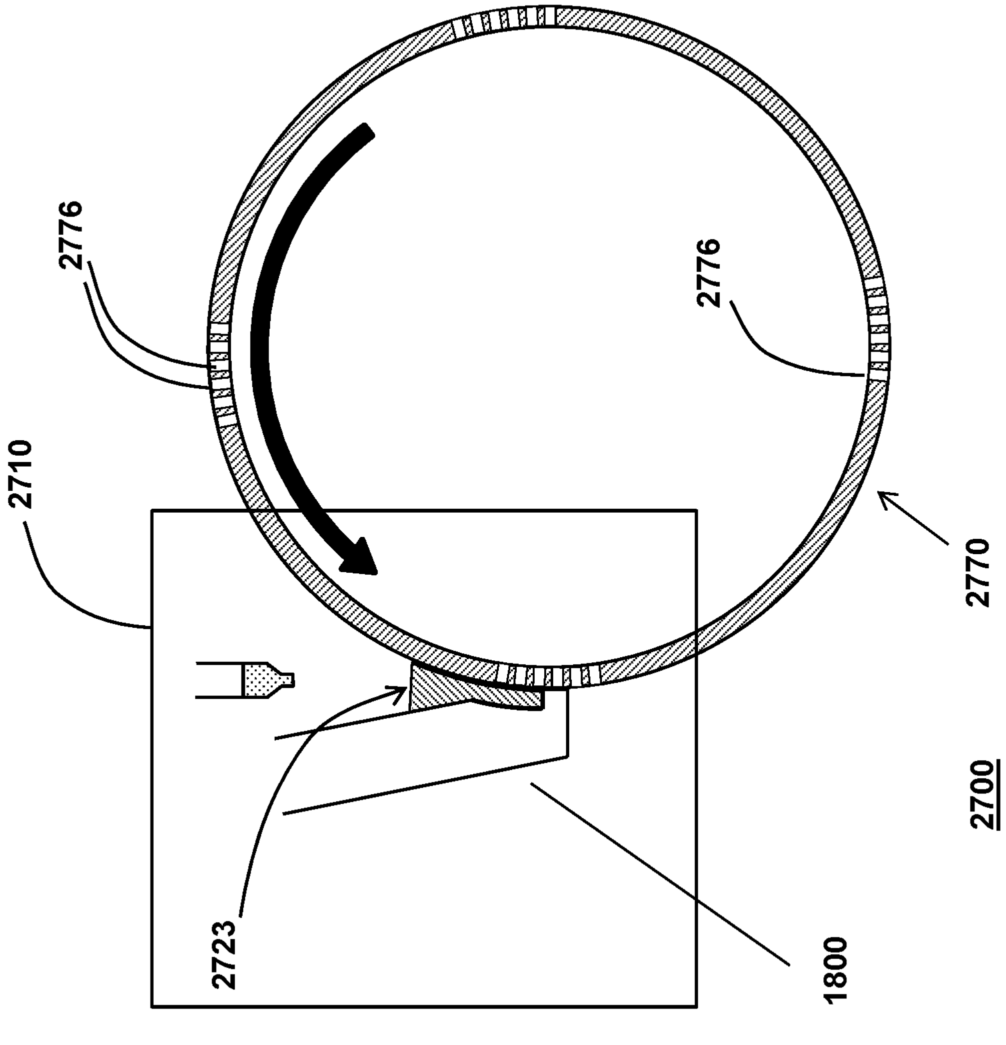
FIGS. 27A, 28A, and 29A depict schematically examples of a working configuration of an assembly for loading fluid into nozzle(s) of a cylindrical nozzle-bearing body using the device for loading fluid.
Figure 28B:
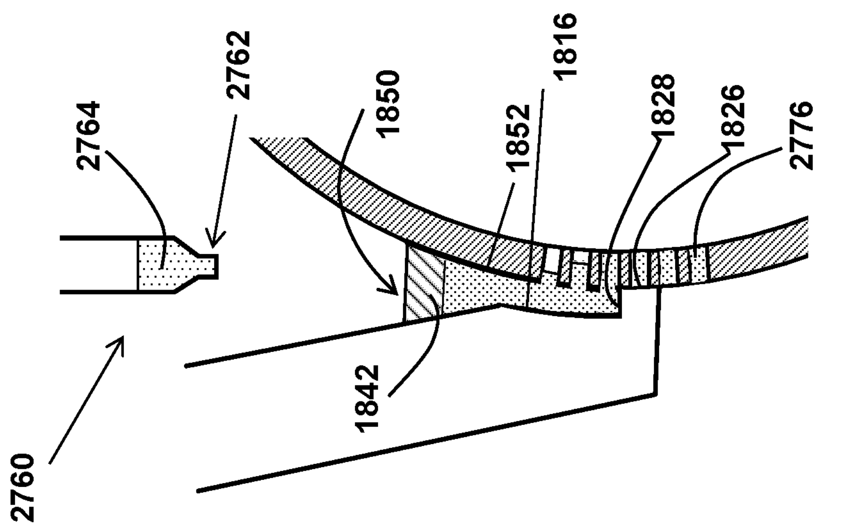
Figure 28A:
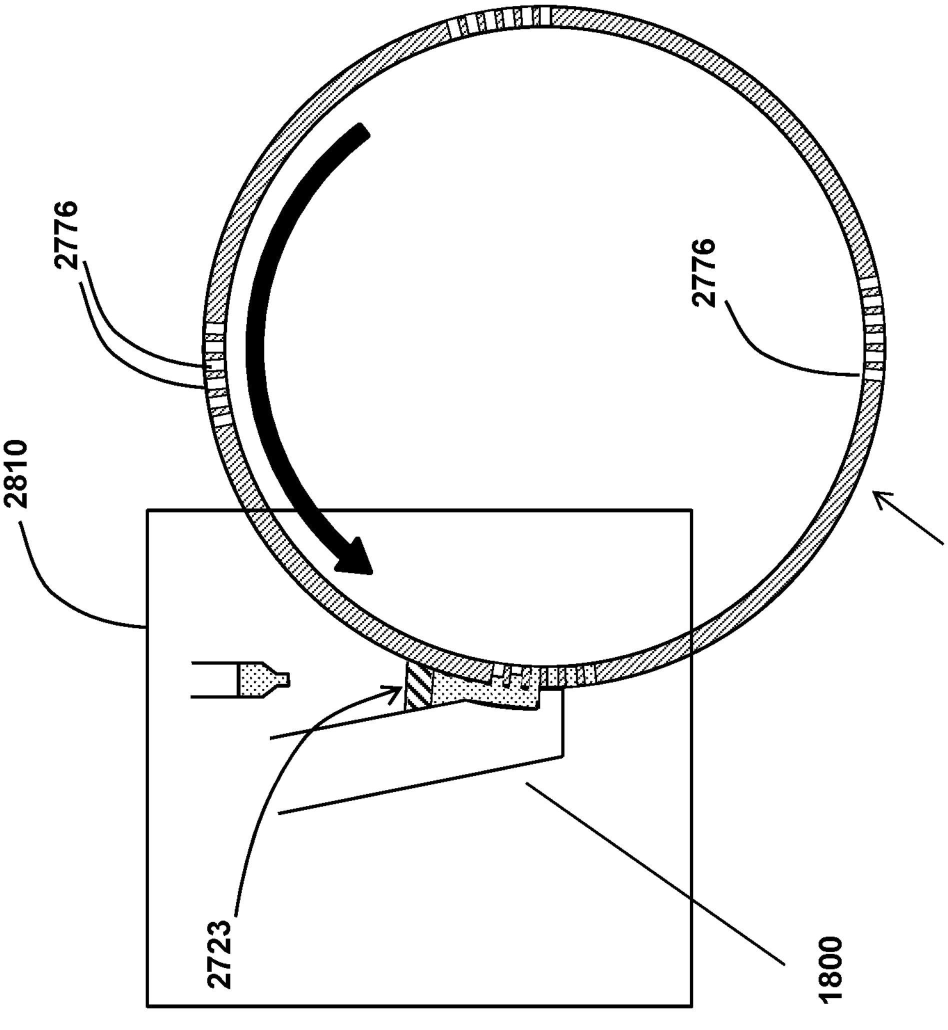

FIGS. 27A and 28A depict schematically an example of a working configuration of an assembly 2700 for loading fluid into nozzle(s) 2776 of a cylindrical nozzle-bearing body 2770 using the device for loading fluid 1800 of FIG. 18. FIG. 27B shows an enlargement of region 2710 depicted in FIG. 27A, while FIG. 28B shows an enlargement of region 2810 depicted in FIG. 28A. All figures provide a cross-sectional view of the respective assemblies.

Referring back to FIGS. 7 and 8, the configuration depicted in these figures includes the fluid supply tank 760 positioned above the nozzle-bearing body 770 for delivering fluid 764 onto the outer surface 774 of the nozzle-bearing body 770. Relative motion between the outer surface 774 and the device 702 carries fluid 764, which has been deposited onto the outer surface 774, into the device 702, and more specifically, into the pocket formed by the device 702 and the nozzle-bearing body 770. In some example arrangements, however, the fluid supply tank can instead be positioned to deliver fluid directly into the pocket formed by the device and the nozzle-bearing body. FIGS. 27A-29B show examples of such a configuration.

Similar to the configuration 700 of FIGS. 7 and 8, in the assembly 2700 of FIG. 27, replenishing supply of fluid upstream of the device 1800 is provided by outpouring fluid 2764 from a fluid supply tank 2760. Fluid 2764 is deposited from one or more openings 2762 across the width of the of the body 2770.

Figure 29B:
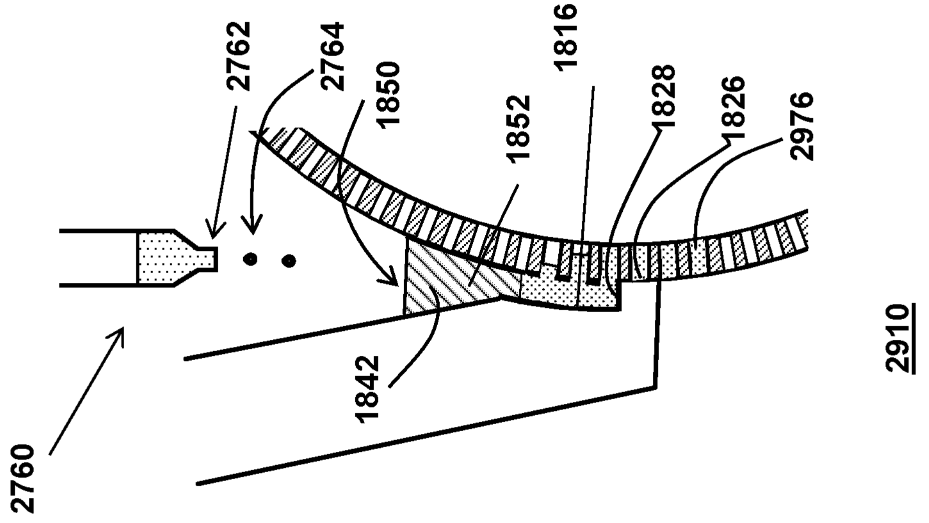
Figure 29A:
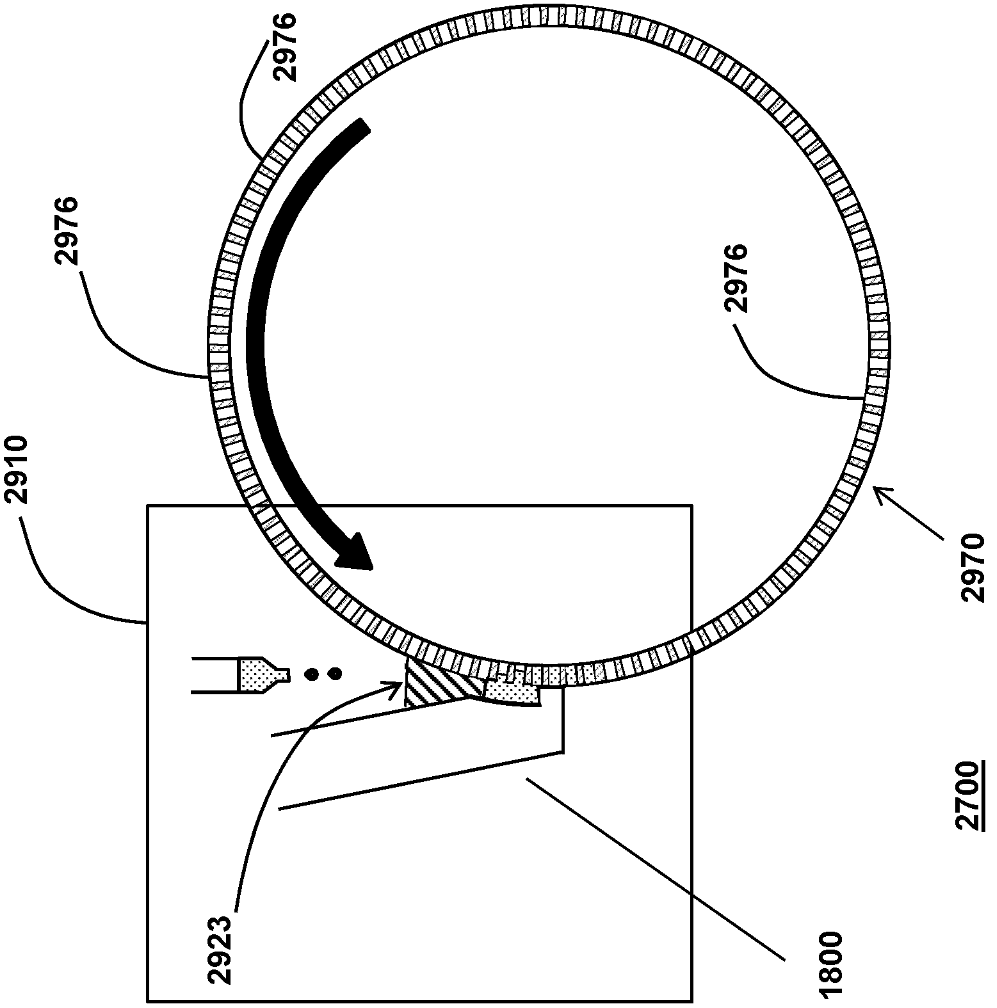

FIGS. 29A and 29B depict an assembly 2900 that has a similar configuration to the assembly 2700, except that a nozzle-bearing body 2970 has nozzles 2976 uniformly distributed throughout the nozzle-bearing body, while the nozzle-bearing body 2770 has clusters of nozzles 2776.

In both configurations, the fluid supply tank 2760 or similar means is positioned with the openings(s) above the pocket 2723 or 2923 formed by the device 1800 and the nozzle-bearing body 2770 or 2900 respectively to deposit fluid 2764 directly into the pocket. The device for loading fluid 2700, 2900 and the fluid supply tank 2760 are stationary. Rotational motion of outer surface of the nozzle-bearing body 2770, 2970 relative to the device enables loading of the nozzles with fluid while the fluid supply tank 2760 replenishes fluid in the pocket 2723, 2923 at a desired rate. The same principles as discussed elsewhere in this application, including FIGS. 7 and 8 apply to the configuration shown in FIGS. 27A to 29B.

FIG. 27A shows the assembly 2700 before any fluid is delivered into the pocket 2723, while FIG. 28A shows the assembly 2700 with the pocket 2723 replenished with fluid 2764. FIG. 29A shows the assembly 2900 in process of the replenishing the pocket 2923 with fluid. Each enlarged cross-section region 2710, 2810, and 2910 show that upstream surface 1816, downstream surface 1826, and surface 1852 of an end member 1850 of the device 1800 all conform to the curvature of the surface of the nozzle-bearing body 2770 or 2970 respectively.

Different applications may require different flow levels. For example, depositing a coating at 10 g/$m^2$ across a width of 200 mm of a nozzle-bearing body at a speed of 0.25 m/s requires 0.5 g/s coating flow rate. Depositing a coating at 40 g/$m^2$ across a width of 200 mm of a nozzle-bearing body at a speed of 1 m/s requires 8 g/s coating flow rate. Assuming an operation of depositing fluid into the pocket formed by the device and the nozzle-bearing body at the same flow level, some device configurations described in this application will reduce fluid leakage from the pocket during the operation of the device to a greater extent than other configurations. For example, in the applications where leakage is undesirable, the device 1100 shown in FIG. 11A could be able to prevent leakage in a low-flow operation, but not in a high-flow operation. If a high-flow operation is required, the devices 1300 and 1600 shown in FIGS. 13 and 16 respectively will provide for better leakage protection than the device 1100 shown in FIG. 11A or 11B.

Figure 20:
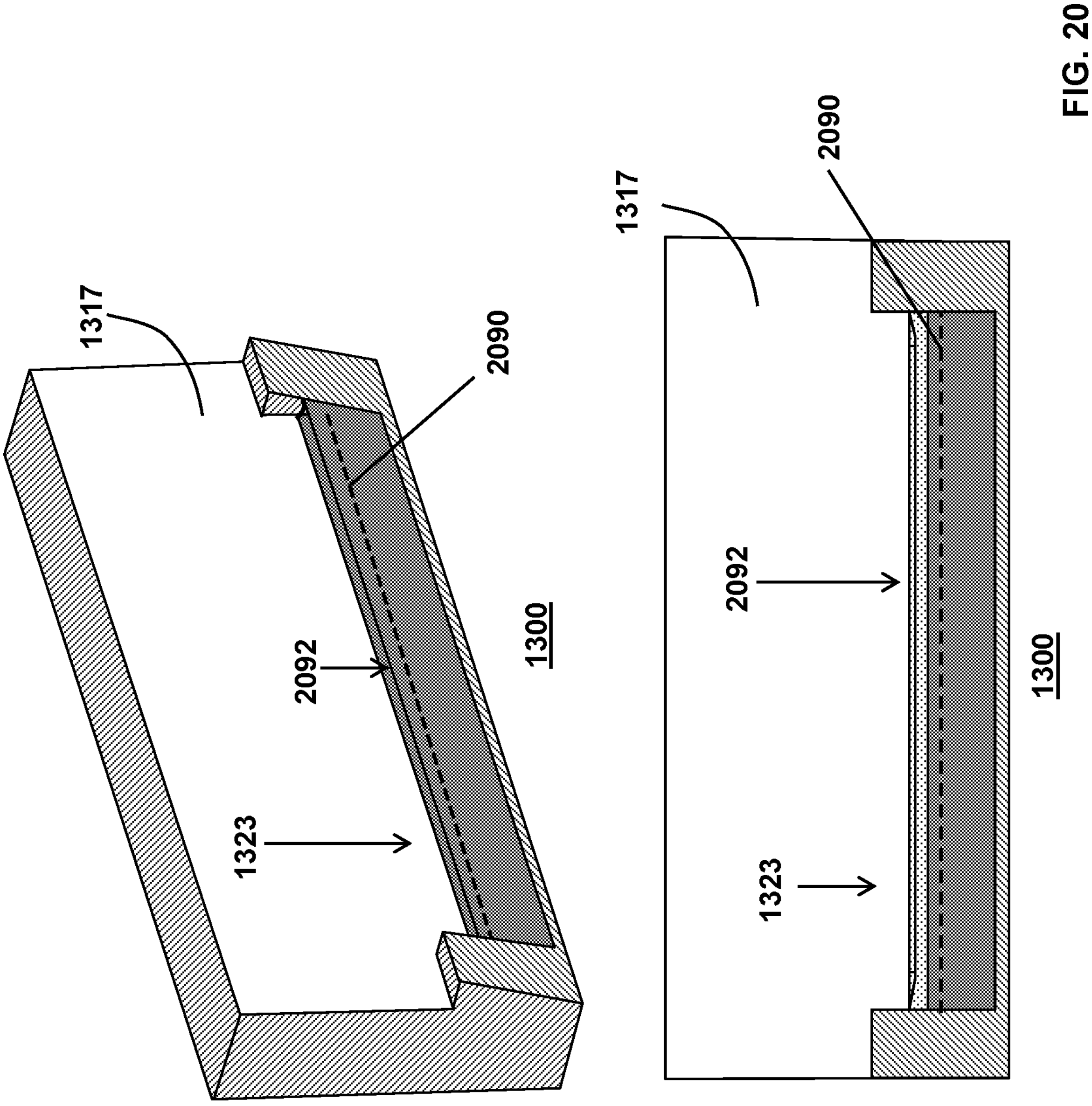
FIG. 20 depicts the device of FIG. 13 with fluid.

The level at which the nozzles of the nozzle-bearing body could be filled using a device for loading fluid, such as the devices described in this application, can be, in certain scenarios, controlled by controlling the flow rate of the fluid provided into the pocket. For example, with reference to FIGS. 13 and 20, FIG. 20 shows an isometric view (at the top of the figure) and a front view (at the bottom of the figure) of the device 1300 of FIG. 13. In FIG. 20, the device 1300 is shown with a pocket, formed by the recess 1323 and a nozzle-bearing body (not depicted for ease of illustration), filled with fluid. When the fluid collects in the pocket, a meniscus 2092 is formed. By controlling the level of the meniscus within the pocket, the nozzle fill level may be controlled.

As shown in FIG. 20, the flow rate of the fluid into the pocket can be controlled such that the meniscus is maintained above the top of the upstream surface 1316, i.e., above the level at which the upstream surface 1316 meets the funnel surface 1317. This level is indicated in FIG. 20 using line 2090. The fluid in the region above the level 2090 does not significantly contribute to the pressure generated in the pocket. Therefore, for applications where the nozzles are not arranged uniformly throughout the nozzle-bearing body (e.g., form a pattern), by maintaining the meniscus level above the level 2090, changes in the meniscus level will not change the level of nozzle fill substantially, even when the number of nozzles being filled at any one time varies. A further example of maintaining the meniscus above the top of the upstream surface can been seen in FIGS. 28A and 28B.

On the other hand, for applications where the coating weight needs to be varied, which in turn controlled through the nozzle fill levels, can be achieved by maintaining the meniscus level lower than the level 2090. In such a scenario, the level of the nozzle fill is determined by the rate at which the fluid is fed into the pocket. The meniscus rises within the pocket to a level where the pressure generated in the fluid in the device is such that the rate of fluid flow into the nozzles matches the rate at which fluid is fed into the pocket. The meniscus level then depends on the rate of fluid supply, the dimensions of the device, and the viscosity of the fluid. A further example of maintaining the meniscus below the top of the upstream surface can been seen in FIGS. 29A and 29B.

Figure 22:
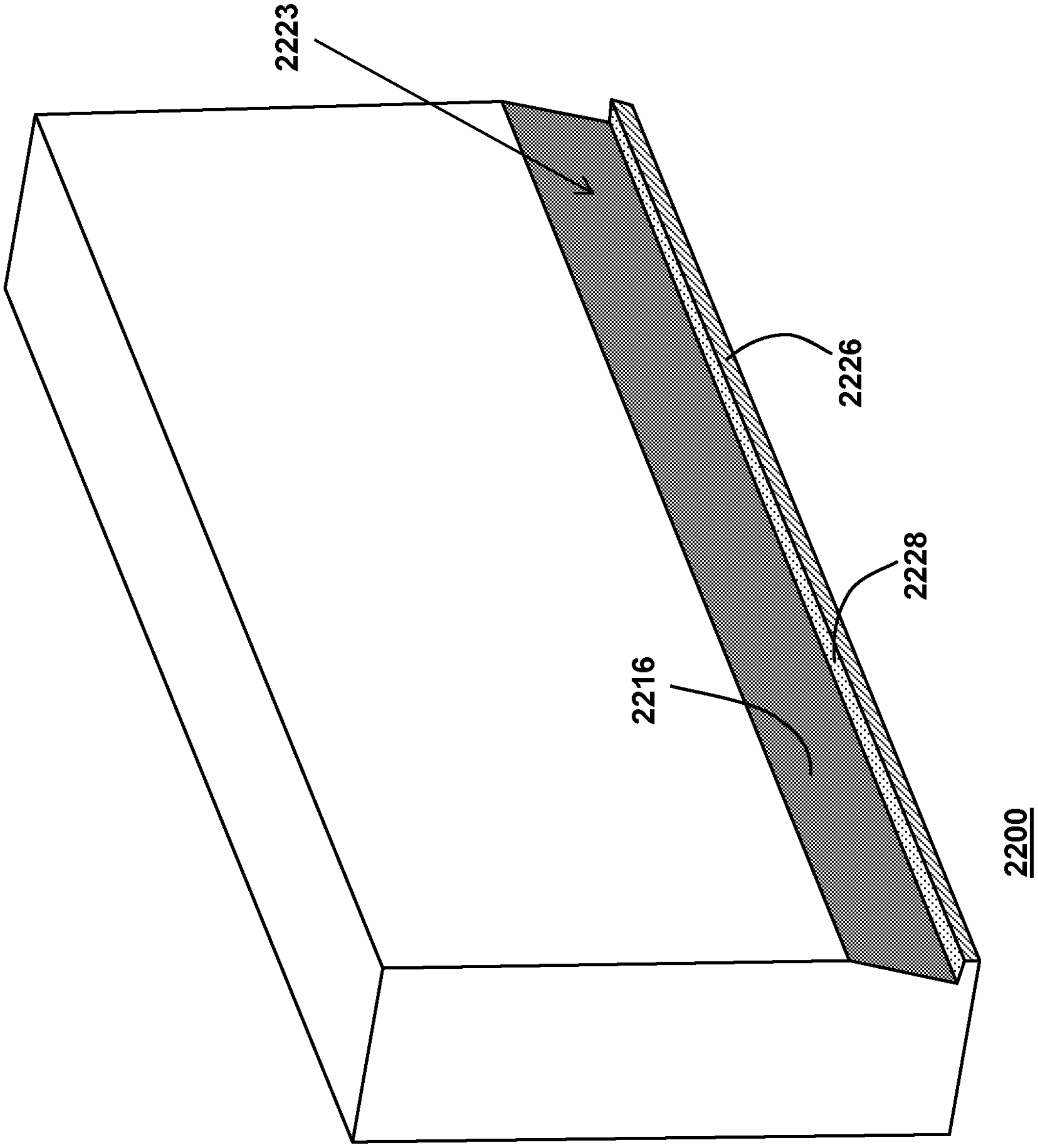
FIG. 22 depicts an example of a device for loading fluid into nozzle(s) of a nozzle-bearing body shaped like a plate.
Figure 23:
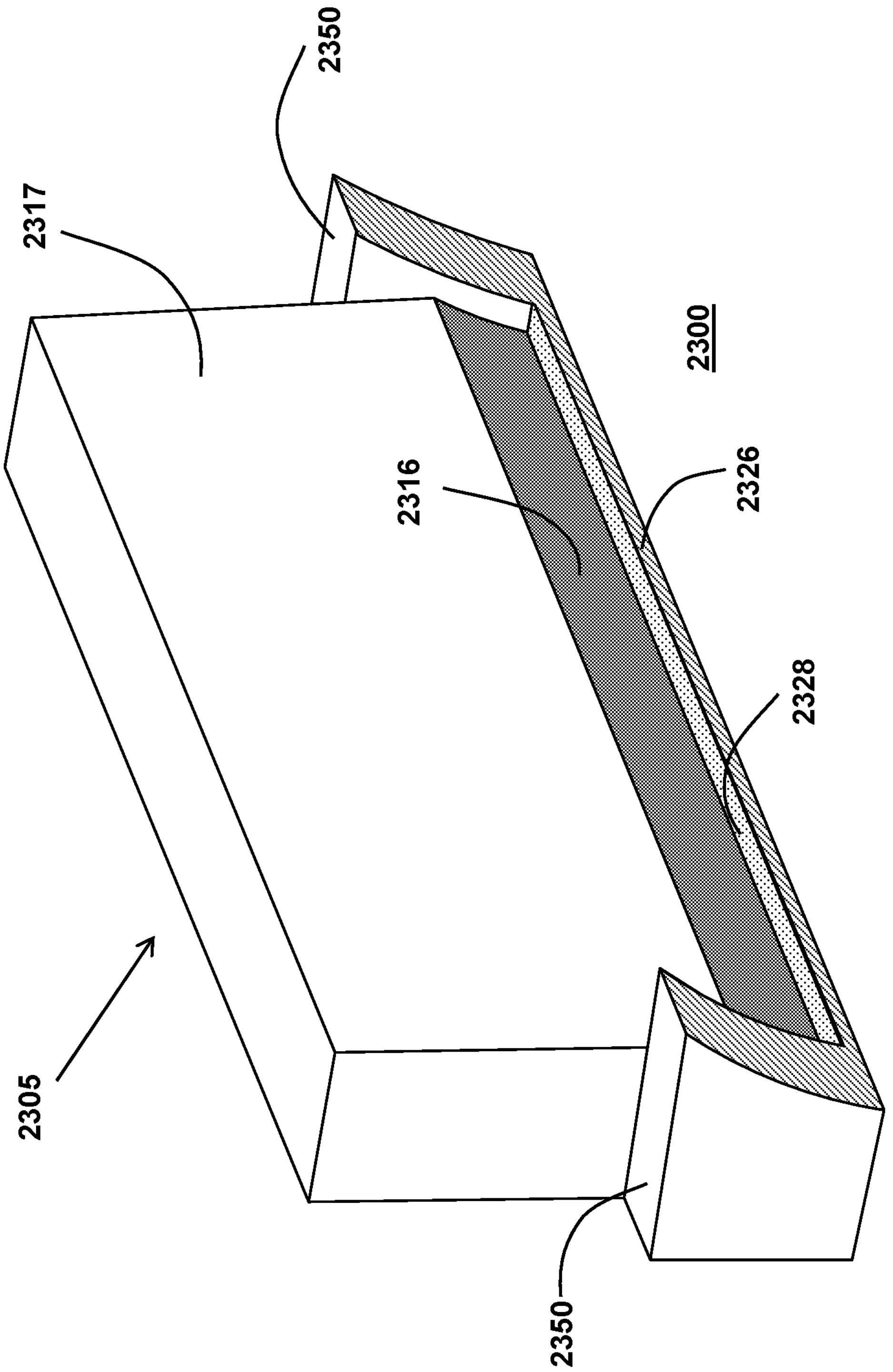
FIG. 23 depicts another example of a device for loading fluid into nozzle(s) of a cylindrical nozzle-bearing body.

FIGS. 22 and 23 illustrate further examples of a device for loading fluid in a nozzle-bearing body. FIG. 22 depicts a device 2200 suitable for loading fluid into a nozzle-bearing body shaped as a plate. In this design of the device, a recess 2223 is formed by an upstream surface 2216 and by a protruding surface 2228, where the recess 2223 extends over the entire width of the device 2200. This means that the geometry of the recess is consistent over the entire width of the filler.

Due to the simplicity of the device 2200, device 2200 is easy to manufacture. Furthermore, the consistent geometry of the recess 2223 leads to a stable meniscus across the length of the recess. However, when assembled with a nozzle-bearing body into a working configuration, such a device does not form a pocket, thereby allowing the fluid to readily spill on both sides the sides of the device while in operation. Nonetheless, the device 2200 could be appropriate for use in a low-flow operation, particularly where fluid spillage is acceptable.

FIG. 23 depicts a device 2300 suitable for loading fluid into a nozzle-bearing body shaped as a drum (cylinder, roller, etc.) having nozzles penetrating thorough the thickness of the drum. The design of the main body 2305 is similar to the design of the device 2200 of FIG. 22 with the exception that its geometry is adapted to the drum. In particular, the upstream surface 2316 substantially complements the surface of the nozzle bearing body and the downstream surface 2326 is configured to conform to the curvature of the surface of the nozzle-bearing body when placed against the nozzle-bearing body. Further, the device 2300 also includes end members 2350 such that when the device 2300 is in the working configuration with the nozzle-bearing body, a pocket is formed by the nozzle-bearing body, the upstream surface 2316, a funnel surface 2317, and protruding surface 2328, and the end members 2350. The end members 2350 help to prevent fluid from spilling from the pocket from the sides of the device 2300, as well as increase the size of a pocket formed when the device in assembled with the nozzle-bearing body into the working configuration.

Figure 30:
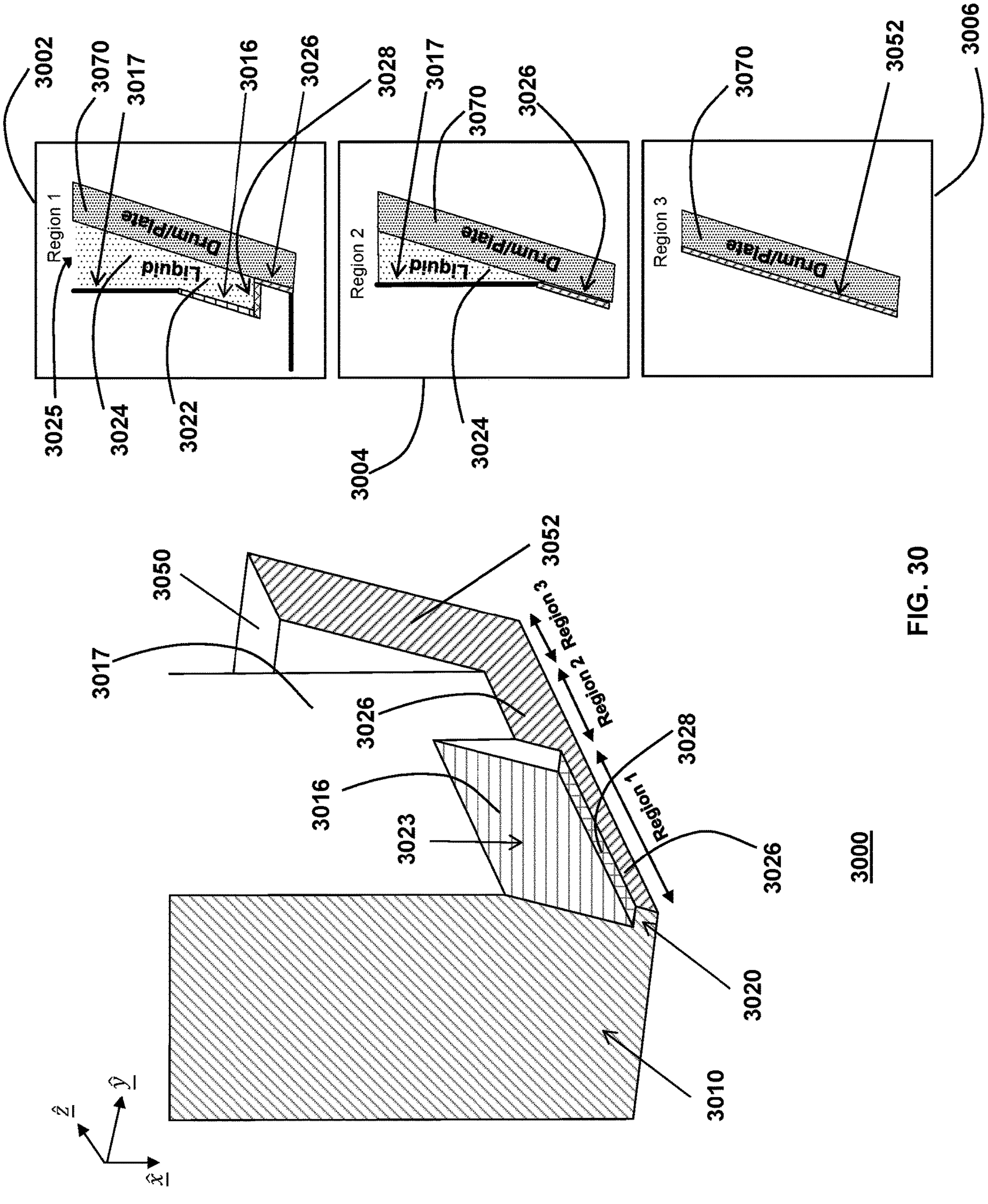
FIG. 30 shows a portion of a device for loading fluid into a nozzle-bearing body according to some examples of the present disclosure, as well as cross-sections of such a device in different regions of the device.

FIG. 30 shows a cut-out of a device 3000 for loading fluid into a nozzle-bearing body 3070. The device 3000 has a geometry similar to the geometry of the device 1600 of FIG. 16, except that the geometry of the device 3000 is adapted for use with a nozzle-bearing body in the form of a plate, rather than a roller or a drum. Similar to the device 1600, the device 3000 includes two members 3010 and 3020. The first member 3010 defines an upstream surface 3016. The second member 3020 defines a downstream surface 3026 and a protruding surface 3028 extending from the upstream surface 3016 and connecting the upstream and downstream surfaces 3016 and 3026 respectively.

Similar to the geometry of the device 1600, the upstream surface 3016 and protruding surface 3028 define a recess 3023 configured to form a pocket 3025 when the device 3000 is assembled into a working configuration with the nozzle-bearing body 3070. In this example, the recess 3023 is configured to form an inner region 3022 of the pocket 3025, where the pocket 3025 is further defined by a funnel surface 3017 and end members 3050, which form an outer region 3024 of the pocket 3025.

To illustrate the relation of the device 3000 and the body 3070 while in the working configuration, three regions have been identified in FIG. 30 for the cut-out of the device 3000. The first region includes the portion of the device encompassing the recess 3023. The third region includes the end member 3050. And the second region includes the portion of the device 3000 connecting the first region and the third region. A cross-section of device 3000, having the pocket filled with fluid, is depicted in FIG. 30 for each such region. These cross-sections are referenced as 3002, 3004, and 3006 respectively. It can be seen from the cross-sections 3002, 3004, and 3006 that the upstream and downstream surfaces 3016 and 3026 are substantially parallel to the surface of the nozzle-bearing body 3070, the downstream surface 3026 forms a seal with the nozzle-bearing body 3070, the surface 3052 of the end member 3050 facing the nozzle-bearing body 3070 similarly forms a seal with the nozzle-bearing body 3070, a funnel is formed between a funnel surface 3017 and the nozzle-bearing body 3070, and both the inner region 3022 and the outer region 3024 are filled with fluid.

In some cases of using the above described devices and assemblies, it may be advantageous to control the temperature of the device. This may be done for example to maintain a uniform temperature in the loading/filling zone. This may also be done when the material being loaded into the nozzles is in a fluid state at elevated temperatures, e.g., hot melt adhesives. Thus, for example in the case of hot melt adhesives, operating the device at an elevated temperature facilitates the flow of the hot melt adhesive and its loading into the nozzles.

In such cases, the device may be operated at a controlled temperature between ambient and 250 degrees centigrade. For example, the main body of the device could be made of a thermally conductive material, such as aluminium or brass. A practical implementation example includes a device made from brass and heated to 160 degrees centigrade using electrical cartridge heaters using thermocouples to measure and control the operating temperature.

The devices for loading fluid described in this application can be manufactured by means of various manufacturing methods. For example, the device as a whole or its components can be machined out of block(s) of material. Alternatively, or additionally, some or all parts or the device as a whole can be manufactured using extrusion and/or injection molding. 3D printing (FDM) and/or selective laser sintering (SLS) may additionally or alternatively be used to manufacture components of the device for loading fluid or the device as a whole.

Figure 24:
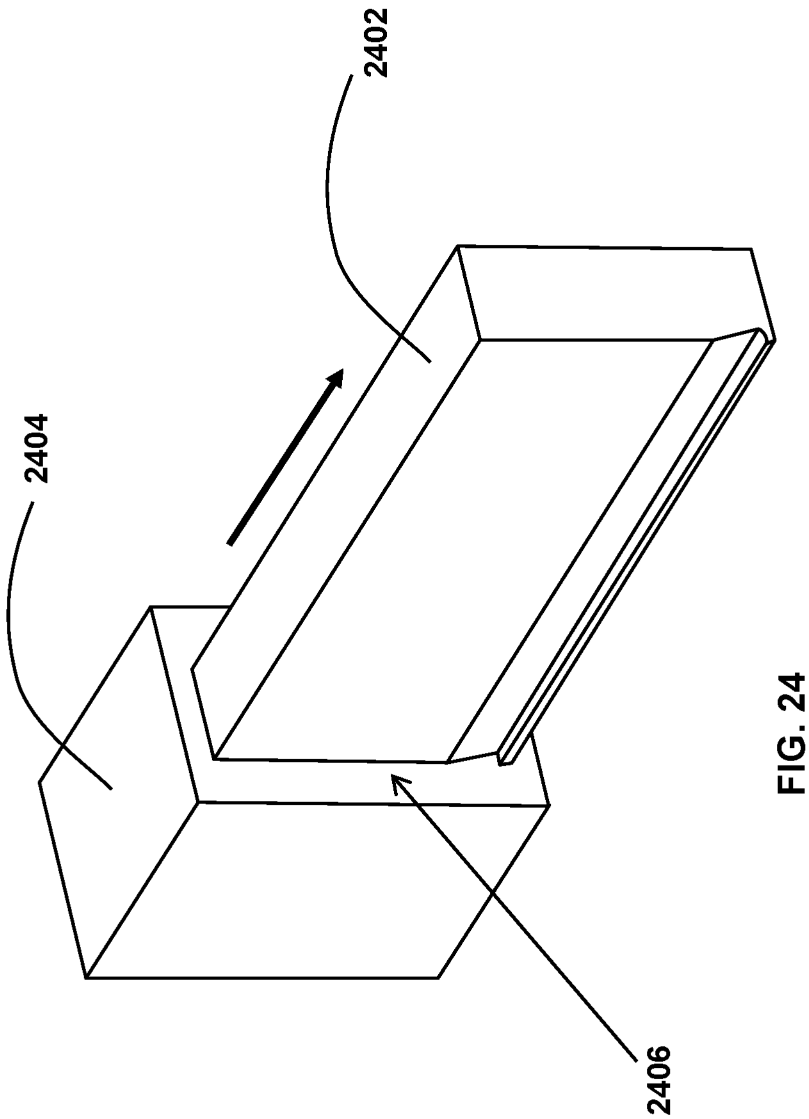
FIG. 24 depicts an example of a device for loading fluid being extruded from a corresponding die.

FIG. 24, depicts an example of a device for loading fluid being extruded from a corresponding die. More specifically, FIG. 24 shows a body 2402 being pushed (extruded) through an opening of a die 2404 having the opening of a desired shape for the body 2402. The end/side members (not shown) can be manufactured in a similar manner and then attached together permanently or detachably (as described in greater detail earlier in this application) to create a device for loading fluid into a nozzle-bearing body.

Table 1 lists considerations that may affect selection of a particular method for manufacturing a device for loading fluid into a nozzle-bearing body.

TABLE 1

| | Machining | FDM | SLS |
|---|---|---|---|
| Lead Time | Typically, 2 weeks, but can be expedited to a few days. | A few days for a new part, a day of a known part, such as from an existing CAD model. Typical build rates range from 25 mm/hour to 100 mm/hour. | A few days for a new part, a day of a known part, such as from an existing CAD model. A typical build rate is 50 mm/hour. |
| Surface finish | Sub-micron finish is possible (smooth). | 100-micron surface roughness (not visibly smooth). | 5-10-micron surface roughness (matte). |
| Materials | Metals, Polymers, Ceramics, etc. Soft materials are however difficult to machine. | Limited to thermoplastics with melting points below 300° C. | Metals, Thermoplastics. |
| Geometry | Difficult to machine internal cavities in single piece. Can be used to make smooth curved surfaces. Part geometry is limited by tooling dimension. | Can produce parts with complex geometries and internal cavities. Features with smooth curved surfaces are challenging due to resolution. | Can produce parts with complex geometries and internal cavities. |
| Cost | Cost is driven by the complexity of the part or the device, can be expensive. | Excluding capital costs, parts are relatively cheap to produce. Cost is primarily driven by material volume not complexity of the device or its parts. | Excluding capital costs, parts are relatively cheap to produce. Cost is primarily driven by material volume not complexity of the device or its parts. |

Comparing more specifically a device machined from PTFE and a device of the same geometry 3D printed using poly lactic acid (PLA), the following differences can be observed. Firstly, the device machined from PTFE has a smooth surface finish while the device 3D printed using PLA has a textured finish. The resulting textured finish can be controlled in 3D printing. As texture can be used to improve wetting properties of the device, 3D printing could be an advantageous manufacturing method when compared to machining when certain wetting properties are desired.

Secondly, 3D printing allows to achieve a more precise shaping of the device than machining. For example, when the device is machined, the recess formed in the device would typically have curved corners due to the tooling used in machining. This can be corrected, e.g., precise corners can be achieved, if the device is 3D printed.

In the above described devices for loading fluid, any, some, or all of the members of the device or their portions (or parts) may be made of the same or different materials. For example, all portion(s) of the device that are configured to be pressed against the body surface of the nozzle-bearing body while the device is in the working configuration may be made of a non-abrasive material, such as polytetrafluoroethylene (PTFE), nylon, or ultra-high molecular weight polyethylene (UHMWPE). Using a non-abrasive material reduces wear and tear on the body surface of the nozzle-bearing body, thereby extending its usable life.

Further, by using soft material(s) to make this(ese) portion(s) of the device, sealing between the device and the nozzle-bearing can be improved. Soft materials enable the respective portion(s) of the device to conform to the surface of the nozzle-bearing body when the device is pressed against the nozzle-bearing body, thereby improving sealing.

Figure 31:
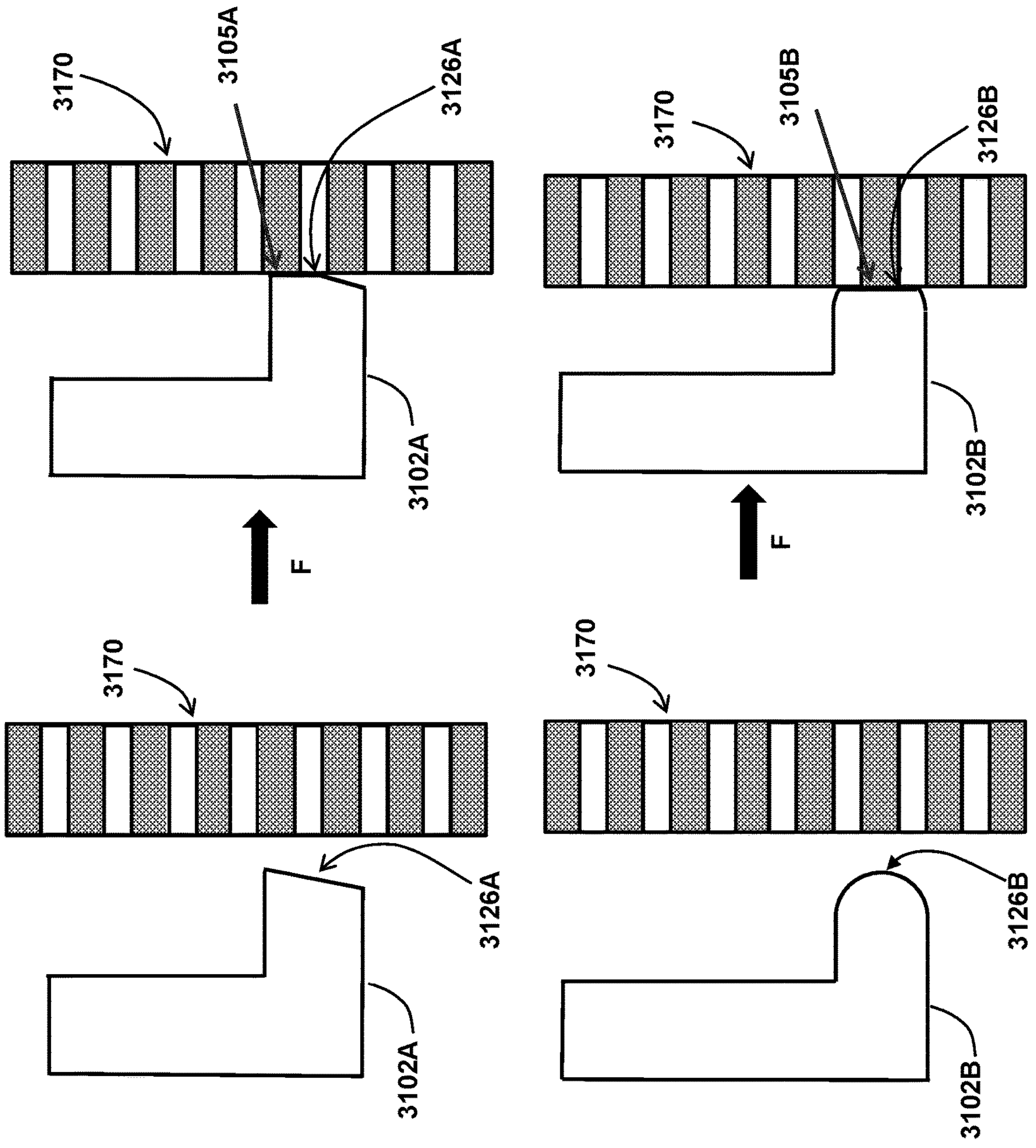
FIG. 31 depicts examples of geometry of a downstream surface of a device for loading fluid.

Additionally, by changing geometry of surface(s) of the device that come in contact with the nozzle-bearing body when the device is in the working configuration, sealing between the device and the nozzle-bearing body can be further improved. FIG. 31 shows two examples of how geometry of the device can be adapted to improve sealing with the nozzle-bearing body.

In FIG. 31, a downstream surface 3126A of a device 3102A does not complement the upstream surface or the surface of a nozzle-bearing body 3170, when the device 3102A is outside the working configuration (left side of FIG. 31). However, once the device 3102A is placed into the working configuration by being pressed against the nozzle-bearing body 3170 (right side of FIG. 31), the downstream surface 3126A takes a shape conforming to the nozzle-bearing body 3170 due to the soft properties of the material of which the downstream surface 3126A is made. In this scenario, the force of the device 3102A being pressed against the nozzle-bearing body 3170 is concentrated in a small region 3105A of the downstream surface 3126A (i.e., a stress concentration region), which resulting in improved sealing of the downstream surface 3126A with the nozzle-bearing body 3170.

A downstream surface 31268 of a device 31028 is curved, and thus does not complement the surface of the nozzle-bearing body 3170, which is shaped as a plate, when the device 3102B is outside of the working configuration. However, by pressing the device 31028 against the nozzle-bearing body 3170, the downstream surface 3126B takes a shape conforming to the surface of the nozzle-bearing body 3170 with the force being concentrated in a small region 31058 of the downstream surface 3126B, thereby leading to improved sealing of the downstream surface 31268 with the nozzle-bearing body 3170.

According to a further example, at least those members of the device and/or their portions that, in use, come into contact with fluid and/or the surface of the nozzle bearing body may be made of a material having low chemical reactivity. Using materials having low chemical reactivity helps to prevent chemical reaction between the surface of the nozzle-bearing body and the device, thus prolonging the working life of the device, as well as to prevent contamination of the fluid respectively.

Further, wettability of the inner surfaces of the recess forming the pocket for receiving fluid, such as the upstream and projecting surfaces, could affect performance of the device, and thus selection of materials for such parts. The wettability of a surface, such as of the upstream surface, can be enhanced by surface treatments, including but not limited to corona treating, flame treating, chemical etching, or the application of a thin surface coating to the surface of the part, by e.g., anodization (for aluminium), vapor deposition, or plasma deposition.

Figure 25:
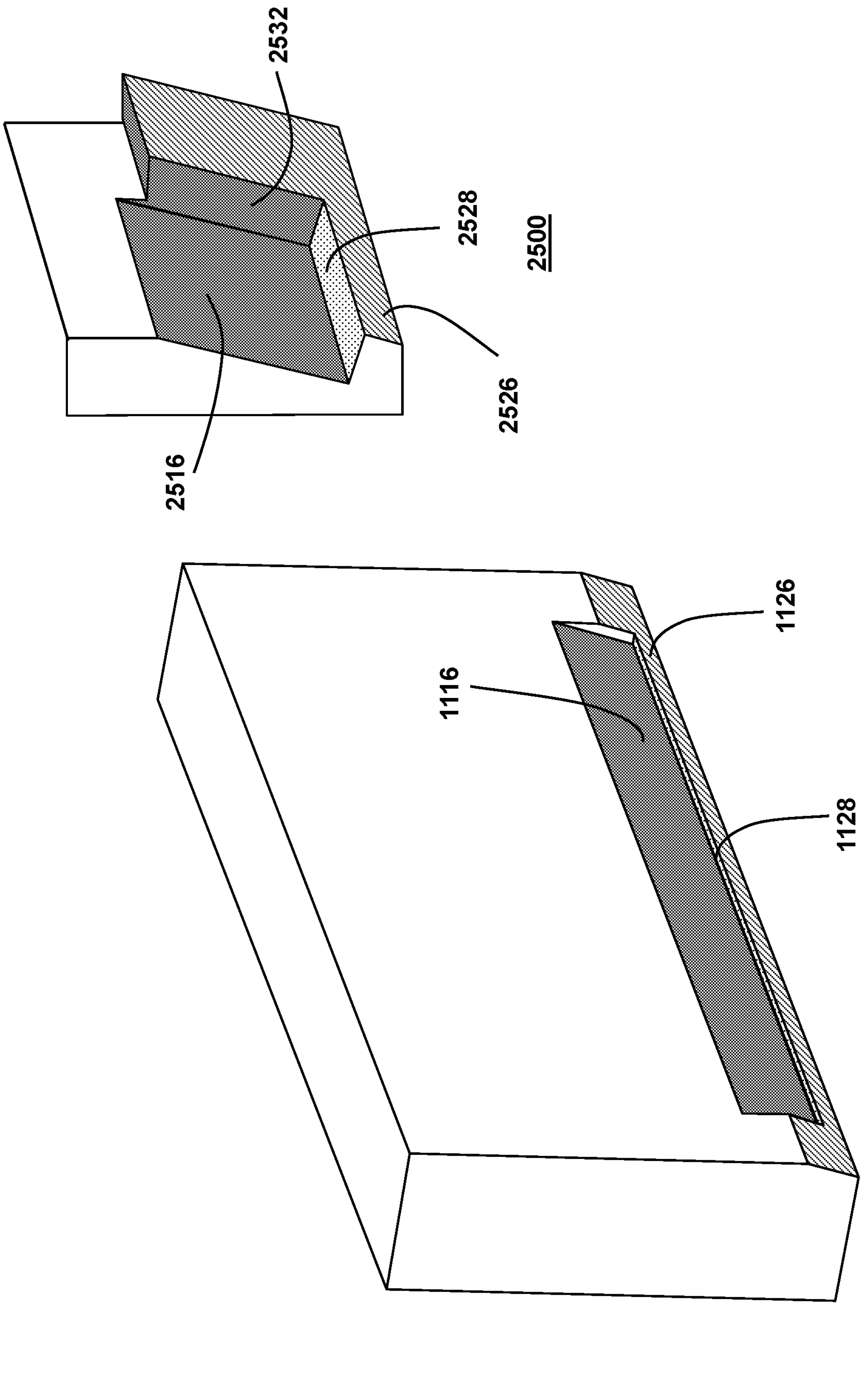
FIG. 25 depicts examples of geometry of a recess formed in a device for loading fluid.

For example, FIG. 25 shows the device 1100 of FIG. 11A and a close-up of a recess formed in a device 2500 having a different geometry than the device 1100. In view of the above discussed considerations, surfaces 1116 and 1128 of the device 1100 and surfaces 2516, 2526, and 2532 of the device 2500 can be made of materials having favorable wetting properties, while surfaces 1126 and 2526 can be made of materials that are more conformal than the materials used to make other parts of the devices 1100 and 2500 of respectively.

In some example devices, only two materials are used. For example, the bulk of the device could be made from a material having a high surface-energy and high wettability (contact angle less than 90 degrees). This reduces likelihood of air bubbles being formed within the pocket when fluid is delivered into the pocket. The second material could be used to form the surface that comes in contact with the nozzle-bearing body, e.g., the surfaces 1126 and 2526 of the device 2500 in FIG. 25. The second material could have high-wear resistance and low friction characteristics.

FIG. 26 includes Table 2 which lists examples of some of the materials that could be used to make a multi-material device and their characteristics.

Figure 32:
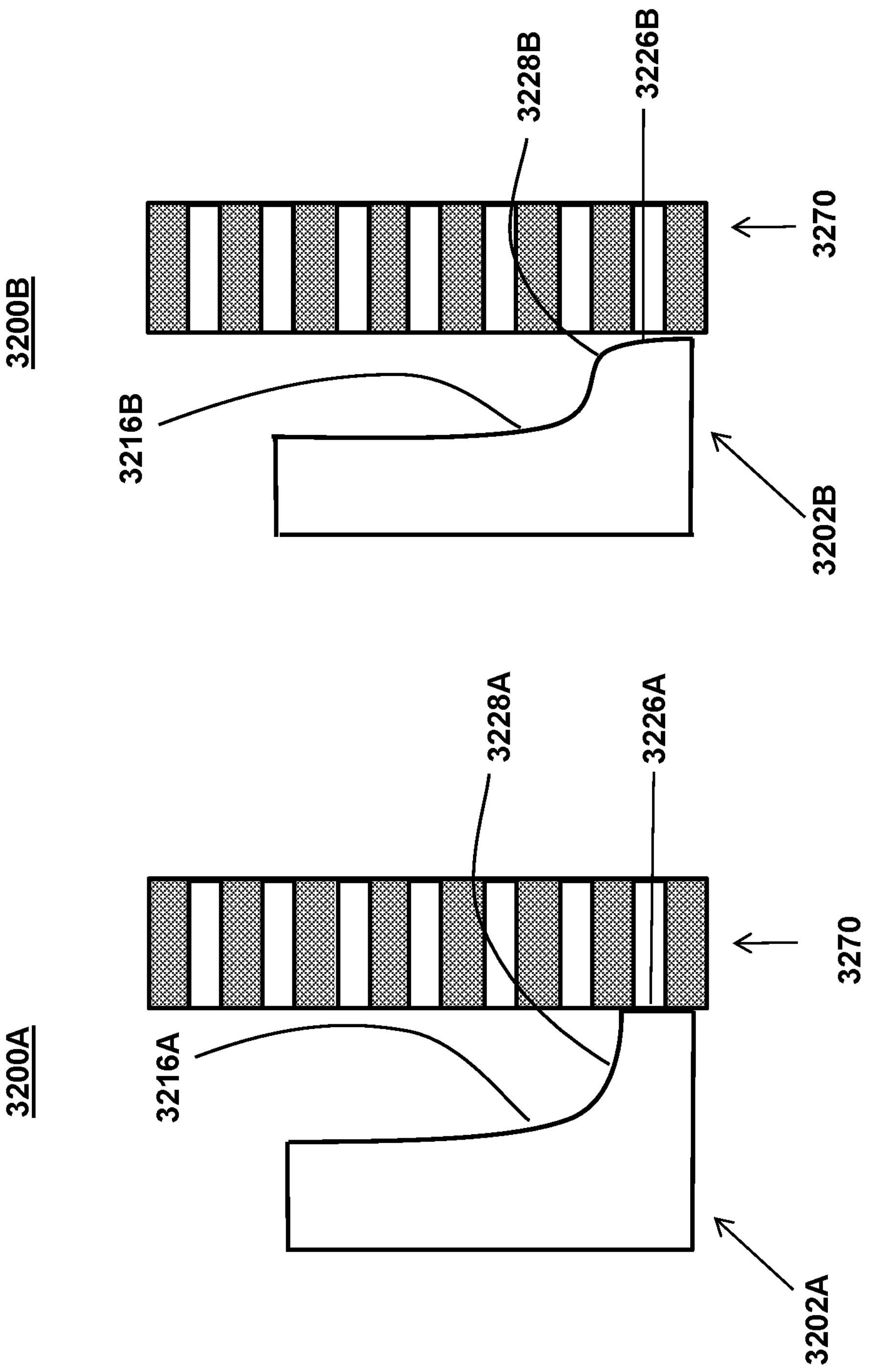
FIG. 32 depicts further examples of a device for loading fluid.

A device for loading fluid can be configured that the upstream, downstream, and protruding surfaces, some or all, form a continuous surface. FIG. 32 shows two of such examples. The assembly 3200A includes a device 3202A positioned against a nozzle-bearing body 3270. A downstream surface 3226A is pressed against the nozzle-bearing body 3270, which is similar to the geometry of other devices described in this application. However, unlike such other described devices, in the device 3202A, an upstream surface 3216A and a protruding surface 3228A connect at a curved angle, thereby forming a single continuous surface. Further, in a device 3202B all three surfaces, i.e., an upstream surface 3216B, a protruding surface 3228B, and a downstream surface 3226B, connected at curved angles, thereby forming a single continuous surface. The geometry relations described in this application similarly apply to the geometry of the devices 3202A and 3202B to enable these devices to load fluid into nozzles of the nozzle-bearing body 3270.

When in a working configuration with a nozzle-bearing body, a device for loading fluid designed according to the techniques described throughout this disclosure advantageously creates a pressure in fluid to be loaded into nozzle(s) of the nozzle-bearing body, and particularly a pressure in the fluid that causes the fluid to be loaded into the nozzle(s). Further, the device designed and operated under the conditions described in this disclosure, allows a pressure to be created in the fluid to load the nozzle(s) to a volume and depth, for a wide range of fluid viscosities, substantially independent of the fluid viscosity over a wide range of fluid viscosities (including, but not limited to, adhesives, hot melt adhesives, chocolate, mayonnaise, ketchup, liquid chocolate, pigment inks, dye-based inks, varnishes, primers, etchants, etch resists, encapsulants, electronic materials, and other fluids), substantially independent of the temperature of the fluid, and substantially independent of the relative speed with which the nozzle-bearing body and device for loading fluid translate past each other, for a wide range of such relative speeds. In printing applications this advantageously ensures that, for a wide variety of fluids and operating conditions, the volume of fluid ultimately deposited from each nozzle onto final substrates to be substantially constant, despite viscosity changes of the fluid due, for example, to variations in operating temperature or the relative speed of motion between the device and the nozzle-bearing surface. Further, the device described in this disclosure and operated as described in this disclosure advantageously facilitates a filling pressure that is uniform across the fluid-contacted width of the nozzle-bearing body, and furthermore is able to prevent the fluid from overflowing the device. This enable application of the disclosed device, method, and assembly in many areas, including but not limited to, bonding, selective bonding, release layers, surface activation, surface passivation, surface protection, electrical conduction, electrical insulation, surface decoration, reflection of IR or visible or UV light, absorption of IR or visible or UV light, radiation of IR radiation, and food flavouring.

The invention claimed is:

1. A device for loading fluid into one or more nozzles of a cylindrical nozzle-bearing body when the device is assembled into a working configuration with the nozzle-bearing body, the nozzle-bearing body having a body surface defining one or more orifices for receiving the fluid into the one or more nozzles, the device comprising:

a first member having a first surface; and a second member protruding from the first member, the second member having a second surface and a third surface, the second surface extending from the first surface at an interior angle in a range of 20 degrees to 160 degrees, wherein the first surface is shaped to substantially complement the shape of the body surface, wherein a tangent to the third surface, in a region of the third surface proximate to where the second surface meets the third surface, is substantially parallel to a tangent to the first surface, in a region of the first surface where the first surface meets the second surface, when the device is in the working configuration, wherein the device has a recess defined therein at least in part by the first surface and the second surface, the recess configured to form a pocket for receiving the fluid when the device is assembled into the working configuration, and wherein the first surface has a cylindrical curvature and is positionable to be substantially concentric with the cylindrical body surface of the nozzle-bearing body and to define an opening with the cylindrical body surface for receiving the fluid when the device is in the working configuration being held proximate to the nozzle-bearing body with the second member protruding toward the cylindrical body surface of the nozzle-bearing body.

2. The device of claim 1, wherein the third surface is configured to conform to the shape of the body surface of the nozzle-bearing body when the device is in the working configuration and not to complement or substantially complement the shape of the body surface of the nozzle-bearing body when the device is outside the working configuration.

3. The device of claim 1, wherein the interior angle is in a range of 60 degrees to 120 degrees, or in a range of 80 degrees to 100 degrees, or 90 degrees.

4. The device of claim 1, comprising:

a third member extending from the first member and the second member, the third member having a fourth surface configured to face the body surface when the device is in the working configuration; and a fourth member extending from the first member and the second member opposite the third member, the fourth member having a fifth surface configured to face the body surface when the device is in the working configuration, wherein at least a portion of the fourth surface and at least a portion of the fifth surface extend from the opposite sides of the third surface to form with the third surface a single surface configured to conform to the body surface of the nozzle-bearing body when the device is in the working configuration.

5. The device of claim 4, wherein the third and fourth members are integral with the first member and/or the second member.

6. The device of claim 4, wherein the recess is further defined by the third member and the fourth member.

7. The device of claim 4, comprising:

a fifth member having a sixth surface extending from the first surface that is opposite where the first surface meets the second surface, wherein an angle formed by the sixth surface and the first surface is in a range of 185 degrees to 265 degrees, and wherein, the fifth member is configured to form a funnel between the sixth surface of the fifth member and the body surface for collecting fluid when the device is assembled into the working configuration.

8. The device of claim 7, further comprising a first end member and a second end member positioned at the opposite sides of the device, wherein:

the first end member has a seventh surface configured to conform to the shape of the body surface when the device is in the working configuration, the second end member has an eighth surface configured to conform to the shape of the body surface when the device is in the working configuration, and the seventh surface and the eighth surface comprise respective surface portions aligned with the third surface of the second member, thereby forming an extended surface including the third surface and configured to conform to the body surface when the device is in the working configuration.

9. The device of claim 8, wherein the device is configured such that, in the device assembled into the working configuration with the nozzle-bearing body, the pocket formed by the device and the nozzle-bearing body comprises an inner region for receiving fluid, the inner region defined at least by the first and second surfaces, and an outer region for receiving fluid, the outer region defined at least by the first and second end members and by an area of the sixth surface located between the first and second end members.

10. The device of claim 8, wherein the end members are detachably mounted on the device.

11. The device of claim 1, wherein the second surface is substantially perpendicular to the tangent to the first surface in a region where the second surface meets the first surface and is substantially perpendicular to the tangent to the third surface in a region where the second surface meets the third surface.

12. The device of claim 1, wherein $l_1/c_p>1$ where:

$c_p$ denotes an extent to which the third surface protrudes from the first surface, and $l_1$ denotes a fluid-contacted length of the first surface measured along the first surface in the direction between the opening for receiving fluid and the second surface when the device is operated to load the fluid into the one or more nozzles.

13. The device of claim 1, wherein the first member is made of an engineering material, such as aluminium, brass, stainless steel, polyether ether ketone (PEEK), polytetrafluoroethylene (PTFE), nylon, carbon fibre composite, polyimide, or ultra-high molecular weight polyethylene (UHMWPE).

14. The device of claim 1, wherein the second member is made of a non-abrasive material, such as polytetrafluoroethylene (PTFE), ultra-high molecular weight polyethylene (UHMWPE), or nylon.

15. The device of claim 1, wherein all portion(s) a portion of the device configured to be pressed against the body surface of the nozzle-bearing body while the device is in the working configuration is made of a non-abrasive material, such as polytetrafluoroethylene (PTFE), ultra-high molecular weight polyethylene (UHMWPE), or nylon.

16. The device of claim 1, wherein the first member and the second member form a unitary body of the device.

17. The device of claim 16, wherein all members of the device form the unitary body.

18. The device of claim 1, wherein at least the first member and the second member are separate parts joined together to form the device.

19. The device of claim 18, wherein at least the first member and the second member are made of different materials.

20. The device of claim 1, wherein at least one member of the device is made of a material having low chemical reactivity.

21. An assembly for loading fluid, the assembly comprising:

a cylindrical nozzle-bearing body having a body surface defining one or more orifices for receiving the fluid into one or more nozzles; and a device for loading fluid into one or more nozzles of the cylindrical nozzle-bearing body, the device and the nozzle-bearing body assembled into the working configuration in which the device is held proximate to the nozzle-bearing body such that the second member of the device protrudes toward the body surface and the first surface and the body surface form a pocket having an opening for receiving the fluid, the device comprising:

a first member having a first surface, and a second member protruding from the first member, the second member having a second surface and a third surface, the second surface extending from the first surface at an interior angle in a range of 20 degrees to 160 degrees, wherein the first surface is shaped to substantially complement the shape of the body surface, wherein a tangent to the third surface, in a region of the third surface proximate to where the second surface meets the third surface, is substantially parallel to a tangent to the first surface, in a region of the first surface where the first surface meets the second surface, when the device is in the working configuration, wherein the device has a recess defined therein at least in part by the first surface and the second surface, the recess configured to form a pocket for receiving the fluid when the device is assembled into the working configuration, and wherein the first surface has a cylindrical curvature and is positionable to be substantially concentric with the cylindrical body surface of the nozzle-bearing body and to define an opening with the cylindrical body surface for receiving the fluid when the device is in the working configuration being held proximate to the nozzle-bearing body with the second member protruding toward the cylindrical body surface of the nozzle-bearing body;

wherein, in the working configuration, the nozzle-bearing body is movable relative to the device in a direction from the opening toward the second surface such that a gap formed between the first surface and the body surface and a gap formed between the third surface and the body surface remain substantially constant, thereby allowing the device to at least partially load the one or more nozzles with the fluid received into the pocket via the opening.

22. The assembly of claim 21, wherein $c_1 \gg 3V_n/A_n$, where:

$c_1$ denotes the gap between the body surface and the first surface, $1/A_n$ refers to the number of nozzles per unit area in the region of the nozzle bearing body opposite the fluid filled region of the first surface, and $V_n$ denotes a desired volume of fluid for loading into the fluid-contacted nozzle.

23. The assembly of claim 21, wherein $c_2 < c_p$, where:

$c_p$ denotes an extent to which the third surface protrudes from the first surface, and $c_2$ denotes the gap formed between the body surface and the third surface of the device.

24. The assembly of claim 23, wherein $c_2 \ll c_p$.

25. The assembly of claim 21, wherein $(c_2^3/l_2) \ll (c_1^3/l_1)$, where:

$l_1$ denotes the fluid-contacted length of the first surface measured along the first surface in the direction between the opening for receiving fluid and the second surface, $l_2$ denotes a dimension along the third surface measured from the second surface to the end of the device furthest from the opening for receiving fluid, $c_1$ denotes the gap between the body surface and the first surface, and $c_2$ denotes the gap between the body surface and the third surface.

26. A method for loading fluid, into one or more nozzles of a cylindrical nozzle-bearing body having a body surface defining one or more orifices for receiving fluid into the one or more nozzles, the method comprising:

assembling a device for loading fluid into a working configuration with the nozzle-bearing body, the device comprising:

a first member having a first surface, and a second member protruding from the first member, the second member having a second surface and a third surface, the second surface extending from the first surface at an interior angle in a range of 20 degrees to 160 degrees, the first surface being shaped to substantially complement the shape of the body surface, the device having a recess defined at least in part by the first surface and the second surface, wherein the first surface has a cylindrical curvature and is positionable to be substantially concentric with the cylindrical body surface of the nozzle-bearing body and to define an opening with the cylindrical body surface for receiving the fluid when the device is in the working configuration being held proximate to the nozzle-bearing body with the second member protruding toward the cylindrical body surface of the nozzle-bearing body, wherein assembling comprises:

holding the device, proximate to the nozzle-bearing body such that the second member protrudes toward the body surface, the first surface of the first member and the body surface form a pocket having an opening for receiving the fluid, and a tangent to the third surface, in a region of the third surface proximate to where the second surface meets the third surface, is substantially parallel to a tangent to the first surface, in a region of the first surface where the first surface meets the second surface; and while the device is in the working configuration:

supplying the fluid into the pocket via the opening, and moving the nozzle-bearing body relative to the device in a direction from the opening toward the second surface while maintaining a gap formed between the first surface and the body surface and a gap formed between the third surface and the body surface substantially constant to load the fluid from the pocket into the one or more nozzles.

27. The method of claim 26, wherein $c_1 \gg 3V_n/A_n$, where:

$c_1$ denotes the gap between the body surface and the first surface, $1/A_n$, refers to the number of nozzles per unit area in the region of the nozzle bearing body opposite the fluid filled region of the first surface, and $V_n$ denotes a desired volume of a fluid for loading into a fluid-contacted nozzle.

28. The method of claim 26, wherein $c_2 < c_p$, where:

$c_p$ denotes an extent to which the third surface protrudes from the first surface, and $c_2$ denotes the gap formed between the body surface and the third surface.

29. The method of claim 28, wherein $c_2 \ll c_p$.

30. The method of claim 26, wherein $(c_2^3/l_2) \ll (c_1^3/l_1)$, where:

$l_1$ denotes a fluid-contacted length of the first surface measured along the first surface in the direction between the opening for receiving fluid and the second surface, $l_2$ denotes a dimension along the third surface measured from the second surface to the end of the device furthest from the opening for receiving fluid, $c_1$ denotes the gap between the body surface and the first surface, and $c_2$ denotes the gap between the body surface and the third surface.

31. The method of claim 26, wherein at least one part of the device is made from a thermally conductive material, the method further comprising:

maintaining the at least one part at a controlled temperature in a range of ambient to 250 centigrade while loading the fluid into the one or more nozzles.

32. A device for loading fluid into one or more nozzles of a nozzle-bearing body when the device is assembled into a working configuration with the nozzle-bearing body, the nozzle-bearing body having a body surface defining one or more orifices for receiving the fluid into the one or more nozzles, the device comprising:

a first member having a first surface;

a second member protruding from the first member, the second member having a second surface and a third surface, the second surface extending from the first surface at an interior angle in a range of 20 degrees to 160 degrees;

a third member extending from the first member and the second member, the third member having a fourth surface configured to face the body surface when the device is in the working configuration; and a fourth member extending from the first member and the second member opposite the third member, the fourth member having a fifth surface configured to face the body surface when the device is in the working configuration, wherein:

the first surface is shaped to substantially complement the shape of the body surface, a tangent to the third surface, in a region of the third surface proximate to where the second surface meets the third surface, is substantially parallel to a tangent to the first surface, in a region of the first surface where the first surface meets the second surface, when the device is in the working configuration, the device has a recess defined therein at least in part by the first surface and the second surface, the recess configured to form a pocket for receiving the fluid when the device is assembled into the working configuration, and at least a portion of the fourth surface and at least a portion of the fifth surface extend from the opposite sides of the third surface to form with the third surface a single surface configured to conform to the body surface of the nozzle-bearing body when the device is in the working configuration.

33. The device of claim 32 for loading fluid into one or more nozzles of the nozzle-bearing body that is planar, wherein the first surface is planar such that the first surface is positionable to be substantially parallel to the planar body surface of the nozzle-bearing body and to define an opening with the planar body surface for receiving the fluid, when the device is in the working configuration being held proximate to the nozzle-bearing body with the second member protruding toward the planar body surface of the nozzle-bearing body.

34. The device of claim 33, wherein the second surface is substantially perpendicular to the first surface in a region where the second surface meets the first surface and is substantially perpendicular to the third surface in a region where the second surface meets the third surface.

* * * * *